US012115747B2

(12) United States Patent
Adami et al.

(10) Patent No.: US 12,115,747 B2
(45) Date of Patent: Oct. 15, 2024

(54) ARTICLES OF WEAR AND PROCESSES FOR MAKING THE SAME

(71) Applicant: NIKE, Inc., Beaverton, OR (US)

(72) Inventors: Giovanni Adami, Montebelluna (IT); Sam Amis, Portland, OR (US); Sergio Cavaliere, Venice (IT); Meng-Chun Hu, Taichung (TW); John Hurd, Lake Oswego, OR (US); James Molyneux, Portland, OR (US); Thomas J. Rushbrook, Portland, OR (US); Timothy J. Smith, Portland, OR (US); I-Hsien Tseng, Tainan (TW); Mirko Bianconi, Verona (IT); Frederico Zecchetto, Verona (IT)

(73) Assignee: NIKE, INC., Beaverton, OR (US)

( * ) Notice: Subject to any disclaimer, the term of this patent is extended or adjusted under 35 U.S.C. 154(b) by 196 days.

(21) Appl. No.: 17/838,613

(22) Filed: Jun. 13, 2022

(65) Prior Publication Data

US 2022/0314567 A1    Oct. 6, 2022

Related U.S. Application Data

(63) Continuation of application No. 15/347,650, filed on Nov. 9, 2016, now Pat. No. 11,400,673.

(30) Foreign Application Priority Data

Nov. 11, 2015   (IT) .......................... 102015000071599

(51) Int. Cl.
*B29D 35/12*    (2010.01)
*A41B 17/00*    (2006.01)
(Continued)

(52) U.S. Cl.
CPC .............. *B29D 35/12* (2013.01); *A41B 17/00* (2013.01); *A41D 1/00* (2013.01); *A41D 31/00* (2013.01);
(Continued)

(58) Field of Classification Search
CPC ......... A43B 1/04; A43B 23/0265; A43B 9/02; A43B 23/0235; A43B 23/0255;
(Continued)

(56) References Cited

U.S. PATENT DOCUMENTS 3,633,961 A    1/1972  Speransky et al.
3,650,884 A    3/1972  Hansen
(Continued)

FOREIGN PATENT DOCUMENTS

CN        2415644 Y    1/2001
CN        1084173 C    5/2002
(Continued)

OTHER PUBLICATIONS

Intention to Grant received for European Patent Application No. 19733219.0, mailed on Jan. 25, 2023, 7 pages.
(Continued)

*Primary Examiner* — Christina A Johnson
*Assistant Examiner* — Kelsey C Grace
(74) *Attorney, Agent, or Firm* — Shook, Hardy & Bacon L.L.P.

(57) ABSTRACT

Processes and systems for thermoforming articles of wear are disclosed. The process can include utilizing a negative pressure generation system to seal an article in a forming material thereby compressing the forming material onto the outer surface of the article. The process can also include exposing the sealed article to an increased temperature followed by exposure to a decrease temperature, while maintaining the compressive force of the forming material
(Continued)

on the outer surface of the article. A positive pressure can also be applied to the sealed article while undergoing the heating and/or cooling steps, which can facilitate the removal of bubbles from the article during thermoforming as well as apply additional compressive force to the outer surface of the article.

11 Claims, 19 Drawing Sheets

(51) Int. Cl.

| | | |
|---|---|---|
| A41D 1/00 | (2018.01) | |
| A41D 31/00 | (2019.01) | |
| A41H 43/04 | (2006.01) | |
| A43B 1/04 | (2022.01) | |
| A43B 23/02 | (2006.01) | |
| A43D 11/00 | (2006.01) | |
| A43D 95/10 | (2006.01) | |
| A43D 95/12 | (2006.01) | |
| A43D 95/14 | (2006.01) | |
| A43D 111/00 | (2006.01) | |
| B29C 35/08 | (2006.01) | |
| B29C 51/10 | (2006.01) | |
| B29C 51/14 | (2006.01) | |
| B29C 51/42 | (2006.01) | |
| D04B 1/16 | (2006.01) | |
| A43B 9/02 | (2006.01) | |
| A43B 13/12 | (2006.01) | |
| B29D 35/00 | (2010.01) | |
| B29D 35/06 | (2010.01) | |
| B29D 35/14 | (2010.01) | |
| B29L 31/50 | (2006.01) | |

(52) U.S. Cl.
CPC ............... *A41H 43/04* (2013.01); *A43B 1/04* (2013.01); *A43B 23/0265* (2013.01); *A43D 11/003* (2013.01); *A43D 95/10* (2013.01); *A43D 95/12* (2013.01); *A43D 95/14* (2013.01); *A43D 111/00* (2013.01); *B29C 35/0805* (2013.01); *B29C 51/10* (2013.01); *B29C 51/14* (2013.01); *B29C 51/42* (2013.01); *D04B 1/16* (2013.01); *A43B 9/02* (2013.01); *A43B 13/12* (2013.01); *A43B 23/0235* (2013.01); *A43B 23/024* (2013.01); *A43B 23/0255* (2013.01); *B29C 2035/0822* (2013.01); *B29D 35/0054* (2013.01); *B29D 35/06* (2013.01); *B29D 35/146* (2013.01); *B29L 2031/50* (2013.01); *D10B 2401/041* (2013.01); *D10B 2501/043* (2013.01)

(58) Field of Classification Search
CPC ..... A43B 23/024; A43B 13/12; A43D 111/00; A43D 95/12; A43D 95/10; A43D 11/003; A43D 95/14; A41B 17/00; D04B 1/16; A41D 1/00; A41D 31/00; A41H 43/04; B29C 35/0805; B29C 51/10; B29C 51/14; B29C 51/42; B29C 2035/0822; B29D 35/12; B29D 35/0054; B29D 35/146; B29D 35/06; B29L 2031/50; D10B 2401/041; D10B 2501/043
See application file for complete search history.

(56) References Cited

U.S. PATENT DOCUMENTS

| | | | |
|---|---|---|---|
| 3,782,705 A * | 1/1974 | Westeren | ............... C21D 1/773 266/250 |
| 3,784,995 A | 1/1974 | Egtvedt et al. | |
| 3,848,287 A | 11/1974 | Simonsen | |
| 3,987,556 A | 10/1976 | Tissot | |
| 4,102,964 A | 7/1978 | Ridgeway | |
| 4,523,005 A | 6/1985 | Szycher | |
| 4,939,805 A | 7/1990 | Walega | |
| 4,964,229 A | 10/1990 | Laberge | |
| 4,974,393 A | 12/1990 | Rich et al. | |
| 5,866,058 A | 2/1999 | Batchelder et al. | |
| 5,969,076 A | 10/1999 | Lai et al. | |
| 6,010,587 A | 1/2000 | Hsia | |
| 6,161,354 A | 12/2000 | Gilbert et al. | |
| 6,299,817 B1 | 10/2001 | Parkinson | |
| 6,497,786 B1 | 12/2002 | Kilgore et al. | |
| 6,705,853 B1 | 3/2004 | Nehring | |
| 9,456,661 B2 | 10/2016 | Dieter et al. | |
| 9,907,365 B2 | 3/2018 | Downing et al. | |
| 2002/0079617 A1 | 6/2002 | Kageyama et al. | |
| 2004/0119198 A1 | 6/2004 | Alper et al. | |
| 2004/0164457 A1 | 8/2004 | Rogers et al. | |
| 2004/0195720 A1 | 10/2004 | Fitzell | |
| 2008/0211128 A1 | 9/2008 | Lucier et al. | |
| 2009/0273109 A1 | 11/2009 | Johnson et al. | |
| 2011/0108667 A1 | 5/2011 | Keller et al. | |
| 2013/0105077 A1 | 5/2013 | Kessler et al. | |
| 2014/0044378 A1 | 2/2014 | Loeschen et al. | |
| 2014/0159267 A1 | 6/2014 | Murch et al. | |
| 2014/0237738 A1* | 8/2014 | Johnson | ............... B29D 35/126 12/107 R |
| 2014/0239556 A1 | 8/2014 | Fisher et al. | |
| 2015/0208468 A1 | 7/2015 | Regan et al. | |
| 2015/0282564 A1 | 10/2015 | Meschter et al. | |
| 2015/0305448 A1 | 10/2015 | Cavaliere et al. | |
| 2016/0031164 A1 | 2/2016 | Downs et al. | |
| 2016/0113356 A1 | 4/2016 | Clough et al. | |
| 2016/0185062 A1 | 6/2016 | Boucher et al. | |
| 2016/0282564 A1 | 9/2016 | Little et al. | |
| 2017/0129200 A1 | 5/2017 | Adami et al. | |
| 2017/0368735 A1 | 12/2017 | Iovu | |
| 2018/0065353 A1 | 3/2018 | Wang | |
| 2018/0103726 A1 | 4/2018 | Cross | |
| 2019/0047236 A1 | 2/2019 | Ruiz et al. | |
| 2019/0329482 A1 | 10/2019 | Bianconi et al. | |
| 2019/0329483 A1 | 10/2019 | Bianconi et al. | |
| 2019/0351604 A1 | 11/2019 | Chien et al. | |
| 2022/0219377 A1 | 7/2022 | Bianconi et al. | |

FOREIGN PATENT DOCUMENTS

| | | |
|---|---|---|
| CN | 1518916 A | 8/2004 |
| CN | 1735499 A | 2/2006 |
| CN | 1753814 A | 3/2006 |
| CN | 1887754 A | 1/2007 |
| CN | 101500445 A | 8/2009 |
| CN | 102120352 A | 7/2011 |
| CN | 202965033 U | 6/2013 |
| CN | 103538181 A | 1/2014 |
| CN | 103844428 A | 6/2014 |
| CN | 204015322 U | 12/2014 |
| CN | 104354312 A | 2/2015 |
| CN | 104738900 A | 7/2015 |
| CN | 204499657 U | 7/2015 |
| CN | 104875363 A | 9/2015 |
| CN | 104886876 A | 9/2015 |
| CN | 104886880 A | 9/2015 |
| CN | 105495855 A | 4/2016 |
| CN | 205167352 U | 4/2016 |
| CN | 106182712 A | 12/2016 |
| CN | 106617506 A | 5/2017 |
| CN | 106808675 A | 6/2017 |
| CN | 107438378 A | 12/2017 |
| CN | 207028262 U | 2/2018 |

(56) References Cited

FOREIGN PATENT DOCUMENTS

| | | |
|---|---|---|
| DE | 2124957 A1 | 11/1972 |
| DE | 19957712 A1 | 5/2001 |
| EP | 0307561 A1 | 3/1989 |
| EP | 1587666 B1 | 7/2007 |
| EP | 2462908 A1 | 6/2012 |
| EP | 3245889 A1 | 11/2017 |
| GB | 1375159 A | 11/1974 |
| GB | 2256830 A | 12/1992 |
| JP | 8-38213 A | 2/1996 |
| JP | 11-147251 A | 6/1999 |
| JP | 2002-119307 A | 4/2002 |
| KR | 88-12970 A | 11/1988 |
| KR | 0132259 B1 | 4/1998 |
| KR | 2003-0041618 A | 5/2003 |
| KR | 10-2004-0052647 A | 6/2004 |
| KR | 20-0355870 Y1 | 7/2004 |
| KR | 10-2006-0058991 A | 6/2006 |
| KR | 10-2006-0078278 A | 7/2006 |
| KR | 10-0731341 B1 | 6/2007 |
| KR | 10-0966631 B1 | 6/2010 |
| KR | 10-2012-0049228 A | 5/2012 |
| KR | 10-2015-0110746 A | 10/2015 |
| KR | 10-2015-0143814 A | 12/2015 |
| KR | 10-2016-0147968 A | 12/2016 |
| TW | 201116225 A | 5/2011 |
| TW | 201208597 A | 3/2012 |
| TW | M486297 U | 9/2014 |
| TW | 201524401 A | 7/2015 |
| TW | I563930 B | 1/2017 |
| WO | 2004/056228 A1 | 7/2004 |
| WO | 2008/122874 A1 | 10/2008 |
| WO | 2012/136222 A1 | 10/2012 |
| WO | 2017/083550 A1 | 5/2017 |

OTHER PUBLICATIONS

Intention to Grant received for European Patent Application No. 20176440.4, mailed on Jan. 10, 2023, 10 pages.
Non-Final Office Action received for U.S. Appl. No. 17/707,357, mailed on May 9, 2023, 9 pages.
Non-Final Office Action received for U.S. Appl. No. 18/086,121, mailed on Apr. 14, 2023, 16 pages.
European Search Report and Search Opinion received for European Application No. 23183308.8, mailed on Jan. 17, 2024, 10 pages.
Notice of Allowance received for U.S. Appl. No. 16/393,748, mailed on Sep. 6, 2022, 8 pages.
Office action received for European Patent Application No. 19729895.3, mailed on Aug. 19, 2022, 7 pages.
Final Office Action received for U.S. Appl. No. 16/415,873, mailed on Jun. 13, 2023, 12 pages.
Notice of Allowance received for U.S. Appl. No. 18/086,121, mailed on Nov. 7, 2023, 8 pages.
Intention to Grant received for European Patent Application No. 19729897.9, mailed on Oct. 24, 2022, 7 pages.
Non-Final Office Action received for U.S. Appl. No. 16/415,873, mailed on Oct. 4, 2022, 12 pages.
Intention to Grant received for European Patent Application No. 20176440.4, mailed on Jul. 19, 2022, 9 pages.
Notice of Allowance received for U.S. Appl. No. 17/707,357, mailed on Aug. 23, 2023, 10 pages.

* cited by examiner

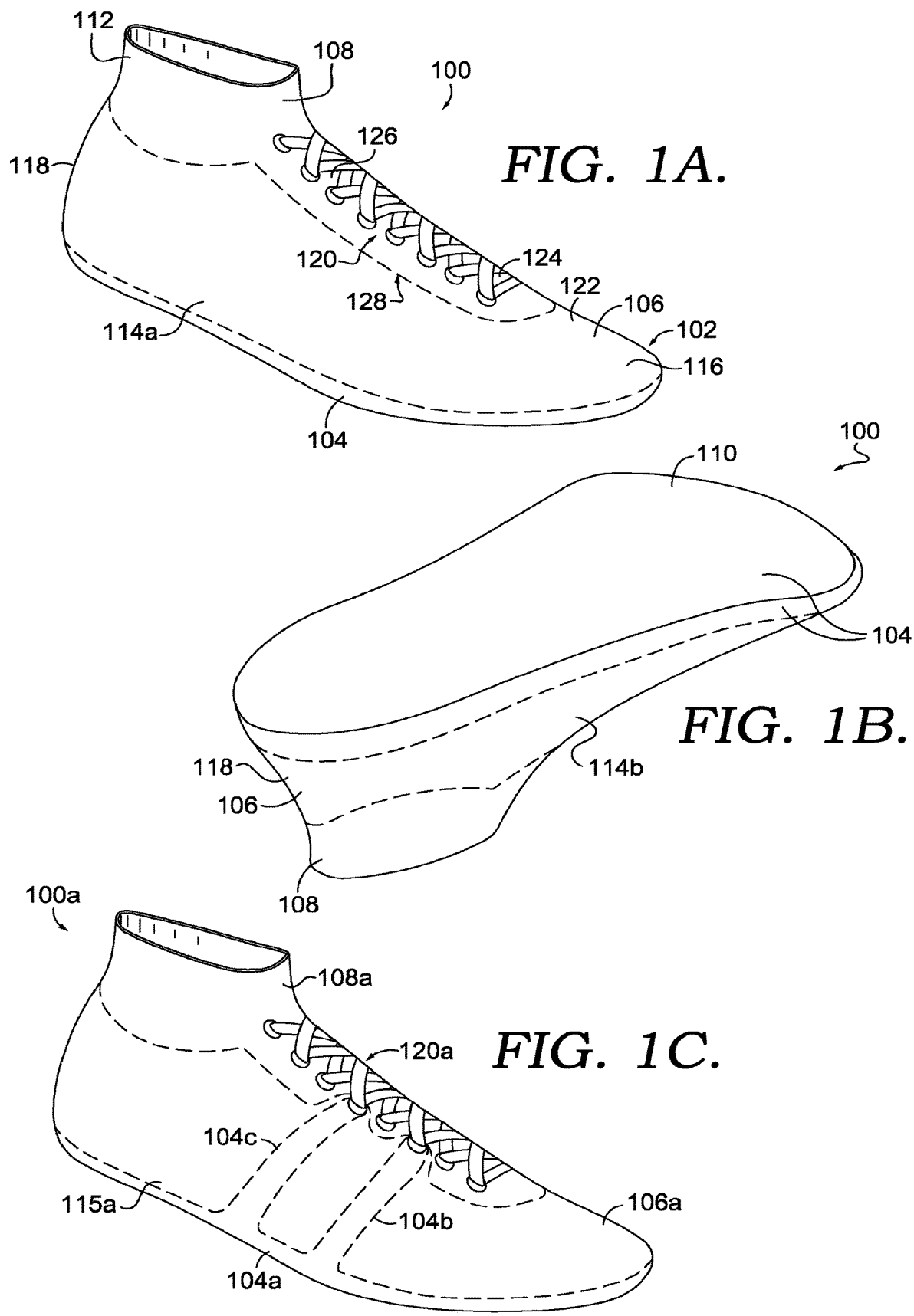

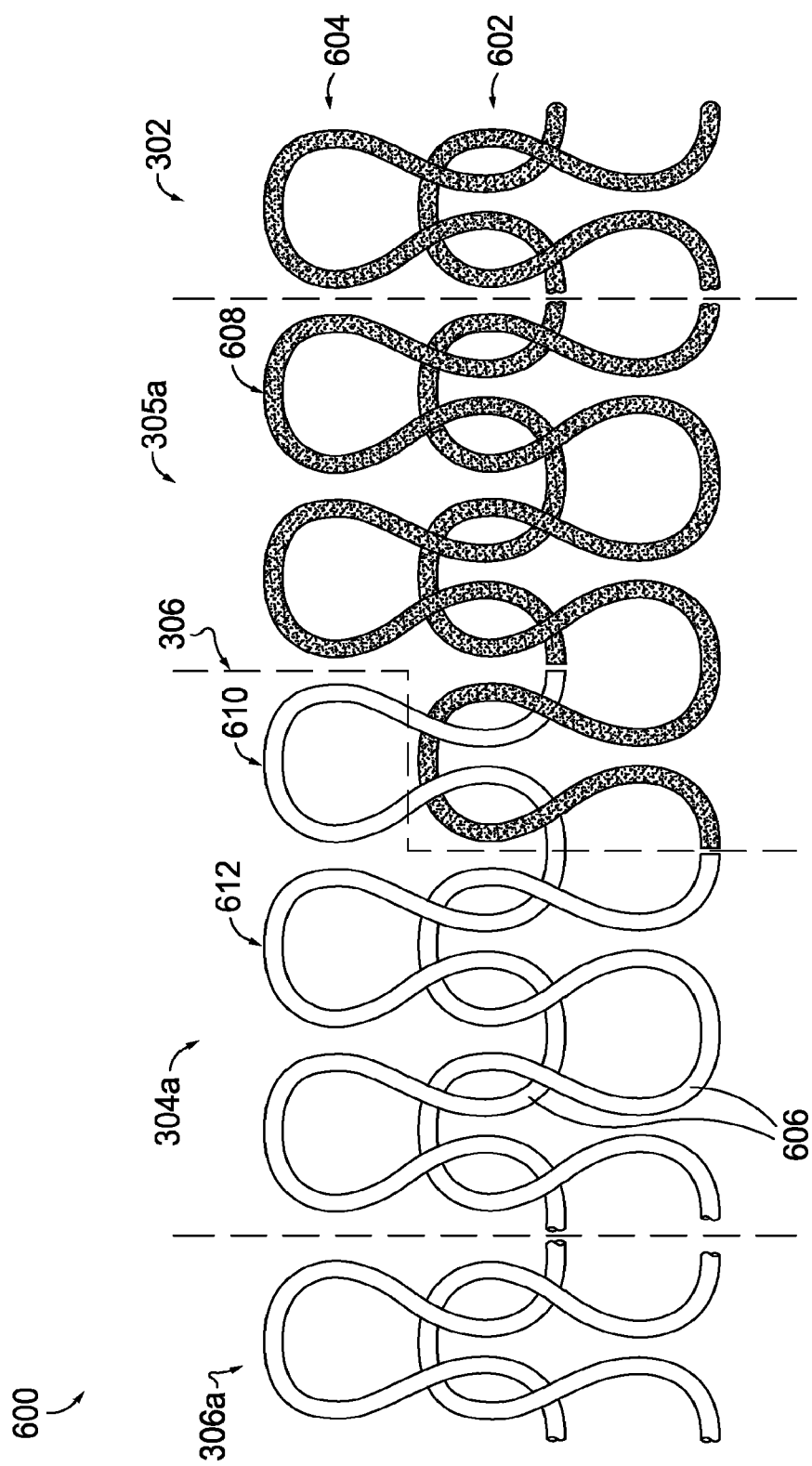

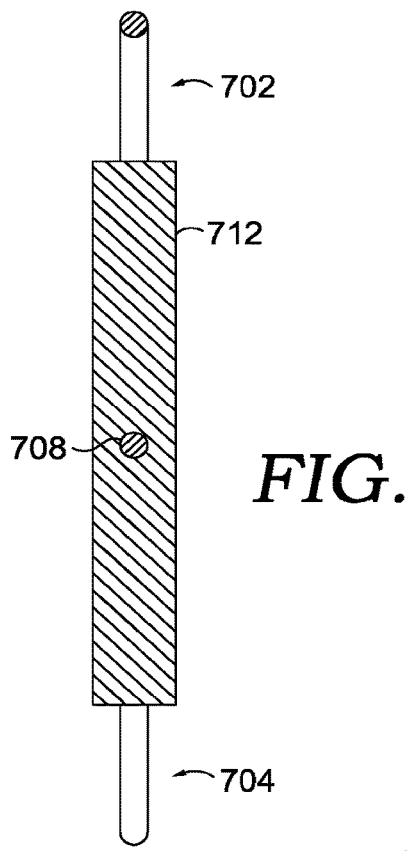
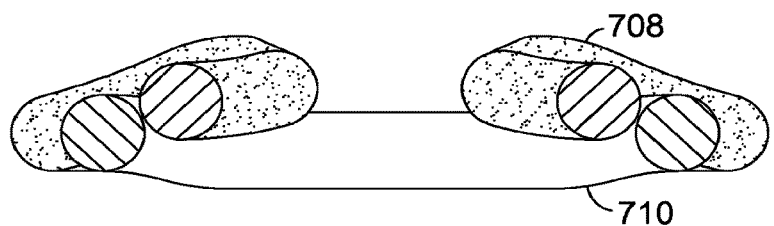
FIG. 8.
FIG. 9A.
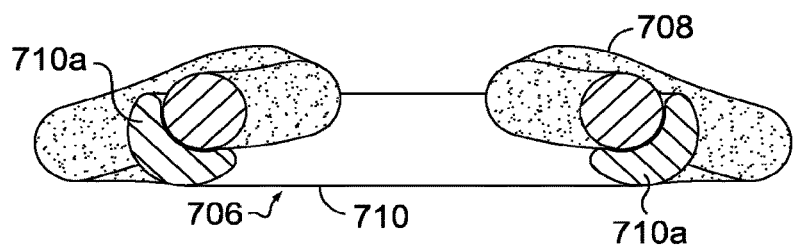
FIG. 9B.

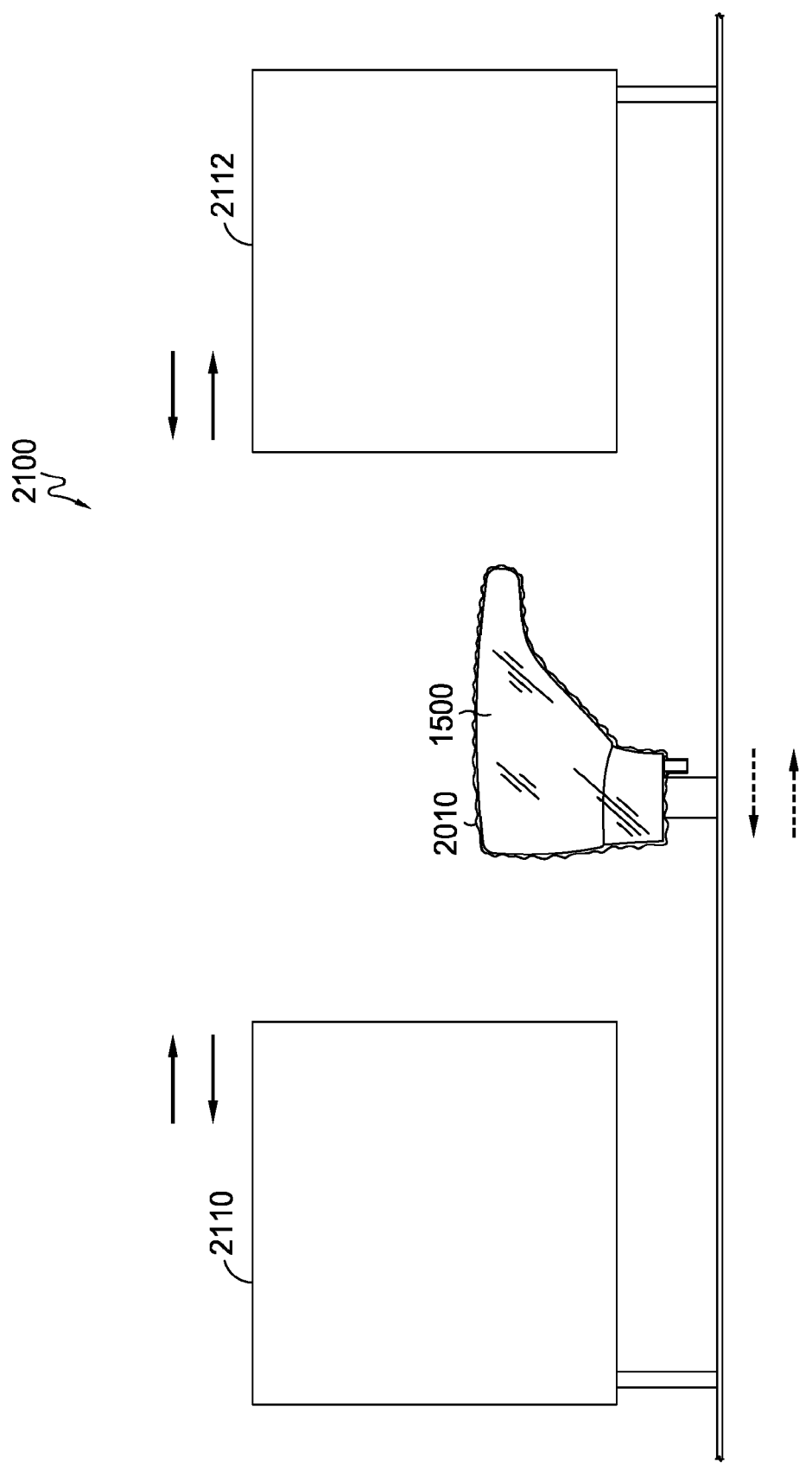

ARTICLES OF WEAR AND PROCESSES FOR MAKING THE SAME

CROSS-REFERENCE TO RELATED APPLICATIONS

This is a continuation application of U.S. application Ser. No. 15/347,650, filed Nov. 9, 2016 and entitled "ARTICLES OF WEAR AND PROCESSES FOR MAKING THE SAME," which claims priority to Italian Patent Application No. 102015000071599 (UB2015A005474), filed Nov. 11, 2015 and entitled "Apparatus and Relative Process for the Thermal Treatment of Shoes, In Particular Sports Shoes." The entirety of the aforementioned applications are incorporated by reference herein.

FIELD

The present disclosure is directed to articles of wear, such as articles of apparel and/or articles of footwear. More specifically, the present disclosure is directed to articles of wear comprising one or more textiles that include a low processing temperature polymeric composition and a high processing temperature polymeric composition. The present disclosure is also directed to methods of making articles of wear using textiles that include a low processing temperature polymeric composition and a high processing temperature polymeric composition.

BACKGROUND

Traditionally, certain articles of wear, e.g., articles of footwear, were made by cutting individual pieces of material and combining them together. The individual pieces could be combined by sewing and/or using adhesives. However, the cutting and combining of multiple pieces of material are wasteful, labor-intensive, and error prone processes, where such errors result in increased waste, as well as increased manufacturing time and energy.

BRIEF DESCRIPTION OF THE DRAWINGS

Some aspects are illustrated by way of example and not limitation in the figures of the accompanying drawings.

FIG. 1A is a top and side perspective view of an article of footwear, primarily illustrating the position of three different textile zones, in accordance with aspects of the present invention.

FIG. 1B is a bottom and side perspective view of the article of footwear of FIG. 1A, in accordance with aspects of the present invention.

FIG. 1C is a top and side perspective view of an alternative aspect of the article of footwear of FIG. 1A, primarily illustrating the position of three different textile zones, in accordance with aspects of the present invention.

FIG. 6 is a schematic representation of two interconnected courses of loops having different types of yarn and depicting a staggered interface, in accordance with aspects of the present invention.

FIG. 8 is a schematic representation of a cross-section of the non-yarn material of FIG. 7B, and showing a portion of a yarn from one of the outer courses of loops being encapsulated within the non-yarn material, in accordance with aspects of the present invention.

FIG. 9A is a schematic representation of a cross-section of a portion of the interconnected courses of FIG. 7, showing one loop in the middle course of loops and one loop in the upper course of loops, in accordance with aspects of the present invention.

FIG. 9B is a schematic representation of the cross-section of FIG. 9A but after the interconnected courses of FIG. 7 have been exposed to a thermoforming process, showing how the loop of yarn in the middle course deforms but still maintains a general yarn structure, in accordance with aspects of the present invention.

FIG. 21 is a schematic representation of a thermoforming system having a heating zone and a cooling zone, in accordance with aspects of the present invention.

DESCRIPTION

Figure 2A:
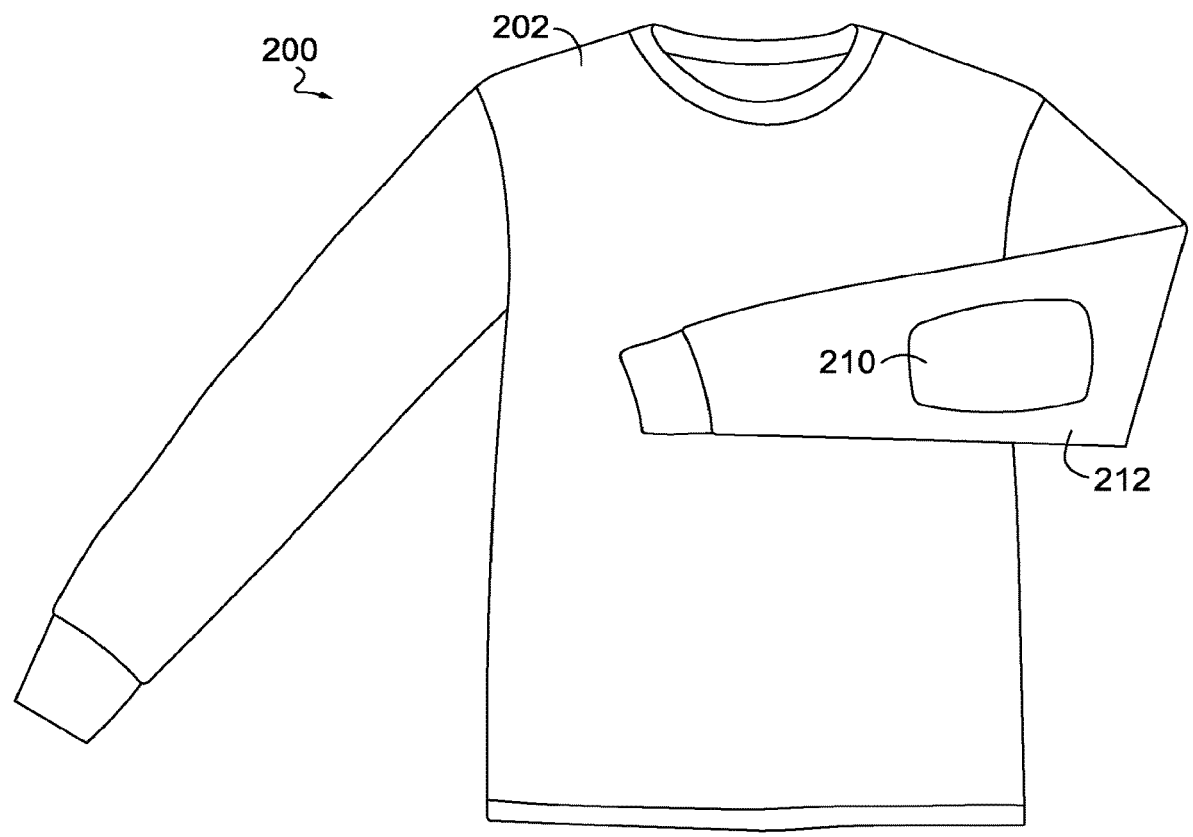
FIG. 2A is a side view of an article of apparel, primarily illustrating an elbow patch, in accordance with aspects of the present invention.

Conventional thermoforming processes can include heating a thermoplastic material to allow the thermoplastic material to melt, followed by cooling the article to solidify the melted thermoplastic material to form a thermoformed article. In certain processes it may be difficult to thermoform an article comprising one or more thermoplastic polymers into a three-dimensional shape, such as an article of wear. For example, certain processes may require an article to be formed around an object, such as an upper for a shoe positioned on a last. In such a process, it may be advantageous to provide external pressure on the article during the thermoforming process in order to better form the article to the object it is being formed around. However, conventional thermoforming techniques cannot provide complete and even pressure over an entire article, such as an upper for a shoe positioned on a last, that may be required to effectively thermoform the upper while positioned on the last.

The thermoforming system and processes described herein can alleviate one or more of the above problems. In aspects, the thermoforming system described herein can provide consistent and even pressure over the entire article while exposed to a heating step and/or a cooling step. In such aspects, this consistent and even pressure over the entire article can be at least partly achieved by the use of a negative pressure generation system that is capable of sealing an article to be thermoformed inside a forming material, which compresses the forming material onto an outer surface of the article. Further, the thermoforming system can also provide a positive pressure to the article as it undergoes the heating and/or cooling steps, which can facilitate the forming of the article around an object (e.g., an upper on a last), enhance bonding, and facilitate the removal of bubbles out from the article.

The present disclose also includes specific materials for, and methods of, forming articles for use in the thermoforming processes described herein. For example, the present disclosure also describes articles of wear comprising a textile that includes fibers, yarns or both fibers and yarns formed of a first thermoplastic polymeric composition (e.g., a yarn composition or a fiber composition) comprising one or more first thermoplastic polymers. The first thermoplastic polymeric composition comprising one or more first polymers is referred to herein as a low processing temperature polymeric composition. The textiles of the present disclosure also include fibers, yarns or both fibers and yarns comprising a second thermoplastic polymeric composition comprising one or more second polymers. The second thermoplastic polymeric composition comprising one or more second polymers is referred to herein as a high processing temperature polymeric composition. As used herein, a "low processing temperature polymeric composition" and a "high processing temperature polymeric composition" are relative terms such that the low processing temperature polymeric composition exhibits a melting temperature $T_m$ that is below one or more of a creep relaxation temperature $T_{cr}$, a heat deflection temperature $T_{hd}$, a Vicat softening temperature $T_{vs}$, or a melting temperature $T_m$ of the high processing temperature polymeric composition. These parameters are further described in detail below. It should be understood that other properties and parameters may differ between the low processing temperature polymeric composition and the high processing temperature polymeric composition, as discussed in detail below.

In certain aspects, thermoforming the textiles described herein may cause the low processing temperature polymeric composition to melt or deform (and subsequently solidify), thereby altering the structure of the low processing temperature polymeric composition while the high processing temperature polymeric composition may not melt and/or deform thus maintaining its structure, such as its structure as a yarn or a fiber. In such aspects, this thermoforming process may result in a more rigid structural component (such as an outsole portion of a shoe) integrally connected to a less rigid portion of the textile, such as an upper portion of the shoe having a fiber (e.g., a fiber present in the form of a yarn) that comprises the high processing temperature polymeric composition.

Accordingly, in one aspect, a system for thermoforming an article is provided. The system includes a heating station adapted to achieve and maintain a pressure above atmospheric pressure, a cooling station, and a negative pressure generation system. The negative pressure generation system includes a forming material, a sealing member, and a negative pressure generation device. The negative pressure generation system is adapted to at least partly seal the article inside the forming material by exposing the article to a pressure less than atmospheric pressure. The negative pressure generation system and the heating station are cooperatively adapted to allow the article to be simultaneously exposed to: thermal energy; the pressure less than atmospheric pressure while the article is at least partly sealed inside the forming material; and the pressure above atmospheric pressure. The negative pressure generation system and the cooling station are cooperatively adapted to allow the article to be exposed to a temperature less than experienced in the heating station while the article is at least partly sealed inside the forming material and exposed to the pressure less than atmospheric pressure.

In another aspect, a method for thermoforming an article is provided. The method includes receiving an article, and compressing a forming material onto an outer surface of the article by reducing the pressure between the outer surface of the article and the forming material to a pressure below atmospheric pressure, thereby forming a sealed article. The method also includes exposing the sealed article to thermal energy in a heating station while: maintaining the pressure between the outer surface of the article and the forming material to the pressure below atmospheric pressure; and pressurizing at least a portion of the heating station containing the sealed article to a pressure above atmospheric pressure. The method also includes, subsequent to the exposing the sealed article to thermal energy, positioning the sealed article in a cooling station while maintaining the pressure between the outer surface of the article and the forming material to the pressure below atmospheric pressure.

As discussed above, the fibers, yarns and textiles described herein can include the selective incorporation of a low processing temperature polymeric composition and/or the selective incorporation of a high processing temperature polymeric composition. In aspects, such low processing temperature polymeric compositions can be present in the form of fibers comprising the low processing temperature polymeric composition. In some aspects, the fibers comprising the low processing temperature polymeric composition are essentially free of a high processing temperature polymeric composition. In other aspects, the fibers comprising the low processing temperature polymeric composition consist essentially of the low processing temperature polymeric composition. These fibers can be used to form yarns which in turn can be used to form textiles, including knit, woven or braided textiles, in accordance with the present disclosure. These fibers can also be used to form non-woven textiles in accordance with the present disclosure.

Similarly, the high processing temperature polymeric compositions described above can be present in the form of fibers comprising the high processing temperature polymeric composition. In some aspects, the fibers comprising the high processing temperature polymeric composition are essentially free of a low processing temperature polymeric composition. In other aspects, the fibers comprising the high processing temperature polymeric composition consist essentially of the high processing temperature polymeric composition. These fibers can be used to form yarns which in turn can be used to form textiles, including knit, woven or braided textiles, in accordance with the present disclosure. These fibers can also be used to form non-woven textiles in accordance with the present disclosure.

In some aspects, the fibers and/or yarns comprising the low processing temperature polymeric composition can further comprise a high processing temperature polymeric composition. For example, the fibers can be bi-component fibers having the low processing temperature polymeric composition present on at least a portion of an external surface of the fibers. For example, the low and high processing temperature compositions can have a side-by-side structure, or can have a core-and-sheath structure, with the low processing temperature composition present in the sheath. In certain aspects, the low processing temperature polymeric composition, the high processing temperature polymeric composition, or both, can also include one or more conventional additives found in yarns or fibers that comprise polymeric materials. While the foregoing may only describe the properties and parameters of a yarn or yarn composition it should be understood that such properties and parameters also apply to a fiber or fiber composition, unless otherwise mentioned.

In certain aspects, one or more of the yarns can be mono-filament yarns or multi-filament yarns. In certain aspects, the yarns can be spun yarns. In various aspects, one or more of the yarns can be formed using conventional techniques including, but not limited to, melt-spinning, solution spinning, or electrospinning.

In certain aspects, the fibers described herein can be fibers of varying sizes, including fibers that are not suitable for spinning into spinning into commercial yarns. The yarns described herein include yarns that are suitable for use in a commercial knitting machine as well as yarns that are not individually suitable for use in a commercial knitting machine.

In certain aspects, the yarns and/or fibers described herein can be used to provide a specific functionality. For example in certain aspects, a yarn comprising the low processing temperature polymeric composition can be thermoformed to form a film having water-proof or water-resistant properties. In such aspects, a film on the outer surface of an article could be provided by utilizing yarns and or fibers comprising the low processing temperature polymeric material on an outer portion of a textile, including a knit structure forming a textile.

As discussed above, in certain aspects, one or more of the yarns and/or fibers may be dyed, e.g., for aesthetic purposes. In various aspects, the yarns and/or fibers can be dyed using conventional dyeing techniques, such as package dyeing or solution dyeing. Generally, package dyeing is a process that is performed on already formed yarns and/or fibers, while solution dyeing dyes the fibers prior to forming the fibers into yarn. In certain aspects, a yarn or fiber that comprises the high processing temperature polymeric composition may be dyed. In certain aspects, a yarn or fiber that comprises the low processing temperature polymeric composition may not be dyed, and may be formed from a polymeric composition that is essentially free of pigments or dyes, which may result in a the region comprising the low processing temperature composition being clear or nearly transparent (e.g., the non-yarn or non-fiber material upon thermoforming).

In certain aspects, a yarn comprising the low processing temperature polymeric composition can exhibit a tenacity of from about 1 gram/denier to about 5 grams/denier. In one or more aspects, a yarn comprising the low processing temperature polymeric composition can exhibit a tenacity of from about 1.5 grams/denier to about 4.5 grams/denier. In one aspect, a yarn comprising the low processing temperature polymeric composition can exhibit a tenacity of from about 2 grams/denier to about 4.5 grams/denier. "Tenacity" as used herein refers to a respective testing method described below in the Property Analysis And Characterization Procedures section.

In various aspects, a yarn comprising the low processing temperature polymeric composition can exhibit an elongation of from about 10% to about 130%. In one or more aspects, a yarn comprising the low processing temperature polymeric composition can exhibit an elongation of from about 20% to about 130%. In one aspect, a yarn comprising the low processing temperature polymeric composition can exhibit an elongation of from about 40% to about 130%. The term "elongation" as used herein refers to a respective testing method described below in the Property Analysis And Characterization Procedures section.

As discussed above, in certain aspects, it may be desired to utilize a yarn that is suitable for use on commercial knitting equipment. A free-standing shrinkage of a yarn at 50° C. is one property that may be predictive of a suitable yarn for use on a commercial knitting machine. In certain aspects, a yarn comprising the low processing temperature polymeric composition can exhibit a free-standing shrinkage when heated from 20° C. to 50° C. of from about 0% to about 60%. In one or more aspects, a yarn comprising the low processing temperature polymeric composition can exhibit a free-standing shrinkage when heated from 20° C. to 50° C. of from about 0% to about 30%. In one aspect, a yarn comprising the low processing temperature polymeric composition can exhibit a free-standing shrinkage when heated from 20° C. to 50° C. of from about 0% to about 20%. The term "free-standing shrinkage" as used herein refers to a respective testing method described below in the Property Analysis And Characterization Procedures section.

In one or more aspects, the free-standing shrinkage of a yarn at 70° C. may be a useful indicator of the ability of a yarn to be exposed to certain environmental conditions without any substantial changes to the physical structure of the yarn. In certain aspects, a yarn comprising the low processing temperature polymeric composition can exhibit a free-standing shrinkage when heated from 20° C. to 70° C. of from about 0% to about 60%. In one or more aspects, a yarn comprising the low processing temperature polymeric composition can exhibit a free-standing shrinkage when heated from 20° C. to 70° C. of from about 0% to about 30%. In one aspect, a yarn comprising the low processing temperature polymeric composition can exhibit a free-standing shrinkage when heated from 20° C. to 70° C. of from about 0% to about 20%.

In one or more aspects, a yarn comprising the low processing temperature polymeric composition can exhibit a modulus of from about 1 Mpa to about 500 MPa. In certain aspects, a yarn comprising the low processing temperature polymeric composition can exhibit a modulus of from about 5 Mpa to about 150 MPa. In one aspect, a yarn comprising the low processing temperature polymeric composition can exhibit a modulus of from about 20 Mpa to about 130 MPa. In another aspect, a yarn comprising the low processing temperature polymeric composition can exhibit a modulus of from about 30 MPa to about 120 MPa. In yet another aspect, a yarn comprising the low processing temperature polymeric composition can exhibit a modulus of from about 40 MPa to about 110 MPa. The term "modulus" as used herein refers to a respective testing method described below in the Property Analysis And Characterization Procedures section.

In one or more aspects, when present in plaque form, the low processing temperature polymeric composition can exhibit a modulus of from about 1 Mpa to about 500 MPa. In certain aspects, in plaque form, the low processing temperature polymeric composition can exhibit a modulus of from about 5 Mpa to about 150 MPa. In one aspect, in plaque form, the low processing temperature polymeric composition can exhibit a modulus of from about 20 Mpa to about 130 MPa. In another aspect, in plaque form, the low processing temperature polymeric composition can exhibit a modulus of from about 30 MPa to about 120 MPa. In yet another aspect, in plaque form, the low processing temperature polymeric composition can exhibit a modulus of from about 40 MPa to about 110 MPa.

In one or more aspects, when a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (e.g., non-yarn material) can exhibit a modulus of from about 1 Mpa to about 500 MPa. In aspects, when a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (e.g., non-yarn material) can exhibit a modulus of from about 5 Mpa to about 150 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (e.g., non-yarn material) can exhibit a modulus of from about 20 Mpa to about 130 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (e.g., non-yarn material) can exhibit a modulus of from about 30 Mpa to about 120 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (e.g., non-yarn material) can exhibit a modulus of from about 40 Mpa to about 110 MPa.

In various aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (or non-yarn material) exhibits a cold ross flex of from about 5000 cycles to about 500,000 cycles. In one or more aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (or non-yarn material) exhibits a cold ross flex of from about 10,000 cycles to about 300,000 cycles. In certain aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 ATM of pressure, the resulting thermoformed material (or non-yarn material) exhibits a cold ross flex of at least about 150,000 cycles. The term "cold Ross flex" as used herein refers to a respective testing method described below in the Property Analysis And Characterization Procedures section.

In certain aspects, as discussed in detail below, an anchor yarn may be used to aid in restricting the flow of a melted material, e.g., a low processing temperature polymeric composition, during the thermoforming process and/or to impart some flexibility to the thermoformed material. In such aspects, the anchor yarn may exhibit an elongation that is less than the elongation of the low processing temperature polymeric composition, such as a yarn comprising the low processing temperature polymeric composition or a non-yarn material produced by thermoforming such a yarn. For example, in aspects, the anchor yarn may exhibit an elongation that is at least about 10% less than the elongation of a yarn comprising the low processing temperature polymeric composition or a non-yarn material produced by thermoforming a yarn comprising the low processing temperature polymeric composition. In one aspect, the anchor yarn may exhibit an elongation that at least about 25% less than the elongation of a yarn comprising the low processing temperature polymeric composition or a non-yarn material produced by thermoforming a yarn comprising the low processing temperature polymeric composition. In another aspect, the anchor yarn may exhibit an elongation that at least about 50% less than the elongation of a yarn comprising the low processing temperature polymeric composition or a non-yarn material produced by thermoforming a yarn comprising the low processing temperature polymeric composition. In yet another aspect, the anchor yarn may exhibit an elongation that at least about 75% less than the elongation of a yarn comprising the low processing temperature polymeric composition or a non-yarn material produced by thermoforming a yarn comprising the low processing temperature polymeric composition. Exemplary anchor yarns include polyamide yarns, polyolefin yarns, and polyester yarns, including yarns having tenacities of from about 5 grams per denier to about 10 grams per denier.

The anchor yarn can be formed of a high processing temperature polymeric composition comprising one or more polymers. The one or more polymers of the anchor yarn high processing temperature polymeric composition can be thermoplastic polymers. In certain aspects, the one or more polymers of the high processing temperature polymeric composition of the anchor yarn can be the same one or more polymers of the high processing temperature polymeric composition forming a second yarn used in a textile including the anchor yarn. In other aspects, the one or more polymers of the high processing temperature polymeric composition of the anchor yarn are different from the one or more polymers of the high processing temperature polymeric composition forming a second yarn used in a textile including the anchor yarn.

As discussed above, in certain aspects, the low processing temperature polymeric compositions and the high processing temperature polymeric compositions have differing properties. In various aspects, these differing properties allow for the low processing temperature polymeric composition, during a thermoforming process, to melt and flow, and subsequently cool and solidify into a different structure than that prior to the thermoforming process (e.g., thermoform from a yarn to a non-yarn material), while the high processing temperature polymeric composition may not deform or melt during such a process and can maintain its structure (e.g., as a yarn), when the thermoforming process is conducted at a temperature below the creep relaxation temperature, the heat deflection temperature, or the Vicat softening temperature of the high processing temperature polymeric composition. In such aspects, the non-yarn material formed from the low processing temperature composition during the thermoforming process can be integrally connected to the non-altered structure (e.g., a yarn or fiber), which can provide three-dimensional structure and/or other properties targeted to specific spots on an article of wear.

Low Processing Temperature Polymeric Compositions

As discussed above, in certain aspects, the low processing temperature polymeric composition comprises one or more first thermoplastic polymers, and can exhibit a melting temperature $T_m$ (or melting point) that is below at least one of the heat deflection temperature $T_{hd}$, the Vicat softening temperature $T_{vs}$, the creep relaxation temperature $T_{cr}$, or the melting temperature $T_m$ of a high processing temperature polymeric composition. In the same or alternative aspects, the low processing temperature polymeric composition can exhibit one or more of a melting temperature $T_m$, a heat deflection temperature $T_{hd}$, a Vicat softening temperature $T_{vs}$, and a creep relaxation temperature $T_{cr}$ that is below one or more of the heat deflection temperature $T_{hd}$, the Vicat softening temperature $T_{vs}$, the creep relaxation temperature $T_{cr}$, or the melting temperature $T_m$ of the high processing temperature polymeric composition. The "creep relaxation temperature $T_{cr}$", the "Vicat softening temperature $T_{vs}$", the "heat deflection temperature $T_{hd}$", and the "melting temperature $T_m$" as used herein refer to the respective testing methods described below in the Property Analysis And Characterization Procedures section.

In certain aspects, the low processing temperature polymeric composition can exhibit a melting temperature $T_m$ (or melting point) that is about 135° C. or less. In one aspect, the low processing temperature polymeric composition can exhibit a melting temperature $T_m$ that is about 125° C. or less. In another aspect, the low processing temperature polymeric composition can exhibit a melting temperature $T_m$ that is about 120° C. or less. In certain aspects, the low processing temperature polymeric composition can exhibit a melting temperature $T_m$ that is from about 80° C. to about 135° C. In various aspects, the low processing temperature polymeric composition can exhibit a melting temperature $T_m$ that is from about 90° C. to about 120° C. In one aspect, the low processing temperature polymeric composition can exhibit a melting temperature $T_m$ that is from about 100° C. to about 120° C.

In one or more aspects, the low processing temperature polymeric composition can exhibit a glass transition temperature $T_g$ of about 50° C. or less. In one aspect, the low processing temperature polymeric composition can exhibit a glass transition temperature $T_g$ of about 25° C. or less. In another aspect, the low processing temperature polymeric composition can exhibit a glass transition temperature $T_g$ of about 0° C. or less. In various aspects, the low processing temperature polymeric composition can exhibit a glass transition temperature $T_g$ of from about −55° C. to about 55° C. In one aspect, the low processing temperature polymeric composition can exhibit a glass transition temperature $T_g$ of from about −50° C. to about 0° C. In certain aspects, the low processing temperature polymeric composition can exhibit a glass transition temperature $T_g$ of from about −30° C. to about −5° C. The term "glass transition temperature $T_g$" as used herein refers to a respective testing method described below in the Property Analysis And Characterization Procedures section.

In various aspects, the low processing temperature polymeric composition can exhibit a melt flow index, using a test weight of 2.16 kilograms, of from about 0.1 grams/10 minutes (min.) to about 60 grams/10 min. In certain aspects, the low processing temperature polymeric composition can exhibit a melt flow index, using a test weight of 2.16 kilograms, of from about 2 grams/10 min. to about 50 grams/10 min. In another aspect, the low processing temperature polymeric composition can exhibit a melt flow index, using a test weight of 2.16 kilograms, of from about 5 grams/10 min to about 40 grams/10 min. In certain aspects, the low processing temperature polymeric composition can exhibit a melt flow index, using a test weight of 2.16 kilograms, of about 25 grams/10 min. The term "melt flow index" as used herein refers to a respective testing method described below in the Property Analysis And Characterization Procedures section.

In one or more aspects, the low processing temperature polymeric composition can exhibit an enthalpy of melting of from about 8 J/g to about 45 J/g. In certain aspects, the low processing temperature polymeric composition can exhibit an enthalpy of melting of from about 10 J/g to about 30 J/g. In one aspect, the low processing temperature polymeric composition can exhibit an enthalpy of melting of from about 15 J/g to about 25 J/g. The term "enthalpy of melting" as used herein refers to a respective testing method described below in the Property Analysis And Characterization Procedures section.

As previously stated, the low processing temperature polymeric composition comprises one or more thermoplastic polymers. In various aspects, the thermoplastic polymers can include one or more polymers selected from the group consisting of polyesters, polyethers, polyamides, polyurethanes and polyolefins. In aspects, the thermoplastic polymers can include one or more polymers selected from the group consisting of polyesters, polyethers, polyamides, polyurethanes, and combinations thereof.

In one or more aspects, the thermoplastic polymers can include one or more polyesters. In such aspects, the polyesters can include polyethylene terephthalate (PET). In certain aspects, the thermoplastic polymers can include one or more polyamides. In such aspects, the polyamides can include poly(hexamethylene adipamide) (nylon 6,6), polycaprolactam (nylon 6), polylaurolactam (nylon 12), and combinations thereof. In aspects, the thermoplastic polymers can include one or more polyurethanes.

In various aspects, the thermoplastic polymers can include one or more co-polymers. In certain aspects, the thermoplastic polymers can include one or more co-polymers selected from the group consisting of co-polyesters, co-polyethers, co-polyamides, co-polyurethanes, and combinations thereof. In one or more aspects, the thermoplastic polymers can include one or more co-polyesters. In certain aspects, the thermoplastic polymers can include one or more co-polyethers. In aspects, the thermoplastic polymers can include one or more co-polyamides. In certain aspects, the thermoplastic polymers can include one or more co-polyurethanes. In one aspect, the thermoplastic polymers can include one or more polyether block amide (PEBA) co-polymers. Exemplary thermoplastic polymers are described in detail below.

Exemplary Thermoplastic Polymers

In aspects, exemplary thermoplastic polymers include homo-polymers and co-polymers. In certain aspects, the thermoplastic polymer can be a random co-polymer. In one aspect, the thermoplastic polymer can be a block co-polymer. For example, the thermoplastic polymer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment may be referred to as being a particular type of polymeric segment such as, for example, an isocyante segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can may contain up to 10 mol % of segments of other chemical structures. For example, as used herein, a polyether segment is understood to include up to 10 mol % of non-polyether segments.

In various aspects the thermoplastic polymer can include one or more of a thermoplastic polyurethane, a thermoplastic polyamide, a thermoplastic polyester, and a thermoplastic polyolefin. It should be understood that other thermoplastic polymeric materials not specifically described below are also contemplated for use in the low processing temperature polymeric composition and/or the high processing temperature polymeric composition.

In certain aspects, the thermoplastic polymer can be a thermoplastic polyurethane. In aspects, the thermoplastic polyurethane can be a thermoplastic block polyurethane co-polymer. In such aspects, the thermoplastic block polyurethane co-polymer can be a block copolymer having blocks of hard segments and blocks of soft segments. In aspects, the hard segments can comprise or consist of isocyanate segments. In the same or alternative aspects, the soft segments can comprise or consist of polyether segments, or polyester segments, or a combination of polyether segments and polyester segments. In a particular aspect, the thermoplastic material can comprise or consist essentially of an elastomeric thermoplastic polyurethane having repeating blocks of hard segments and repeating blocks of soft segments.

In aspects, one or more of the thermoplastic polyurethanes can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

(Formula 1)

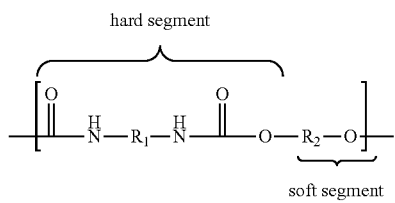

In these embodiments, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender. As with each $R_1$ and $R_3$, each $R_3$ independently is an aliphatic or aromatic segment.

(Formula 2)

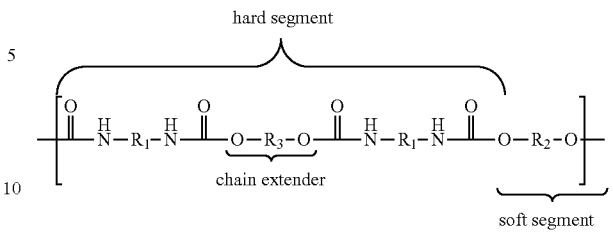

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5% to 85% by weight, from 5% to 70% by weight, or from 10% to 50% by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butyl ene diisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane copolymer chains are produced from diisocynates including HMDI, TDI, MDI, $H_{12}$ aliphatics, and combinations thereof.

In certain aspects, polyurethane chains which are cross-linked (e.g., partially crosslinked polyurethane copolymers which retain thermoplastic properties) or which can be crosslinked, can be used in accordance with the present disclosure. It is possible to produce crosslinked or crosslinkable polyurethane copolymer chains using multi-functional isocyantes. Examples of suitable triisocyanates for producing the polyurethane copolymer chains include TDI, HDI, and HMI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5% to 85% by weight, from 5% to 70% by weight, or from 10% to 50% by weight, based on the total weight of the reactant monomers.

Optionally, in some examples, the thermoplastic polyurethane of the present disclosure can be a thermoplastic polyurethane having relatively greater degree of hydrophilicity. For example, the thermoplastic polyurethane can be a thermoplastic polyurethane in which segment $R_2$ in Formulas 1 and 2 includes a polyether group, a polyester group, a polycarbonate group, an aliphatic group, or an aromatic group, wherein the aliphatic group or aromatic group is substituted with one or more pendant group having relatively greater degree of hydrophilicity (i.e., relatively "hydrophilic" groups). The relatively "hydrophilic" groups can be selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In such examples, this relatively hydrophilic group or segment of $R_2$ can form portions of the polyurethane backbone, or can be grafted to the polyurethane backbone as a pendant group. In some examples, the pendant hydrophilic group or segment can be bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various of the thermoplastic polyurethane, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples of the thermoplastic polyurethane, at least one $R_2$ segment can include an aliphatic group substituted with one or more groups having a relatively greater degree of hydrophilicity, i.e., a relatively "hydrophilic" group. The one or more relatively hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more relatively hydrophilic group. The one or more hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterionic (e.g., a betaine, such as poly(carboxybetaine (pCB) and ammonium phosphonate groups such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups, and combinations thereof.

In various aspects, the aliphatic and aromatic groups may be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly(carboxybetaine (pCB) and ammonium phosphonate groups such as a phosphatidylcholine group).

In some aspects, the $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

(Formula 3)

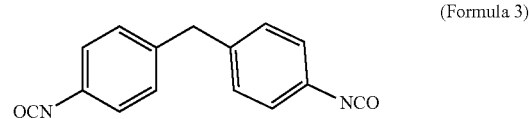

In some exemplary aspects, the pendant hydrophilic group is a polyethylene oxide group and the linking group is MDI, as shown below.

(Formula 4)

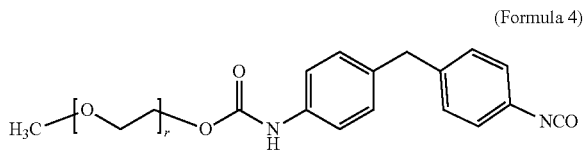

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

(Formula 5)

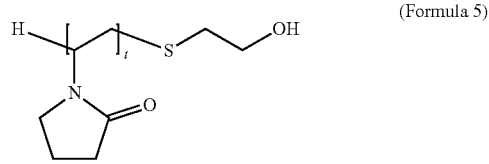

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

butylene, pentylene, hexylene, heptylene, octylene, nonylene, or decylene group). In other cases, each $R^5$ is a polyether group (e.g., a polyethylene, polypropylene, or polybutylene group). In various cases, each R5 is a polyurethane group.

Optionally, in some aspects, the polyurethane can include an at least partially crosslinked polymeric network that includes copolymer chains that are derivatives of polyurethane. In such cases, it is understood that the level of (Formula 6)

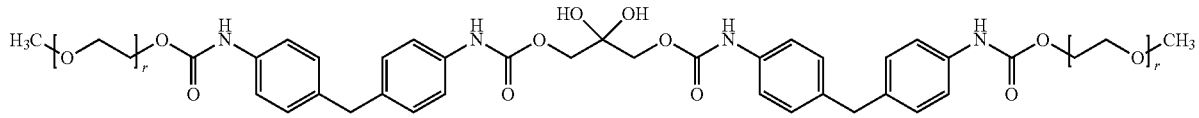

(Formula 7)

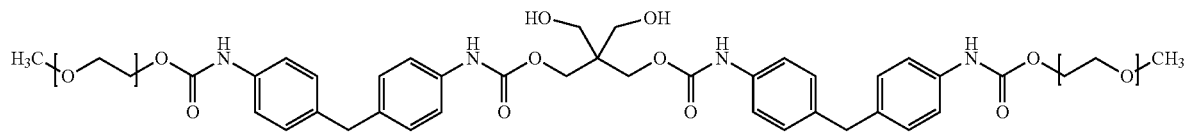

(Formula 8)

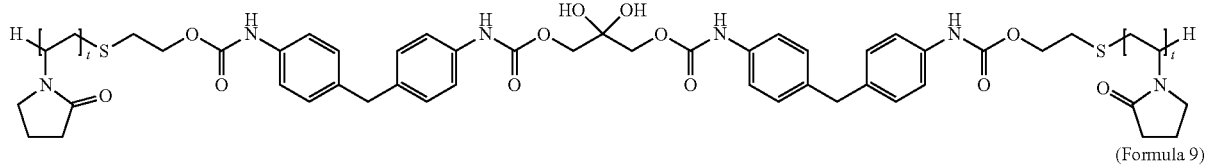

(Formula 9)

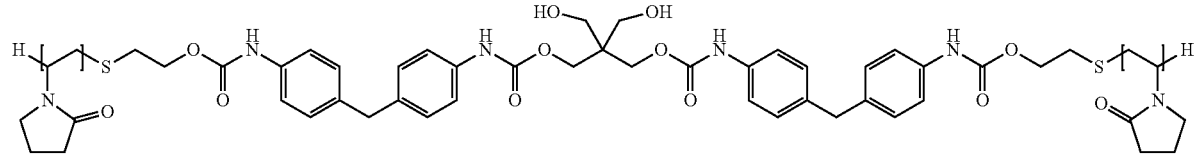

In various cases, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

(Formula 10)

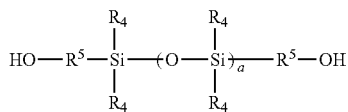

wherein:
a is 1 to 10 or larger (e.g., 1, 2, 3, 4, 5, 6, 7, 8, 9, or 10);
each $R_4$ independently is hydrogen, $C_{1-18}$ alkyl, $C_{2-18}$ alkenyl, aryl, or polyether; and
each $R_5$ independently is $C_{1-10}$ alkylene, polyether, or polyurethane.

In some aspects, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

In various cases, each $R^5$ independently includes a $C_{1-10}$ alkylene group (e.g., a methylene, ethylene, propylene, crosslinking is such that the polyurethane retains thermoplastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

(Formula 11)

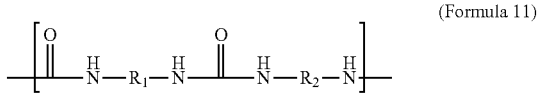

(Formula 12)

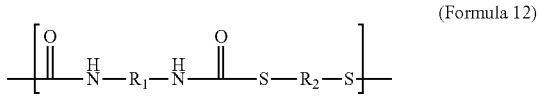

wherein the variables are as described above. Additionally, the isocyanates can also be chain extended with one or more polyamino or polythiol chain extenders to bridge two or more isocyanates, such as previously described for the polyurethanes of Formula 2.

In some aspects, the thermoplastic polyurethane is composed of MDI, PTMO, and 1,4-butylene glycol, as described in U.S. Pat. No. 4,523,005.

As described herein, the thermoplastic polyurethane can be physically crosslinked through e.g., nonpolar or polar interactions between the urethane or carbamate groups on the polymers (the hard segments). In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Commercially available thermoplastic polyurethanes having greater hydrophilicity suitable for the present use include, but are not limited to those under the tradename "TECOPHILIC", such as TG-500, TG-2000, SP-80A-150, SP-93A-100, SP-60D-60 (Lubrizol, Countryside, IL), "ESTANE" (e.g., ALR G 500, or 58213; Lubrizol, Countryside, IL).

In various aspects, the thermoplastic polyurethane can be partially covalently crosslinked, as previously described herein.

In various aspects, the thermoplastic polymers can comprise a thermoplastic polyamide. The thermoplastic polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

In aspects, the thermoplastic polymers can be a block co-polyamide. For example, the block co-polyamide can have repeating blocks of hard segments, and repeating blocks soft segments. The hard segments can comprise polyamide segments, and the soft segments can comprise non-polyamide segments. The thermoplastic polymers can be an elastomeric thermoplastic co-polyamide comprising or consisting of block co-polyamides having repeating blocks of hard segments and repeating blocks of soft segments. In block co-polymers, including block co-polymers having repeating hard segments and soft segments, physical crosslinks can be present within the blocks or between the blocks or both within and between the blocks.

The thermoplastic polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The thermoplastic copolyamide can be formed from the polycodensation of a polyamide oligomer or prepolymer with a second oligomer prepolymer to form a block copolyamide (i.e., a block co-polymer including polyamide segments. Optionally, the second prepolymer can be a hydrophilic prepolymer.

In some aspects, the thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the thermoplastic polyamide can be the same or different.

In some aspects, the thermoplastic polyamide or the polyamide segment of the thermopolastic copolyamide is derived from the polycondensation of lactams and/or amino acids, and includes an amide segment having a structure shown in Formula 13, below, wherein $R_6$ is the segment of the polyamide derived from the lactam or amino acid.

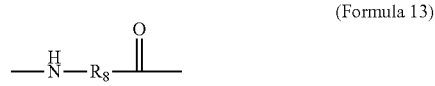

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{5-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the thermoplastic copolyamide, Formula 13 can include a polyamide-polyether block copolymer segment, as shown below:

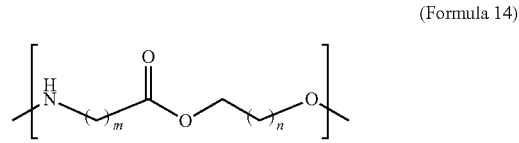

(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the thermoplastic polyamide or the polyamide segment of the thermoplastic co-polyamide is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

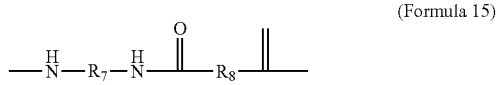

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine (TMD), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the copolymer chains are substantially free of aromatic groups.

In some aspects, each polyamide segment of the thermoplastic polyamide (including the thermoplastice copolyamide) is independently derived from a polyamide prepolymer selected from the group consisting of 12-aminolauric acid, caprolactam, hexamethylene diamine and adipic acid.

In some aspects, the thermoplastic polyamide comprises or consists of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 16. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof. The number average molecular weight of the polyether block can range from about 400 g/mol to 3000 g/mol. The number average molecular weight of the polyamide (PA) block can range from about 500 g/mol to 5000 g/mol. In particular examples, the polyether (PE) content (x) of the thermoplastic poly(ether-block-amide copolymer can range from about 0.05 to about 0.8 (i.e., from about 5 mol % to about 80 mol %).

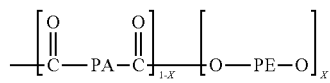

(Formula 16)

In some examples, the thermoplastic polyamide is physically crosslinked through, e.g., nonpolar or polar interactions between the polyamide groups of the polymers. In examples where the thermoplastic polyamide is a thermoplastic copolyamide, the thermoplastic copolyamide can be physically crosslinked through interactions between the polyamide groups, an optionally by interactions between the copolymer groups. When the thermoplastic copolyamide is physically crosslinked thorough interactions between the polyamide groups, the polyamide segments can form the portion of the polymer referred to as the "hard segment", and copolymer segments can form the portion of the polymer referred to as the "soft segment". For example, when the thermoplastic copolyamide is a thermoplastic poly(ether-block-amide), the polyamide segments form the hard segment portion of the polymer, and polyether segments can form the soft segment portion of the polymer. Therefore, in some examples, the thermoplastic polymer can include a physically crosslinked polymeric network having one or more polymer chains with amide linkages.

In some aspects, the polyamide segment of the thermoplastic co-polyamide includes polyamide-11 or polyamide-12 and the polyether segment is a segment selected from the group consisting of polyethylene oxide, polypropylene oxide, and polytetramethylene oxide segments, and combinations thereof. Commercially available thermoplastic polyamides suitable for the present use include those under the tradename "PLATAMID" (e.g., H2694); and "PEBAX" (e.g., "PEBAX MH1657" and "PEBAX MV1074") both from Arkema, Inc., Clear Lake, TX, and "SERENE" coating (Sumedics, Eden Prairie, MN).

Optionally, the thermoplastic polyamide can be partially covalently crosslinked, as previously described herein. In such cases, it is to be understood that the degree of crosslinking present in the thermoplastic polyamide is such that, when it is thermally processed in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies.

In aspects, the thermoplastic polymers can comprise a thermoplastic polyester. The thermoplastic polyester can be formed from the polycondensation of a carboxylic acid and a diol. The thermoplastic polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

The thermoplastic polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the thermoplastic polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical crosslinks can be present within the blocks or between the blocks or both within and between the blocks. In a particular example, the thermoplastic material can comprise or consist essentially of an elastomeric thermoplastic co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The thermoplastic copolyester can be formed from the polycodensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly (3-hydroxybutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the thermoplastic polymers can comprise or consist essentially of a thermoplastic polyolefin. The thermoplastic polyolefin can be formed through free radical, cationic, and/or anionic polymerization by methods well known to those skilled in the art (e.g., using a peroxide initiator, heat, and/or light). Exemplary examples of thermoplastic polyolefins can include polyethylene, polypropylene, and thermoplastic olefin elastomers.

High Processing Temperature Polymeric Compositions

As discussed above, the low processing temperature polymeric compositions and the high processing temperature polymeric compositions have differing properties. For example, the high processing temperature polymeric composition can exhibit at least one of a creep relaxation temperature $T_{cr}$, a Vicat softening temperature $T_{vs}$, a heat deflection temperature $T_{hd}$, or a melting temperature $T_m$ that is greater than the melting temperature $T_m$ of a low processing temperature polymeric composition. When thermoforming a textile that includes the low processing temperature polymeric composition and the high processing temperature polymeric composition, in accordance with the present disclosure, the thermoforming is conducted under conditions such that the high processing temperature polymeric composition does not melt or deform while the low processing temperature polymeric composition does melt.

In one or more aspects, the high processing temperature polymeric composition exhibits a melting temperature $T_m$ that is at least about 10° C. greater than the melting temperature $T_m$ of a low processing temperature polymeric composition. In another aspect, the high processing temperature polymeric composition exhibits a melting temperature $T_m$ that is at least about 20° C. greater than the melting temperature $T_m$ of a low processing temperature polymeric composition. In certain aspects, the high processing temperature polymeric composition exhibits a melting temperature $T_m$ that is at least about 40° C. greater than the melting temperature $T_m$ of a low processing temperature polymeric composition.

In various aspects, the high processing temperature polymeric composition exhibits a melting temperature $T_m$ from about 140° C. to about 500° C. In one or more aspects, the high processing temperature polymeric composition exhibits a melting temperature $T_m$ from about 140° C. to about 400° C. In certain aspects, the high processing temperature polymeric composition exhibits a melting temperature $T_m$ from about 140° C. to about 300° C.

In certain aspects, the high processing temperature polymeric composition exhibits a creep relaxation temperature $T_{cr}$ that is at least about 10° C. greater than the melting temperature $T_m$ of a low processing temperature polymeric composition. In one or more aspects, the high processing temperature polymeric composition exhibits a creep relaxation temperature $T_{cr}$ that is at least about 30° C. greater than a melting temperature $T_m$ of the low processing temperature polymeric composition. In one aspect, the high processing temperature polymeric composition exhibits a creep relaxation temperature $T_{cr}$ that is at least about 50° C. greater than a melting temperature $T_m$ of the low processing temperature polymeric composition.

In certain aspects, the high processing temperature polymeric composition exhibits a Vicat softening temperature $T_{vs}$ that is at least about 10° C. greater than the melting temperature $T_m$ of a low processing temperature polymeric composition. In one or more aspects, the high processing temperature polymeric composition exhibits a Vicat softening temperature $T_{vs}$ that is at least about 30° C. greater than the melting temperature $T_m$ of a low processing temperature polymeric composition. In one aspect, the high processing temperature polymeric composition exhibits a Vicat softening temperature $T_{vs}$ that is at least about 50° C. greater than the melting temperature $T_m$ of the low processing temperature polymeric composition.

In certain aspects, the high processing temperature polymeric composition exhibits a heat deflection temperature $T_{hd}$ that is at least about 10° C. greater than the melting temperature $T_m$ of a low processing temperature polymeric composition. In various aspects, the high processing temperature polymeric composition exhibits a heat deflection temperature $T_{hd}$ that is at least about 30° C. greater than the melting temperature $T_m$ of a low processing temperature polymeric composition. In one aspect, the high processing temperature polymeric composition exhibits a heat deflection temperature $T_{hd}$ that is at least about 50° C. greater than the melting temperature $T_m$ of a low processing temperature polymeric composition.

As stated above, the high processing temperature polymeric composition comprises one or more second thermoplastic polymers. The one or more second thermoplastic polymers of the high processing temperature polymeric composition can be a thermoplastic polymer as described above as an Exemplary Thermoplastic Polymer, with the understanding that the one or more second thermoplastic polymers differ from the one or more first thermoplastic polymers of the low processing temperature polymeric composition based on melting temperature $T_m$. The high processing temperature polymeric composition includes one or more second thermoplastic polymer having a sufficiently high melting temperature $T_m$ which are present in the composition in a sufficiently high concentration such that the creep relaxation temperature $T_{cr}$, the heat deflection temperature $T_{hd}$, or the Vicat softening temperature $T_{vs}$ of the high processing temperature polymeric composition is greater than a melting temperature $T_m$ of the low melting temperature polymeric composition, In one aspect, the one or more second thermoplastic polymers can include one or more polymers selected from the group consisting of polyesters, polyethers, polyamides, polyurethanes and polyolefins. In certain aspects, the thermoplastic polymers can include one or more thermoplastic polymers selected from the group consisting of thermoplastic polyesters, polyethers, polyamides, and combinations thereof. In aspects, the thermoplastic polymers can include one or more thermoplastic polymers selected from the group consisting of thermoplastic polyesters, polyamides, and combinations thereof.

In various aspects, the thermoplastic polymers can include one or more thermoplastic polyesters. In such aspects, the thermoplastic polyesters can include polyethylene terephthalate (PET). In certain aspects, the thermoplastic polymers can include one or more thermoplastic polyamides. In such aspects, the thermoplastic polyamides can include poly(hexamethylene adipamide) (nylon 6,6), polycaprolactam (nylon 6), polylaurolactam (nylon 12), and combinations thereof. In one aspect, the thermoplastic polymers can include one or more thermoplastic polyurethanes.

In various aspects, the thermoplastic polymers can include one or more co-polymers. In aspects, the thermoplastic polymers can include one or more co-polymers selected from the group consisting of co-polyesters, co-polyethers, co-polyamides, co-polyurethanes, and combinations thereof. In one aspect, the thermoplastic polymers can include one or more co-polyesters. In certain aspects, the thermoplastic polymers can include one or more co-polyethers. In aspects, the thermoplastic polymers can include one or more co-polyamides. In various aspects, the thermoplastic polymers can include one or more co-polyurethanes. In one aspect, the thermoplastic polymers can include one or more polyether block amide (PEBA) co-polymers. In aspects, the copolymers can include relatively harder polymeric segments copolymerized with relatively softer polymeric segments.

Anchor Yarn Composition

As discussed above, an anchor yarn may be used to aid in restricting the flow of a melted material, e.g., a low processing temperature polymeric composition, during the thermoforming process and/or to impart some flexibility to the thermoformed material. In such aspects, the anchor yarn may not melt or deform during the thermoforming process. As such, in certain aspects, the anchor yarn can comprise an anchor yarn composition comprising one or more third thermoplastic polymers such that the anchor yarn composition exhibits at least one of a creep relaxation temperature $T_{cr}$, a Vicat softening temperature $T_{vs}$, a heat deflection temperature $T_{hd}$, or a melting temperature $T_m$ that is greater than the melting temperature $T_m$ of a low processing temperature polymeric composition. In certain aspects, the anchor yarn composition can have the specific ranges associated with these properties discussed above with respect to the high processing temperature polymeric composition. In certain aspects, the anchor yarn can be formed of a high processing temperature polymeric compositions, and thus can comprise any of the thermoplastic polymers discussed above with reference to the high processing temperature polymeric composition.

Exemplary Aspects of Articles of Wear and Textiles

As discussed above, certain aspects are directed to one or more textiles that include fibers and/or yarns comprising the low processing temperature polymeric composition and the high processing temperature polymeric composition. In aspects, such textiles can form at least a portion of an article of wear.

Turning now to the Figures, and FIGS. 1A and 1B in particular, an article of footwear 100 is depicted as one exemplary article of wear. While FIGS. 1A and 1B depict an article of footwear 100, it should be understood that other articles of wear are also contemplated by the present disclosure. A non-limiting list of articles of wear contemplated by the present disclosure includes footwear, shirts, pants, socks, jackets or other outerwear, protective equipment, hats, and undergarments, e.g., brassieres.

The article of footwear 100 of FIGS. 1A and 1B generally can include a ground-facing outsole area 110, an ankle collar area 112, a lateral midfoot area 114a, and a medial midfoot area 114b, a toe box area 116, and a heel area 118. Further, the article of footwear 100 can include a plurality of eyestays 120, a vamp area 122, a tongue area 124, and a throat area 126.

The article of footwear 100 depicted in FIGS. 1A and 1B can include at least one textile 102 that at least partly forms a portion of the article of footwear 100. The textile 102 of the article of footwear 100 can include at least three separate textile zones, e.g., zones 104, 106, and 108, that identify specific functional areas of the article of footwear 100. In certain aspects, these specific functional areas are at least partly associated with the targeted incorporation of specific textile media in varying amounts, techniques, and combinations into these textile zones (illustrated as zones 104, 106, and 108 in FIGS. 1A and 1B). It should be understood that, while the textile 102 includes three specific functional areas, more than three functional areas are also contemplated.

In certain aspects, the textile zone 104 may exhibit a rigid or semi-rigid functionality suitable for use as a ground-facing outsole 110 for the article of footwear 100. Accordingly, in certain aspects, the textile zone 104 can be positioned to include at least a portion of a ground-facing outsole 110 of the article of footwear 100. In certain aspects, the targeted incorporation of the low processing temperature polymeric composition into the textile zone 104 of the textile 102, upon thermoforming, can at least partly provide the rigid or semi-rigid functionality for use as a ground-facing outsole 110. As used herein "thermoforming" refers to a process that can include the melting and/or deforming of the low processing temperature polymeric composition and/or one or more thermoplastic polymers and the subsequent cooling of the melted and/or deformed material to form a plaque or film, which can be rigid or semi-rigid. The thermoforming process is discussed in detail below.

Further, in aspects, another textile zone, such as, for example, textile zone 108, can exhibit flexibility and/or pliability to accommodate movements from a wearer. In certain aspects, the textile zone 108 can include the ankle collar area 112, the tongue area 124, and/or the throat area 126 of the article of footwear 100. In various aspects, the textile zone 108 may include a high processing temperature polymeric composition.

In certain aspects, another textile, such as, for example, zone 106, can be positioned between the textile zones 104 and 108. In certain aspects, the textile zone 106 can include at least a portion of the lateral midfoot region 114a and/or the medial midfoot region 114b on the article of footwear 100. In certain aspects, the textile zone 106 can include a combination of the low processing temperature polymeric composition from the textile zone 104 and the high processing temperature polymeric composition from the textile zone 108. In such aspects, this combination of textile media present in the textile zone 106 allows the textile zone 106 to function as a transition between the rigid or semi-rigid functionality of the textile zone 104 and the flexible pliable functionality of the textile zone 108, allowing for a more gradual transition from rigidness to flexibility of the textile 102.

Further, in such aspects, the textile zone 106 can exhibit rigidity or semi-rigidity to a lesser extent than the textile zone 104, but to a greater extent than the textile zone 108. Also, in the same or alternative aspects, the textile zone 106 can exhibit flexibility to a lesser extent than the textile zone 108, but to a greater extent than the textile zone 104.

Alternatively or additionally, the three textile zones 104, 106 and 108 can be at least partly located within a midfoot region, such as lateral midfoot region 114a and/or medial midfoot region 114b.

In certain aspects in the textile zone 106, the combination of the low processing temperature polymeric composition present in the textile zone 104 and the high processing temperature polymeric composition present in the textile zone 108, when exposed to the thermoforming process, can impart one or more structural properties to the article of footwear 100, such as semi-rigid support in the lateral and/or medial midfoot regions 114a and 114b, and/or three-dimensional shape or structure to one or more portions of the article of footwear 100.

In certain aspects, as can be seen in FIG. 1A, the textile zone 106 extends away from the textile zone 104 towards the eyestays 120. In such aspects, the combination of textile media comprising the low processing temperature polymeric composition and textile media comprising the high processing temperature polymeric composition can allow for the transferring of a force transmitted from the eyestays 120 or other lacing mechanisms into this combination of textile media present in the lateral and/or medial midfoot regions 114a and 114b. In certain aspects, for the successful transfer of the forces transmitted from the eyestays 120, the textile zone 104, and/or the low processing temperature polymeric composition present in the textile zone 104, can terminate to an area 128 that is a distance of at least about 0.5 cm, about 1.0 cm, or about 2.0 cm from the eyestays 120, and/or at least about 3, at least about 4, or at least about 5 needles below the eyestays 120, when the textile 102 is a knitted textile formed on a commercial knitting machine. In such aspects, the flexible and pliable characteristics of the high processing temperature polymeric composition that is present in the zone 108 that is adjacent the eyestays 120 can facilitate in transferring forces transmitted from the eyestays 120 to the textile zone 106 and/or the low processing temperature polymeric composition present in the lateral and/or medial midfoot regions 114a and 114b.

In the aspect depicted in FIGS. 1A and 1B, the textile zone 106 is positioned in the toe box area 116 and the heel area 118. In such aspects, the combination of the low processing temperature polymeric composition and the high processing temperature polymeric composition can provide structure and/or support due to the rigidity provided by the thermoformed material. Further, the thermoformed material can provide abrasion resistance in the toe box area 116 and/or the heel area 118. In alternative aspects, the textile zone 104 can form at least a portion of the toe box area 116 and/or the heel area 118 for increased rigidity or increased abrasion resistance, since the textile zone 104 includes a greater amount, or alternative positioning (e.g., outer knit surface), of the low processing temperature polymeric composition than the textile zone 106.

FIG. 1C depicts an alternative aspect of an article of footwear 100a. In such aspects, the article of footwear 100a can generally include at least three types of textile zones: the textile zone 104a, the textile zone 106a, and the textile zone 108a. In certain aspects, the textile zones 104a, 106a, and 108a can have the same properties and parameters as the textile zones 104, 106, and 108, respectively, of the article of footwear 100 discussed above with reference to FIG. 1A.

In the aspect depicted in FIG. 1C, portions, e.g., portions 104b and 104c, of the textile zone 104a may extend from an outsole area up through a midfoot area 115a and toward a plurality of eyestays 120a. In such aspects, a rigid or semi-rigid functionality provided by the portions 104b and 104c extending from an outsole area through the midfoot area 115a to a plurality of eyestays 120a can provide increased wearer stability in the midfoot area 115a. Further, in aspects, a force applied through one or more of the plurality of eyestays 120a can at least partly be transferred onto the rigid or semi-rigid portions 104b and 104c extending through the midfoot area 115a, and into the rigid or semi-rigid textile zone 104a present in an outsole area, providing increased support and comfort for a wearer.

In certain aspects, in addition to the thermoformed material providing structure, rigidity, strength, and/or support to one or more areas of the article of wear, the thermoformed material can provide a water-proof or water-resistant surface.

Figure 2B:
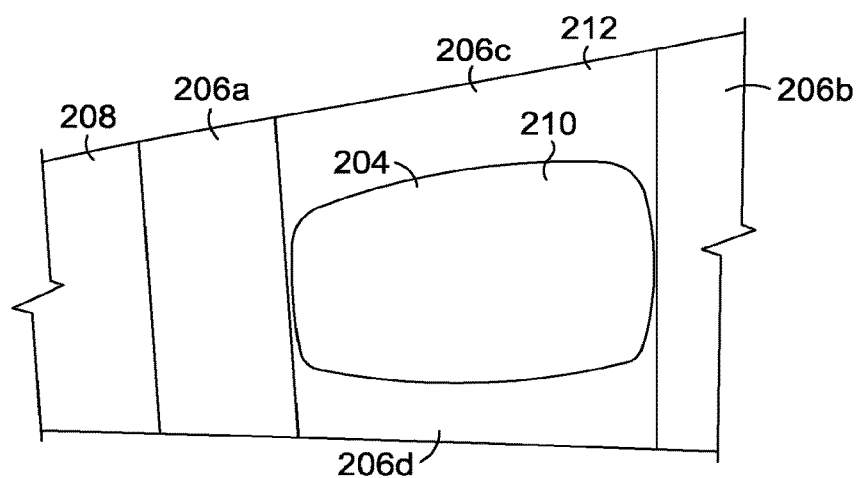
FIG. 2B is a close-up view of the elbow patch of the article of apparel of FIG. 2A, primarily illustrating three different textile zones, in accordance with aspects of the present invention.

FIGS. 2A and 2B depict a shirt 200 as an exemplary article of apparel. The shirt 200 depicted in FIGS. 2A and 2B includes at least one textile 202 that at least partly forms a portion of the shirt 200. As best seen in FIG. 2B, the textile 202 can include three separate textile zones 204, 206a-d, and 208, which can identify specific functional areas of the 200. In certain aspects, these specific functional areas are at least partly associated with the targeted incorporation of specific textile media in varying amounts and combinations into these textile zones 204, 206a-d, and 208.

In certain aspects, the textile zone 204 can include a reinforced area such as an exterior-facing film or patch 210, which can, for example, provide abrasion resistance to an elbow region 212 of the shirt 200. In such aspects, the targeted integral incorporation of the low processing temperature polymeric composition into the textile zone 204 can at least partly form the patch 210, when the textile 202 is thermoformed, by melting or deforming the low processing temperature polymeric composition and subsequent cooling and solidifying of the melted material to form a patch 210.

In various aspects, the textile zone 208 can exhibit flexibility and/or pliability similar to a conventional shirt material. In such aspects, the textile zone 208 may include or solely include the high processing temperature polymeric composition. Further, in certain aspects, the textile zone 206 can at least partly provide a transition within the textile 202 from the rigid or semi-rigid patch 210 present in textile zone 204 to the flexible pliable portion present in the textile zone 208. In such aspects, the textile zones 206a-d can include a combination of the low processing temperature polymeric composition present in the textile zone 204 and the high processing temperature polymeric composition present in the textile zone 208. While not shown in FIGS. 2A and 2B, the textile zones 206b-d also provide a transition to a flexible pliable material, such as that present in the textile zone 208.

In certain aspects, like with the textile zone 106 of the textile 102 discussed above with reference to FIGS. 1A and 1B, this combination of the low processing temperature polymeric composition from textile zone 204 and the high processing temperature polymeric composition present from textile zone 208 can provide a seamless or integrated transition from the patch 210 to the flexible pliable portion found in textile zone 208 of the shirt 200.

While this exemplary description in FIGS. 2A and 2B of the textile zones 204, 206a-d, and 208 relates to an elbow region of the article of apparel 200, it should be understood that the textile zones 204, 206a-d, and 208 and associated properties can be applied to other areas of a shirt or other articles of apparel, such as a knee, thigh, hip, chest, and/or lower back region of an article of apparel, or to areas requiring reinforcement such as areas adjacent to a fastener, for example, a zipper, a button, a snap, a pull cord, and the like.

Figure 3:
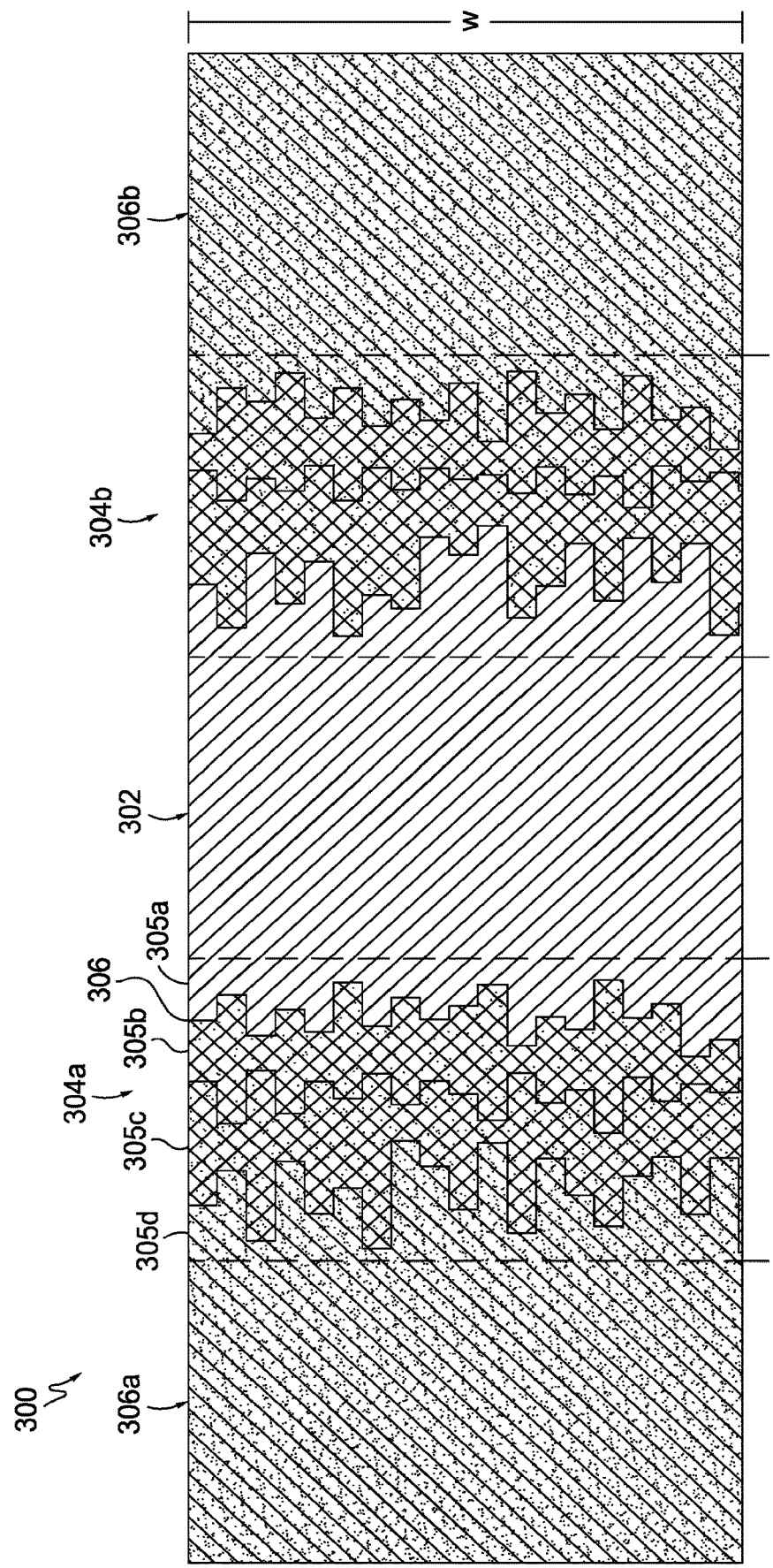
FIG. 3 is a plan view of a schematic depiction of a textile having three types of textile zones, in accordance with aspects of the present invention.

Turning now to FIG. 3, a plan view of a schematic textile 300 is provided. It should be understood that the textile 300 can be any type of textile known to one skilled in the art. A non-limiting list of textiles that are suitable for use in the articles of wear and methods disclosed herein includes knitted textiles, woven textiles, non-woven textiles, and braided textiles.

Similar to the textile 102 of FIGS. 1A and 1B, and the textile 202 of FIGS. 2A and 2B, the textile 300 of FIG. 3 includes three types of textile zones. For example, the textile 300 includes a textile zone 302 that can include fibers and/or yarns comprising a low processing temperature polymeric composition, textile zones 306a and 306b that can include a high processing temperature polymeric composition, and textile zones 304a and 304b that can include a combination of fibers and/or yarns comprising the low processing temperature polymeric composition and fibers and/or yarns comprising the high processing temperature polymeric composition. In textile 300 of FIG. 3, the textile zones 304a and 304b can be positioned on either side of textile zone 302, while textile zones 306a and 306b can be positioned on the opposite sides of the textile zones 304 and 304b, respectively.

In certain aspects, the fibers and/or yarns comprising the low processing temperature polymeric composition present in textile zone 302, when exposed to a thermoforming process, can impart a structural or functional property to the textile 300 that can be used in forming an article of wear. For example, the textile zone 302 can represent the textile zone 104 of the textile 102 of FIGS. 1A and 1B, which forms at least a portion of a ground-facing outsole 112. In aspects, the fibers and/or yarns comprising the high processing temperature polymeric composition present in 306a and 306b can impart flexibility or pliability to the textile 300, such as the textile zone 108 of the article of footwear 100 depicted in FIGS. 1A and 1B. Further, in various aspects, the textile zones 304a and 304b can include a combination of fibers and/or yarns comprising the low processing temperature polymeric composition present in the textile zone 302 and fibers and/or yarns comprising the high processing temperature polymeric composition present in the textile zones 306a and 306b to provide structural support and three-dimensional structure for a particular article of wear. Further, as discussed above, in certain aspects, this combination of fibers and/or yarns comprising the low processing temperature polymeric composition and fibers and/or yarns comprising the high processing temperature polymeric composition in the textiles zones 304a and 304b may provide an integrated transition between the rigid thermoformed material in textile zone 302 and the flexible pliable high processing temperature polymeric composition in textile zones 306a and 306b.

In one or more aspects, the textile zones 304a and 304b can include a plurality of subzones, such as subzones 305a, 305b, 305c, and 305d of the textile zone 304a, which can include varying combinations and/or varied positioning of the fibers and/or yarns comprising the low processing temperature polymeric composition and fibers and/or yarns comprising the high processing temperature polymeric composition. In certain aspects, the subzone 305a may include fibers and/or yarns comprising the low processing temperature polymeric composition but not fibers and/or yarns comprising the high processing temperature polymeric composition present in the textile zones 306a and/or 306b. In the same or alternative aspects, the subzone 305d may include fibers and/or yarns comprising the high processing temperature polymeric composition but not fibers and/or yarns comprising the low processing temperature polymeric composition present in the textile zone 302.

It should be understood that, while only the subzones of the textile zone 304a may be further described herein, such descriptions apply to subzones present in the textile zone 304b. Further, it should be understood that, if in certain descriptions only a textile zone 304a and/or 306a is further discussed, such descriptions also apply to the textile zones 304b and 306b, respectively.

In certain aspects, based on the relative positioning of the fibers and/or yarns comprising the low processing temperature polymeric composition and the fibers and/or yarns comprising the high processing temperature polymeric composition in the textiles zones 302, 304a, and 306a the textile 300 can have varying concentrations of the low processing temperature polymeric composition and/or high processing temperature polymeric composition in these textile zones 302, 304a, 306a.

As used herein, the term "concentration" refers to a clustering or congregation in a specific volume. Thus, the term concentration includes measuring the amount (e.g., the weight in grams) of a material in a specified volume (e.g., cm³). For example, in a knitted textile, a first portion of a single knit layer of a textile can have an increased concentration of a first yarn compared to a second portion of the textile by having more stitches (e.g., knit stitches, tuck stitches, and/or float stitches) of that first yarn than the second portion of equal size. In another example, in a non-woven textile, a first portion of the textile can have an increased concentration of a first fiber if that textile was formed with more of the first fiber (e.g., a weight in grams) than a second portion of equal size.

In aspects, the textile zone 302 may include an increased concentration of fibers and/or yarns comprising the low processing temperature polymeric composition compared to the textile zones 304a and/or 306a. For example, in such aspects, the textile zone 302 may have at least 5 wt. % more fibers and/or yarn comprising the low processing temperature polymeric composition compared to the textile zones 304a and/or 306a. In another aspect, the textile zone 302 may have at least 10 wt. % more fibers and/or yarn comprising the low processing temperature polymeric composition compared to the textile zones 304a and/or 306a. In one aspect, the textile zone 302 may have at least 25 wt. % more fibers and/or yarn comprising the low processing temperature polymeric composition compared to the textile zones 304a and/or 306a.

In the same or alternative aspects, the textile zone 304a can include an increased concentration of fibers and/or yarn comprising the low processing temperature polymeric composition compared to the textile zones 306a. For example, in such aspects, the textile zone 304a may have at least 5 wt. % more fibers and/or yarn comprising the low processing temperature polymeric composition compared to the textile zone 306a. In another aspect, the textile zone 304a may have at least 10 wt. % more fibers and/or yarn comprising the low processing temperature polymeric composition compared to the textile zone 306a. In one aspect, the textile zone 304a may have at least 25 wt. % more fibers and/or yarn comprising the low processing temperature polymeric composition compared to the textile zone 306a.

In various aspects, the textile zone 306a can include an increased concentration of fibers and/or yarn comprising the high processing temperature polymeric composition compared to the textile zones 302 and 304a. For example, in such aspects, the textile zone 306a may have at least 5 wt. % more fibers and/or yarn comprising the high processing temperature polymeric composition compared to the textile zones 302 and/or 304*a*. In another aspect, the textile zone 306*a* may have at least 10 wt. % more fibers and/or yarns comprising the high processing temperature polymeric composition compared to the textile zones 302 and/or 304*a*. In one aspect, the textile zone 306*a* may have at least 25 wt. % more fibers and/or yarn comprising the high processing temperature polymeric composition compared to the textile zones 302 and/or 304*a*.

In certain aspects, the textile zone 304*a* can include an increased concentration of fibers and/or yarn comprising the high processing temperature polymeric composition compared to the textile zone 302. For example, in such aspects, the textile zone 304*a* may have at least 5 wt. % more fibers and/or yarn comprising the high processing temperature polymeric composition compared to the textile zone 302. In another aspect, the textile zone 304*a* may have at least 10 wt. % more fibers and/or yarn comprising the high processing temperature polymeric composition compared to the textile zone 302. In one aspect, the textile zone 304*a* may have at least 25 wt. % more fibers and/or yarn comprising the high processing temperature polymeric composition compared to the textile zones 302.

Figure 4A:
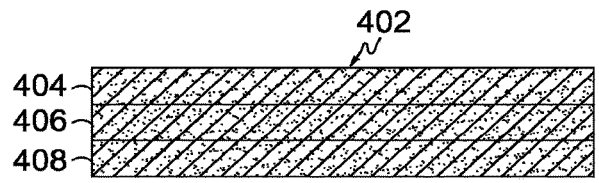
FIGS. 4A-4E depict exemplary cross-sections of the various types of textile zones of the textile of FIG. 3, in accordance with aspects of the present invention.
Figure 4B:
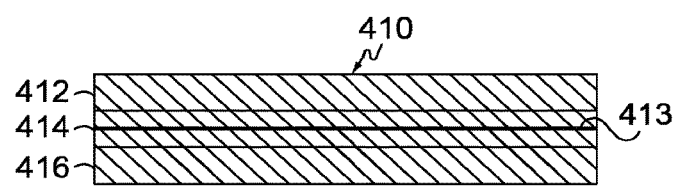
Figure 4C:
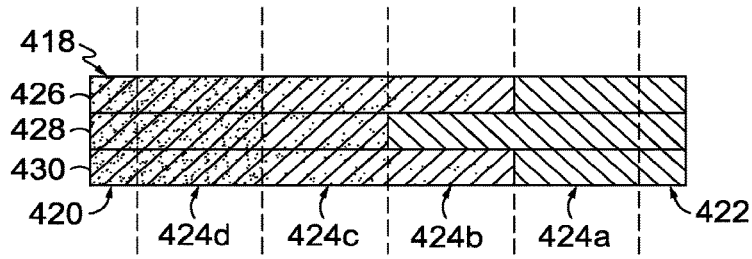
Figure 4D:
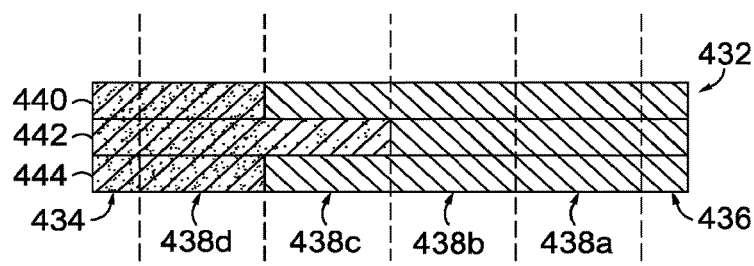

FIGS. 4A-4D schematically depict exemplary cross-sections of the textile zones 302, 304*a*, and 306*a* of the textile 300. Generally, FIG. 4A depicts an exemplary cross-section from the textile zone 306*a* and further illustrates how, in certain aspects, this portion of the textile zone 306*a* includes fibers and/or yarns comprising the high processing temperature polymeric composition but does not include fibers and/or yarn comprising the low processing temperature polymeric composition that is present in the textile zone 302. FIG. 4B depicts an exemplary cross-section of the textile zone 302 and also illustrates how, in various aspects, this portion of the textile zone 302 includes fibers and/or yarns comprising the low processing temperature polymeric composition but does not include fibers and/or yarns comprising the high processing temperature polymeric composition that is present in the textile zone 306*a*. FIGS. 4C and 4D depict two exemplary cross-sections from the textile zone 304*a*, and further illustrate how in these exemplary portions of the textile zone 304*a* both fibers and/or yarns comprising the low processing temperature polymeric composition and fibers and/or yarns comprising the high processing temperature polymeric composition is present.

The cross-sections depicted in FIGS. 4A-4D will now be described from the perspective of the textile 300 being a knitted textile. Various processes for forming a knitted textile and the types of yarns that can be used are discussed in detail below. It is contemplated that a variety of knitting techniques may be implemented to achieve a described result. For example, in some aspects, a "knit stitch" may be substituted with a purl stitch to achieve a comparable result having a different aesthetic and/or texture. For purposes of simplicity herein, a "knit stitch" will be discussed while it is contemplated that a functional equivalent could be substituted. Similarly, a "tuck stitch" may be discussed in specific aspects, but it is also contemplated that alternative stitch techniques may be implemented to achieve a comparable result. Although a relatively simple knit structure is depicted and discussed, numerous warp knit and weft knit structures may be formed through flat knitting, wide tube circular knitting, narrow tube circular knit jacquard, single knit circular knit jacquard, double knit circular knit jacquard, double needle bar raschel, warp knit jacquard, and tricot for example.

It should be understood that the cross-sections depicted in FIGS. 4A-4D are schematic and each cross-section is organized into various segments to highlight potential knit structures that may be present. The potential knitting structures that may be present in the various segments of these cross-sections are described first.

Figure 5A:
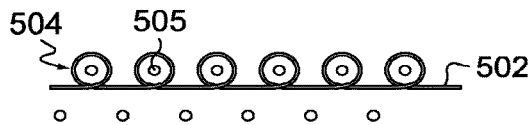
FIGS. 5A-5J depict exemplary knit structures that can be present in various segments of the exemplary cross-sections depicted in FIGS. 4A-4E, in accordance with aspects of the present invention.

FIGS. 5A-5J depict exemplary potential knitting structures that can be present in the various segments of the cross-sections depicted in FIGS. 4A-4D. FIG. 5A depicts a knit stitch (or sometimes referred to as a Jersey stitch) structure 502 formed from a back needle bed 504. It should be understood that the row of small circles associated with the back needle bed 504, represents needles (e.g., a needle 505) of the back needle bed 504, in accordance with traditional stitch schematics. Further, the same is true for a front needle bed, e.g., the front needle bed 508 depicted in FIG. 5B; that is, that the row of small circles associated with the front needle bed 508 represent needles (e.g., a needle 507) in the front needle bed 508.

Figure 5B:
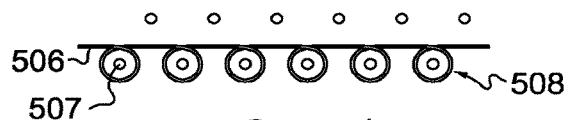
Figure 5C:
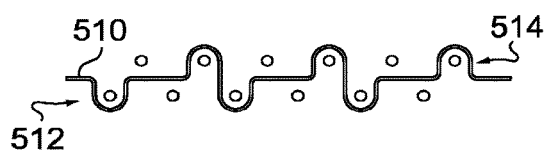
Figure 5D:
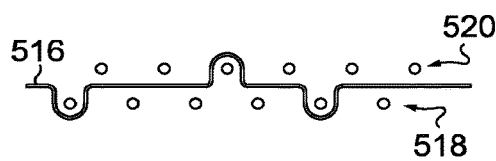
Figure 5E:
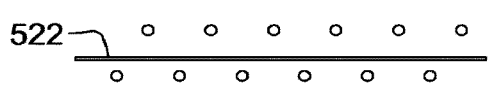
Figure 5F:
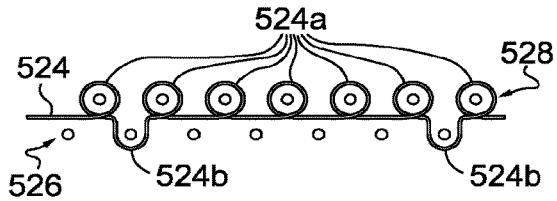
Figure 5G:
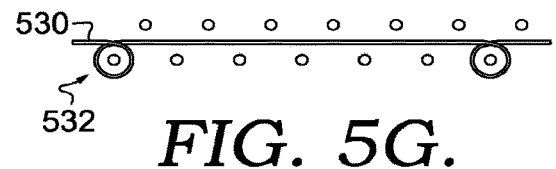
Figure 5H:
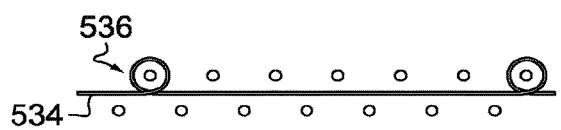
Figure 5I:
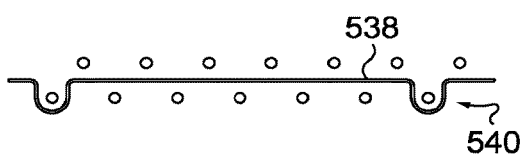
Figure 5J:
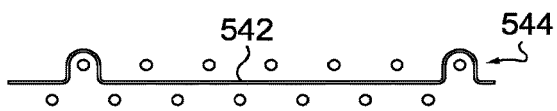

FIG. 5B depicts a knit stitch structure 506 formed from a front needle bed 508. FIG. 5C depicts a float and tuck stitch structure 510, with tuck stitches that are formed by a front needle bed 512 and a back needle bed 514. FIG. 5D depicts another float and tuck stitch structure 516, with tuck stitches formed by a front needle bed 518 and a back needle bed 520. FIG. 5E depicts a float stitch structure 522. FIG. 5F depicts a knit and tuck stitch structure 524 having knit stitches 524*a* formed by a back needle bed 528 and tuck stitches 524*b* formed by a front needle bed 526. FIG. 5G depicts a knit and float stitch structure 530, with the knit stitches formed on a front needle bed 532. FIG. 5H depicts a knit and float stitch structure 534, with the knit stitches formed a back needle bed 536. FIG. 5I depicts a tuck and float knit structure 538, with the tuck stitches formed by a front needle bed 540. FIG. 5J depicts a tuck and float knit structure 542, with the tuck stitches formed by a back needle bed 544.

Returning now to the cross-sections 4A-4D of the textile 300. Generally, the cross-sections depicted 4A-4D are structured similarly, which is due to the primary structure of the knitted textile. For example, in aspects, there is tubular knit structure that includes a knit structure formed primarily from a back needle bed (such as the knit structure 502 depicted in FIG. 5A) and a knit structure primarily formed on a front needle bed (such as the knit structure 506 depicted in FIG. 5B). Further, in such aspects, this tubular knit structure is connected via one or more tuck and float stitch structures, with tuck stitches formed from a back needle bed and a front needle bed (such as the tuck and float stitch structures 510 and 516 depicted in FIGS. 5C and 5D, respectively).

This connected tubular knit structure is schematically depicted in the three horizontal rows highlighted in the cross-sections depicted 4A-4D. For example, FIG. 4A depicts a cross-section 402 of the textile zone 306*a* of FIG. 3 that includes the high processing temperature polymeric composition.

The cross-section 402 of FIG. 4A schematically depicts a top segment 404, a middle segment 406, and a bottom segment 408. The top segment 404 and the bottom segment 408 denote the knit structures for forming the tubular knit structure, while the middle segment 406 denotes the tuck and float stitch structures to connect the tubular knit structure together. Thus, in certain aspects, the top segment 404 can include one or more of the knitting structures 502 and 524 depicted in FIGS. 5A and 5F, respectively. The bottom segment 408 can include the knitting structure 506 depicted in FIG. 5B. The middle segment 406 can include one or more of the knit structures 510 and 516 depicted in FIGS. 5C and 5D, respectively.

FIG. 4B depicts a cross-section 410 of the textile zone 302 that includes yarn comprising the low processing temperature polymeric composition. The cross-section 410 includes a top segment 412, a middle segment 414, and a bottom segment 416, which can include the same knit structures identified above with respect to the top segment 404, the middle segment 406, and the bottom segment 408 of the cross-section 402 of FIG. 4A.

In certain aspects, it may be desirable to bulk up the low processing temperature polymeric composition in the textile zone 302 in order to provide a desired thickness and rigidity to the thermoformed textile zone 302, e.g., to form a ground-facing outsole of an article of footwear. In such aspects, the textile zone 302 can include repeat stitches to increase the concentration of the yarn comprising the low processing temperature polymeric composition relative to other textile zones, e.g., the textile zones 304a and/or 306a. In certain aspects, repeat stitches may be provided, for example, by including multiple stitch structures in any or all of the top segment 412, middle segment 414, and bottom segment 416 of the cross-section 410. In one example, multiple overlapping tuck and float stitch structures (such as the structures depicted in FIGS. 5C, 5D, 5I, and 5J) can be provided in the middle segment 414 of the cross-section 410.

In certain aspects, in regions of the textile 300 that include a substantial amount of yarn comprising the low processing temperature polymeric composition, e.g., the textile zone 302, an anchor yarn 413 can be provided in the textile 300 to help restrict the flow of the melted low processing temperature polymeric composition and/or to provide some flexibility to the thermoformed material. In the cross-section 410 depicted in FIG. 4B, the anchor yarn 413 is depicted as being present in the middle segment 414 between the top and bottom segments 412 and 416, respectively. In such aspects, this positioning of the anchor yarn 413 can result in the embedding or the encapsulation of the anchor yarn 413 by the low processing temperature polymeric composition upon thermoforming of the textile 300.

While the anchor yarn 413 in FIG. 4B is depicted as a straight line it should be understood that this is a schematic representation of the anchor yarn 413 and is not meant to specify any particular type of knit structure. For example, the anchor yarn 413 can be present in the textile 300 as many different types of knit structure, such as one or more of structures depicted in FIGS. 5E and 5G-J. In certain aspects, the stitch selection for the anchor yarn 413 can depend upon the desired resistance to elongation of the material through which the anchor yarn 413 extends. For example, an anchor yarn stitch which floats five needles between tuck or knit stitches would provide a greater resistance to stretch to the material through which the anchor yarn 413 extends compared to an anchor yarn stitch which only floats 2 or 3 needles between tuck or knit stitches. In such an example, the differing resistance to elongation between the length of the float is a result of non-linear portions (e.g., stitch loops) that are more prone to elongation than linear segments, which results in different amounts of resistance to elongation.

In certain aspects, when the anchor yarn 413 is present as one or more of the knit structures depicted in FIGS. 5G-J, the anchor yarn 413 extends as a float stitch along at least two, at least three, at least four, or at least five adjacent loops of the yarn comprising the low processing temperature polymeric composition, since the yarn comprising the low processing temperature polymeric composition is also present as one or more of the knit structures of FIGS. 5A and 5B. Further in certain aspects, the anchor yarn 413 may extend as a float stitch along at least two, at least three, at least four, or at least five adjacent loops of the yarn comprising the low processing temperature polymeric composition and also may form at least a portion of a tuck stitch and/or a knit stitch with the yarn comprising the low processing temperature polymeric composition. In such aspects, a length between tuck stitches or knit stitches is at least partly formed with the yarn comprising the low processing temperature polymeric composition and the anchor yarn, the anchor yarn 413 may extend at least two, at least three, at least four, or at least five adjacent loops of the yarn comprising the low processing temperature polymeric composition. In the same or alternative aspects, the anchor yarn 413 may be stitched, e.g., tuck stitch or knit stitch, at loops spaced apart an amount represented by needle count of a common needle bed of within 50% or within 25% of the gauge of a knit machine used to form at least a portion of the textile 300.

Figure 4E:
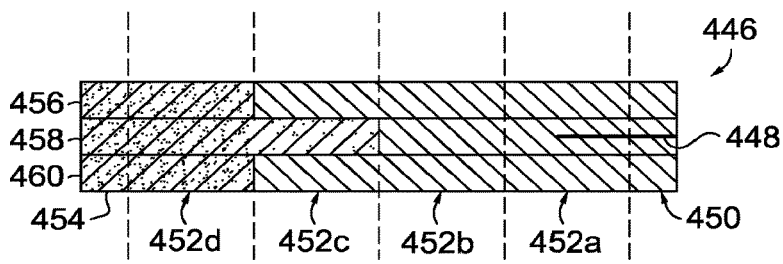

FIGS. 4C and 4D depict cross-sections of the textile zone 304a and portions of the textile zones 302 and 306a. For example, the cross-section 418 of FIG. 4C includes a portion 422 that corresponds to the textile zone 302, and a portion 420 that corresponds to the textile zone 306a. The portions 424a, 424b, 424c, and 424d correspond to the subzones 305a, 305b, 305c, and 305d, respectively, of the textile zone 304a of the textile 300. The cross sections of FIGS. 4C-4E are simplified schematically; however, it is contemplated that one or more zones and/or portions of the cross sections may include a variety of fibers and/or yarns in different configurations and concentrations. For example, textile zone 424c in a middle segment 428 may be comprised of both fibers and/or yarns comprising the low processing temperature polymeric composition and fibers and/or yarns comprising the high processing temperature polymeric composition, but in a different configuration/concentration as that which is found in textile zone 424b and/or 424d of the middle segment 428. Stated differently, various constructions techniques allow for combinations of fibers and/or yarns in given segments and textile zone by variations in the method of combining, including, attaching, depositing or applying the fibers and/or yarn (e.g., stitch selection) that allow for variations in fiber and/or yarn concentration at segment levels and/or textile zone levels.

The cross-section 418 of FIG. 4C includes the same type of general tubular knit structure discussed above with respect to the cross-sections 402 and 410 of FIGS. 4A and 4B, respectively. Accordingly, the cross-section 418 includes a top segment 426, a middle segment 428, and a bottom segment 430. The top segment 426, the middle segment 428, and the bottom segment 430 can include the same knit structures discussed above with reference to the top segment 404, the middle segment 406, and the bottom segment 408 of the cross-section 402 of FIG. 4A, respectively.

In the cross-section 418 of FIG. 4C, the portions 422 and 424a include knit structures made with yarn that comprises the low processing temperature polymeric composition, while the portions 420, 424d, and 424c include knit structures made with yarn that comprises the high processing temperature polymeric composition. However, as provided above, it is contemplated that combinations of fibers and/or yarn based on differing stitch techniques may be implemented in the various portions to achieve a transition from one primary material to another primary material.

The portion 424b includes the tubular knit structure made from yarn that comprises the high processing temperature polymeric composition; however, knit structures formed from the front and back needle beds (with yarn(s) comprising the high processing temperature polymeric composition) are connected via the float and tuck stitches (or an effective stitch comparable) from a yarn comprising the low processing temperature polymeric composition. This portion 424b illustrates how, when melted and solidified, the low processing temperature polymeric composition can physically connect two outer knit layers together via a plaque or film of thermoformed material, once the textile 300 undergoes thermoforming. In such aspects, an article of wear having this type of tubular knit structure that has been thermoformed and connected via an integral thermoformed material would primarily include typical knit yarn layers on opposing outer surfaces of the textile that are connected together via a thermoformed film. Such a structure could be utilized to provide water-proofing/resistance or other weather proofing to an article of wear while still maintaining a typical knit article aesthetic and hand feel.

Like the cross-section 418 of FIG. 4C, the cross-section 432 of FIG. 4D includes a portion 436 that corresponds to the textile zone 302, and a portion 434 that corresponds to the textile zone 306a. The portions 438a, 438b, 438c, and 438d correspond to the subzones 305a, 305b, 305c, and 305d, respectively, of the textile zone 304a of the textile 300.

The top region 440, the middle region 442, and the bottom region 444 of the cross-section 432 of FIG. 4D can include the same knit structures discussed above with reference to the top segment 404, the middle segment 406, and the bottom segment 408 of the cross-section 402 of FIG. 4A, respectively, in order to provide the same type of general tubular structure.

The portions 434 and 438d of the cross-section 432 of FIG. 4D include knit structures that include yarn that comprises the high processing temperature polymeric composition while the portions 436, 438a, and 438b include knit structures made with yarn that comprises the low processing temperature polymeric composition, in an exemplary aspect. However, as also provided above, it is contemplated that a primary, but not exclusive, material selection may be used. For example, in portion 438b, the yarn comprising the high processing temperature polymeric composition may be present in the middle region 442 to aid in the transition of materials. The concentration of the yarn comprising the high processing temperature polymeric composition in portion 438b may be less than that present in portion 438c of the same middle region 442. For example, the portion 438b may have at least 5 wt. % less, 10 wt. % less, or 25 wt. % less yarn comprising the high processing temperature polymeric composition than is present in portion 438c of the same middle region 442.

The portion 438c includes the tubular structure with yarn that comprises the low processing temperature polymeric composition, which are connected via the float and tuck stitches from a yarn comprising the high processing temperature polymeric composition. In such aspects, upon thermoforming this portion 438c can encapsulate the yarn comprising the high processing temperature polymeric composition in a plaque of the melted and cooled thermoformed material. In certain aspects, such a structure can provide some flexibility to an otherwise rigid thermoformed material.

For example, FIG. 4E depicts a cross-section 446 that is identical to the cross-section 432 of FIG. 4D with the exception that an anchor yarn 448 has been added to at least a portion of the regions that include the yarn comprising the low processing temperature polymeric composition. In certain aspects, the anchor yarn 448 can have any or all of the properties discussed above with respect to the anchor yarn 413 of FIG. 4B. For example, the anchor yarn can be incorporated into the textile using one or more of the knit structures depicted in FIGS. 5E and 5G-J.

As can be seen in FIG. 4E the anchor yarn 448 extends from the portion 450 of the cross-section 446, which corresponds to the textile zone 302, and into the portions 452a and 452b, which correspond to the subzones 305a and 305b of the textile zone 304a. Further, in such aspects, FIG. 4E illustrates that yarn comprising the low processing temperature polymeric composition is also present (e.g., as a yarn having one or more of the knit structures present in FIGS. 5A and 5B) in at least the same portions of the textile as the anchor yarn 448. Thus, in certain aspects, the anchor yarn 448 may extend as a float stitch along at least two, at least three, at least four, or at least five adjacent loops of the yarn comprising the low processing temperature polymeric composition. Further in certain aspects, the anchor yarn 448 may extend as a float stitch along at least two, at least three, at least four, or at least five adjacent loops of the yarn comprising the low processing temperature polymeric composition and also may form at least a portion of a tuck stitch and/or a knit stitch with the yarn comprising the low processing temperature polymeric composition. In such aspects, between tuck stitches or knit stitches at least partly formed with yarn comprising the low processing temperature polymeric composition and the anchor yarn 448, the anchor yarn 448 may extend at least two, at least three, at least four, or at least five adjacent loops of the yarn comprising the low processing temperature polymeric composition. In the same or alternative aspects, the anchor yarn 448 may be stitched, e.g., tuck stitch or knit stitch, at loops spaced apart by needle count an amount of within 50% or within 25% of the gauge of a knit machine used to form at least a portion of the textile 300.

As discussed above, in one or more aspects, the anchor yarn 448 can extend from the textile zone 302 into the textile zone 304a and toward the textile zone 306a. In such aspects, the anchor yarn 448 may not extend from the textile zone 302 into the textile zone 304a and toward the textile zone 306a as far as a yarn comprising the low processing temperature polymeric composition extends into the zone 304a and toward the textile zone 306a, because there is less need to restrict flow during thermoforming and/or provide flexibility to the thermoformed material since the yarn comprising the high processing temperature polymeric composition from the zone 306a is also present in textile zone 304a.

For example, in the cross-section 446 of FIG. 4E, the anchor yarn extends from the portion 450 (corresponding to a portion of the textile zone 302) and into the portion 452b (corresponding to the subzone 305b of the textile 300). Further, the cross-section 446 illustrates that the top segment 456 and bottom segment 460 of the cross-section 446 show that yarn comprising the low processing temperature polymeric composition extends from the portion 450 and into the portion 452c towards the portion 454 (corresponding to the textile zone 406a), which is beyond the extension of the anchor yarn 448 in the same direction. However, in the middle segment 458, in portions 452c and 452d, the yarn comprising the high processing temperature polymeric composition is present, which can provide flexibility to the thermoformed textile and/or restrict flow during thermoforming.

As discussed above, in certain aspects, when the textile 300 is a knitted textile, the cross-sections of the textile depicted in FIGS. 4A-4E are depicted with a top segment, bottom segment, and middle segment, where the top and bottom segments may form a tubular knit structure (and where tuck stitches or other connecting stitches present in the middle segment may also form part of the tubular or general knit structure) with a top and bottom knit layers. In such aspects, each of the top and bottom outer knit layers can include a plurality of interconnected courses.

Further, as can be seen in the textile 300 of FIG. 3, in the zone 304a, the subzones 305a-d have at least one staggered interface, e.g., staggered interface 306. The staggered interfaces, e.g., the staggered interface 306, provide a staggered or non-linear transition between subzones of the textile 300 along the width w of the textile. In such aspects, these staggered interfaces provide a more refined integrated transition, when the textile 300 is thermoformed, between the rigid area formed by the low processing temperature polymeric composition in the textile zone 302 and the flexible pliable area formed by the yarn comprising the high processing temperature polymeric composition in the textile zone 306a. In aspects, this refined integrated transition provided at least in part by the staggered interfaces, may increase the durability or tear resistance of the thermoformed textile 300, as opposed to a similar textile having a linear abrupt transition between an integral rigid material and a flexible material.

In aspects where the textile 300 is a knitted textile, the staggered interface 306 can depict how different courses of yarn on either the top or bottom outer knit layers can have different amounts of loops (or general stitch selection) of a yarn comprising the low processing temperature polymeric composition and/or a yarn comprising the high processing temperature polymeric composition. As the textile may have multiple layers (e.g., a top, middle, and bottom), the staggered interface may be addressed in any combination of the layers and is not limited to the surfaces exposed or depicted. Instead, as provided herein and as contemplated, a transition from a first primary material (e.g., fibers and/or yarn comprising the high processing temperature polymeric composition) to a second primary material (e.g., fibers and/or yarn comprising the low processing temperature polymeric composition) forming a textile, the transition may occur at a middle layer exclusively or in combination with one or more outer layers. It should be understood for the purposes of the following discussion of knit layers, it is assumed that, when the textile 300 of FIG. 3 is a knitted textile, the view of the textile 300 depicts a top layer. Further, the same description equally applies to the bottom knit layer.

FIG. 6 schematically depicts one exemplary portion 600 of the top layer of the textile 300 showing a portion of a staggered interface 306. As can be seen in FIG. 6, the portion 600, a first course 602 of loops is interconnected to a second course 604 of loops. It should be understood that while only two interconnected courses are depicted in FIG. 6, more than two courses may be interconnected in the top knit layer of the textile 300. As used herein "interconnected," when referencing interconnected courses, refers to how at least a portion of the loops in a first course of loops are tethered to at least a portion of the loops in a second course of loops. One exemplary aspect of interconnected courses is depicted in FIG. 6, where individual loops from the second course 604 are interlooped with individual loops from the first course 602. As used herein, "interlooped" refers to the how a loop from one course may wrap around a loop of another course such as in a knit stitch, and also refers to how one loop can have another segment of yarn pulled through the loop (or through the loop and around the yarn forming the loop) in order to form a second loop, as in a crochet process.

As can be seen in the portion 600 of the textile 300, both the first course 602 and the second course 604 include two types of yarns: a first yarn 606 that may comprise the high processing temperature polymeric composition, and a second yarn 608 that may comprise the low processing temperature polymeric composition. While only two courses are depicted in the portion 600, it should be understood that the top knit layer of the textile 300 can include any number of courses. In aspects, each of the courses present in the top knit layer of the textile 300 can include two or more types of yarn, as depicted in FIG. 6.

As can be seen in FIG. 6, each course, e.g., the first course 602 and the second course 604, can extend from the textile zone 302 to the textile zone 306a (in aspects, each of the course can extend from the textile zone 306a to the textile zone 306b). In certain aspects, as can be seen in FIG. 6, the second yarn 608 in both the first course 602 and the second course 604 can extend from the textile zone 302 into the textile 304a. In the same or alternative aspects, the first yarn 606 can extend from the textile zone 304a into the textile zone 306a. It should be understood that, while the schematic portion 600 of the textile 300 depicts each loop as only having a single yarn, more than one yarn may be present at one or more loops (e.g., another yarn may form a tuck stitch with the loops of the portion 600 of FIG. 6), as depicted in the cross-sections of FIGS. 4A-4E.

As discussed above, the portion 600 of the outer knit layer of the textile 300 illustrates at least a portion of the staggered interface 306. In certain aspects, the staggered interface 306 (and any other staggered interfaces) may be formed by the same type of yarn in multiple courses extending different distances from the one zone (or subzone) into the next zone or subzone. For example, as can be seen in FIG. 6, in the first course 602, the second yarn 608 extends from the textile zone 302 into the textile zone 304a and towards the textile zone 306a further than the second yarn extends from the textile zone 302 into the textile zone 304a and towards the textile zone 306a. In such aspects, the different distances of extension of the second yarn 608 into the textile zone 304a results in different amounts of loops of the second yarn 608 in each of the first course 602 and the second course 604, which can change a concentration of yarn for a given zone/subzone. Thus, in such aspects, within the textile zone 304a a loop of the second yarn 608 in the first course 602 can be interlooped with a loop of the second yarn 608 in the first course 602 at a first wale 608, while at a second wale 610 the second yarn 608 of the first course 602 can be interlooped to a loop of the first yarn 604 in the first course 602. In the same or alternative aspects, within the textile zone 304a, the first yarn 604 in the first course 602 can be interlooped with the first yarn 604 in the second course 604 at a third wale 612.

In one or more aspects, a staggered interface, e.g., the staggered interface 306, can result in adjacent courses of the plurality of courses in the textile 300 having different numbers of loops of the yarn comprising the low processing temperature polymeric composition and of a yarn comprising the high processing temperature polymeric composition. For example, as can be seen in the portion 600 of the upper knit layer of the textile 300 depicted in FIG. 6, in at least a portion of the textile zone 304a the first course 602 has a different number of loops of the first yarn 606, and/or of the second yarn 608, than the second course 604. Further, in the same or alternative aspects, within at least a portion of the textile zone 304a, adjacent wales can have one or more loops of different yarns. For example, as illustrated in the portion 600 of the upper knit layer of the textile 300 in FIG. 6, the wale 610 includes loops of both the first yarn 606 and the second yarn 608, while the wale 612 includes loops of the first yarn 606.

As discussed above, the textiles described herein, which can include fibers and/or yarns comprising the low processing temperature polymeric composition, can be thermoformed to impart some structure of properties to the article of wear. Further, as discussed above, the thermoforming process can cause at least a portion of the low processing temperature polymeric composition present in the textile to melt or deform and subsequently solidify.

Figure 7A:
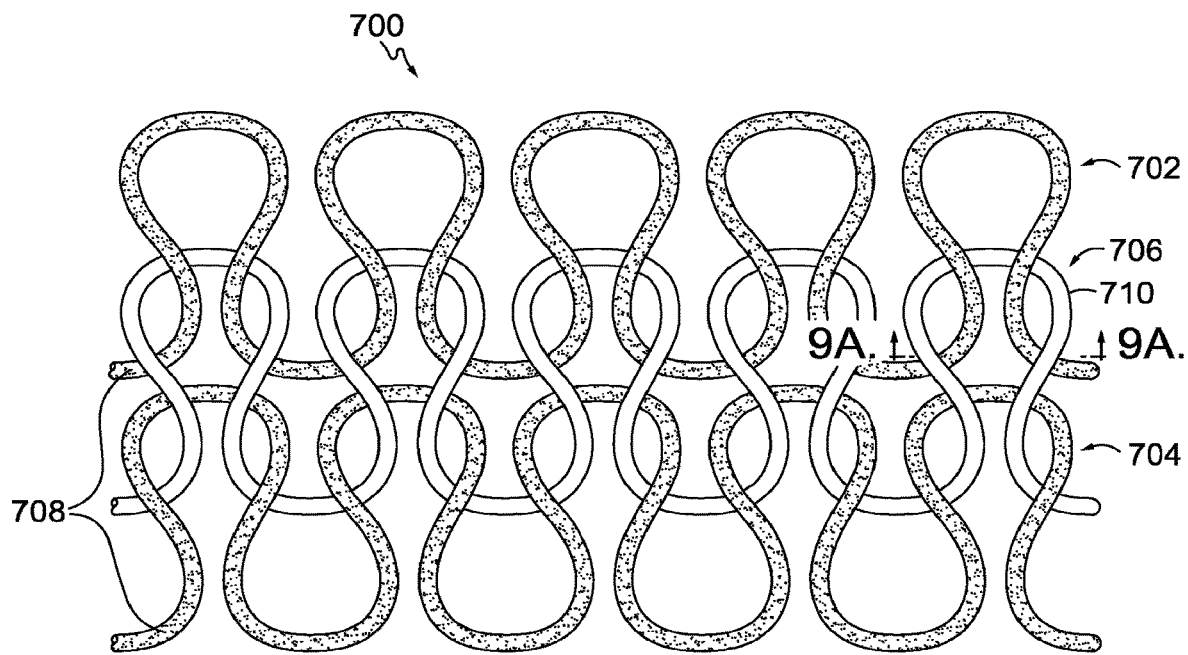
FIG. 7A is a schematic representation of three interconnected courses of loops with the middle course of loops being formed of a different yarn than the outer courses of loops, in accordance with aspects of the present invention.

FIG. 7A schematically depicts a portion 700 of the textile zone 304a of the upper knit layer of the textile 300 of FIG. 3 prior to a thermoforming process. The portion 700 includes a first course 702 and a second course 704 having a first yarn 708 that comprises the high processing temperature polymeric composition. The portion also includes a third course 706 of a second yarn 710 that comprises the low processing temperature polymeric composition. In such an aspect, the third course 706 of loops of the second yarn 710 can be interconnected, e.g., interlooped, to the first course 702 and the second course 707 having the first yarn 708.

Figure 7B:
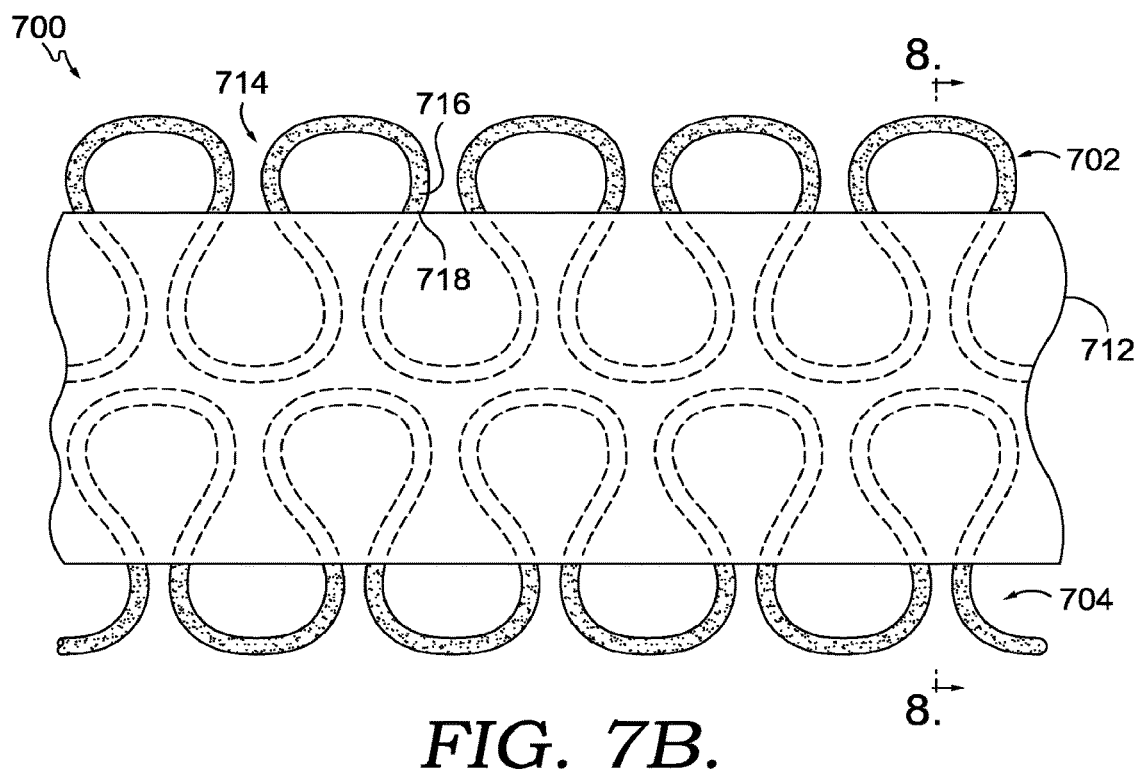
FIG. 7B is a schematic representation of the interconnected courses of loops of FIG. 7A after being exposed to a thermoforming process, and showing the middle course of loops being transformed into a non-yarn material upon thermoforming but not the two outer courses of loops, in accordance with aspects of the present invention.

FIG. 7B depicts the portion 700 after being exposed to a thermoforming process. As can be seen by comparing FIGS. 7A and 7B, the second yarn 710 that comprises the low processing temperature polymeric composition was thermoformed from a yarn material into a non-yarn material 712. In certain aspects, the heating step of the thermoforming process at least partly caused the low processing temperature polymeric composition in the second yarn 710 to melt and flow and then subsequently solidify by the completion of the thermoforming process into the non-yarn material 712.

In aspects, as can be seen in FIGS. 7A and 7B, the thermoforming process has also transformed at least a portion of the knit structure of the portion 700 of the upper knit layer of the textile 300 of FIG. 3. For example, the courses 702, 704, and 706 depicted in FIG. 7A have been transformed such that the portion 700 no longer includes interconnected courses of loops of a yarn comprising the low processing temperature polymeric composition and a yarn comprising the high processing temperature polymeric composition, at least partly due to the transformation of the yarn 710 in the second course 706 to the non-yarn material 712. As can be seen in FIG. 7B, although the thermoforming process can eliminate the interconnected loops in the portion 700 of the upper knit layer of the textile 300 of FIG. 3, the remaining course 702 and 704 can be connected by the non-yarn material 712. In such aspects, this portion 700 of upper knit layer of the textile 300 of FIG. 3 may fix the position of the courses 702 and 704 to one another, as opposed to when the courses 702 and 704 were interconnected via the course 706 prior thermoforming. Further, in such aspects, a top portion 714 of the loops of the first course 702 may still be free to interconnect with other courses of yarn allowing one to modulate the level of rigidity and/or three-dimensional forming provided by the textile zone 304a.

FIG. 8 depicts a cross-section of the portion 700 of the upper knit layer of the textile 300 of FIG. 3 along the cut line 8 illustrated in FIG. 7B. As can be seen in FIG. 8, at least a portion of the first yarn 708 can be encapsulated within the non-yarn material 712. Depending on the conditions used during the thermoforming process, the non-yarn material 712 can solidify into a film-like structure surrounding at least a portion of the loops of the first course 702 and the second course 704 of the first yarn 708 that comprises the high processing temperature polymeric composition.

As can be seen in the aspect depicted in FIGS. 7B and 8, the first yarn 708 that comprises the high processing temperature polymeric composition did not melt or deform after being exposed to the thermoforming process. Further, in certain aspects, the first yarn 708 may contain a dye 716 (depicted as the speckling within the first yarn 708) that does not leach out after being exposed to the thermoforming process. For example, as can be seen in FIGS. 7B and 8, there is no visible leaching of the dye 716 from the first yarn 708 into adjacent regions of the non-yarn material 712, e.g., the adjacent region 718. In certain aspects, at least about 80 wt. %, at least about 90 wt. %, at least about 95 wt. %, or at least 99 wt. % of the dye 716 remains within the first yarn 708 or within the thermoformed portion 700 of the upper knit layer of the textile 300 of FIG. 3. In the same or alternative aspects, upon thermoforming, there is no visible leaching of the dye into any additional materials associated with the final article of wear, which the portion 700 of upper knit layer of the textile 300 of FIG. 3 textile 300 is incorporated into.

FIGS. 9A and 9B depict an aspect where the portion 700 of the upper knit layer of the textile 300 of FIG. 3 is exposed to the thermoforming process but only results in the deforming of the low processing temperature polymeric composition in the second yarn 710 without eliminating at least a portion of the interconnected courses 702, 704, and 706 of FIG. 7A. As used herein, "deform" and "deforming" in the context of the thermoforming process of a knitted textile refers to the alteration of the structure of the yarn such that the yarn does not melt and flow in such a manner as to substantially eliminate the knit structure of the textile (e.g., eliminate one or more interconnected loops or interlooped courses).

FIG. 9A depicts a cross-section of the portion 700 of the upper knit layer of the textile 300 of FIG. 3 along the cutline 9A-B prior to the thermoforming process, and FIG. 9B depicts the same cross-section after the thermoforming process. As can be seen in FIG. 9B, upon being exposed the thermoforming process, the second yarn 710 in the third course 706 has an altered yarn structure 710a while the structure of the first yarn 708 has not been altered. In this aspect, the second yarn 710 in the third course 706 maintains the interlooping with the first course 702 and the second course 704 and the overall knit structure of the portion 700 of the upper knit layer of the textile 300 of FIG. 3.

In certain aspects, this altered yarn structure 710a can result in a mechanical coupling or physical bonding of the second yarn 710 to another yarn, e.g., the first yarn 706, (or to another portion of the second yarn 710). In certain aspects, during the thermoforming process, the yarn 710 may have been exposed to a temperature above the glass transition temperature $T_g$ of the low processing temperature polymeric composition but not above the melting temperature of the low processing temperature polymeric composition. In such aspects, when the second yarn 710 is exposed to such an elevated temperature, the second yarn may soften and become pliable but not melt, allowing the yarn to slightly mold around at least a portion of adjacent yarn, e.g., the first 706, and upon cooling this altered yarn structure can be mechanically locked in place to physically bond to the adjacent yarn.

Figure 10A:
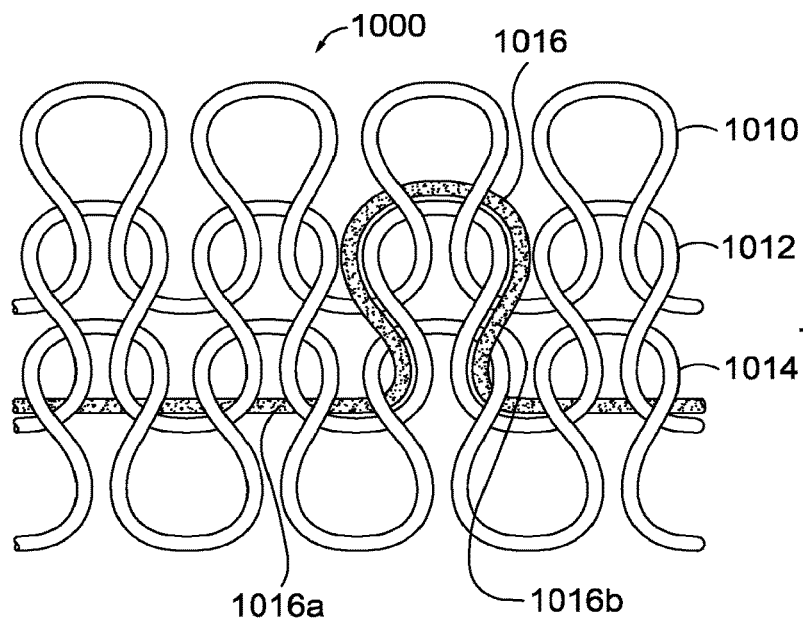
FIG. 10A is a schematic representation of three interconnected courses of one type of yarn with anchor yarn in float stitches and tuck stitches, in accordance with aspects of the present invention.
Figure 10B:
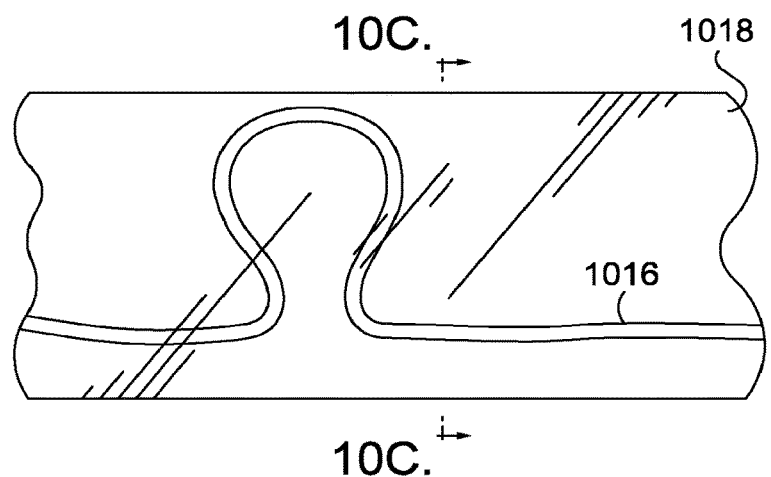
FIG. 10B is a schematic representation of the interconnected courses of FIG. 10A, and shows that upon thermoforming the one type of yarn forming the interconnected courses has been transformed into a non-yarn material, with the anchor yarn still present as a yarn, in accordance with aspects of the present invention.
Figure 10C:
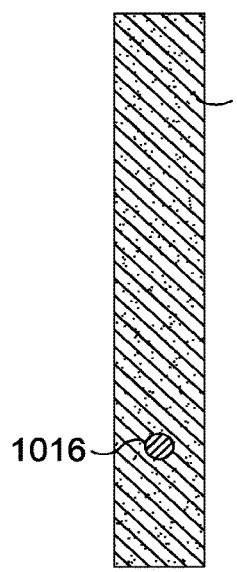
FIG. 10C is a schematic representation of a cross-section of the non-yarn material of FIG. 10B, showing the anchor yarn encapsulated within the non-yarn material, in accordance with aspects of the present invention.

FIGS. 10A-10C depict a portion 1000 of the textile zone 302 upper knit layer of the textile 300 of FIG. 3 before and after thermoforming. FIG. 10A depicts three courses 1010,

1012, 1014 of a yarn that includes the low processing temperature polymeric composition. FIG. 10A further depicts the present of an anchor yarn 1016 extending as a float stitch 1016a and a tuck stitch 1016b.

FIG. 10B depicts the same portion 1000 of the textile zone 302 upper knit layer of the textile 300 of FIG. 3 after being exposed to the thermoforming process. As can be seen in FIG. 10B, the interlooped courses 1010, 1012, and 1014 of the yarn have been transformed into a non-yarn material 1018. Further, as can be seen in FIG. 10B and FIG. 10C, which is a cross-section along the cutline 10C of FIG. 10B, the anchor yarn 1016 has maintained its yarn structure and is now encapsulated within the non-yarn material 1018. It should be understood that while in FIG. 10B, the anchor yarn 1016 is depicted as being encapsulated within the non-yarn material 1018, it is also contemplated that the anchor yarn 1016 can be at least partially embedded within the non-yarn material 1018 such that at least a portion of the anchor yarn 1016 is not fully covered in the non-yarn material 1018.

As discussed above, in certain aspects, the textiles described herein can include a knitted textile, e.g., such as the portions of a knitted textile depicted in FIGS. 4A-10C. A knit upper for an article of footwear is one exemplary knitted textile. In such aspects, at least a portion of the knit upper of the article of footwear, and in some aspects substantially the entirety of the upper, may be formed of the knitted textile. The knitted textile may additionally or alternatively form another element of the article of footwear such as the midsole or ground-facing outsole for example. The knitted textile may have a first side forming an inner surface of the upper (e.g., facing the void of the article of footwear) and a second side forming an outer surface of the upper. An upper including the knitted textile may substantially surround the void so as to substantially encompass the foot of a person when the article of footwear is in use. The first side and the second side of the knitted textile may exhibit different characteristics (e.g., the first side may provide abrasion resistance and comfort while the second side may be relatively rigid and provide water resistance).

In aspects, the knitted textile may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted textile without the need for significant post-knitting processes or steps. Alternatively, two or more portions of the knitted textile may be formed separately and then attached. In some embodiments, the knitted textile may be shaped after the knitting process to form and retain the desired shape of the upper (for example, by using a foot-shaped last). The shaping process may include attaching the knitted textile to another object (e.g., a strobel) and/or attaching one portion of the knitted component to another portion of the knitted component at a seam by sewing, by using an adhesive, or by another suitable attachment process.

Forming an upper with the knitted textile may provide the upper with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof.

The knitted textile may also provide desirable aesthetic characteristics by incorporating yarns having different colors or other visual properties arranged in a particular pattern. The yarns and/or the knit structure of the knitted textile may be varied at different locations such that the knitted component has two or more portions with different properties (e.g., a portion forming the throat area of the upper may be relatively elastic while another portion may be relatively inelastic). In some aspects, the knitted textile may incorporate one or more materials with properties that change in response to a stimulus (e.g., temperature, moisture, electrical current, magnetic field, or light).

In some aspects, the knitted textile may include one or more yarns or strands that are at least partially inlaid or otherwise inserted within the knit structure of the knitted textile during or after the knitting process, herein referred to as "tensile strands." The tensile strands may be substantially inelastic so as to have a substantially fixed length. The tensile strands may extend through a plurality of courses of the knitted textile or through a passage within the knitted textile and may limit the stretch of the knitted textile in at least one direction. For example, the tensile strands may extend approximately from a biteline of the upper to a throat area of the upper to limit the stretch of the upper in the lateral direction. The tensile strands may form one or more lace apertures for receiving a lace and/or may extend around at least a portion of a lace aperture formed in the knit structure of the knitted textile.

In alternative aspects, the textiles described herein can include non-woven textiles. The non-woven textiles described herein can be produced by any conventional methods, such as any conventional mechanical, chemical, or thermal methods for bonding the fibers together, including needle entangling and water entangling.

Figure 11A:
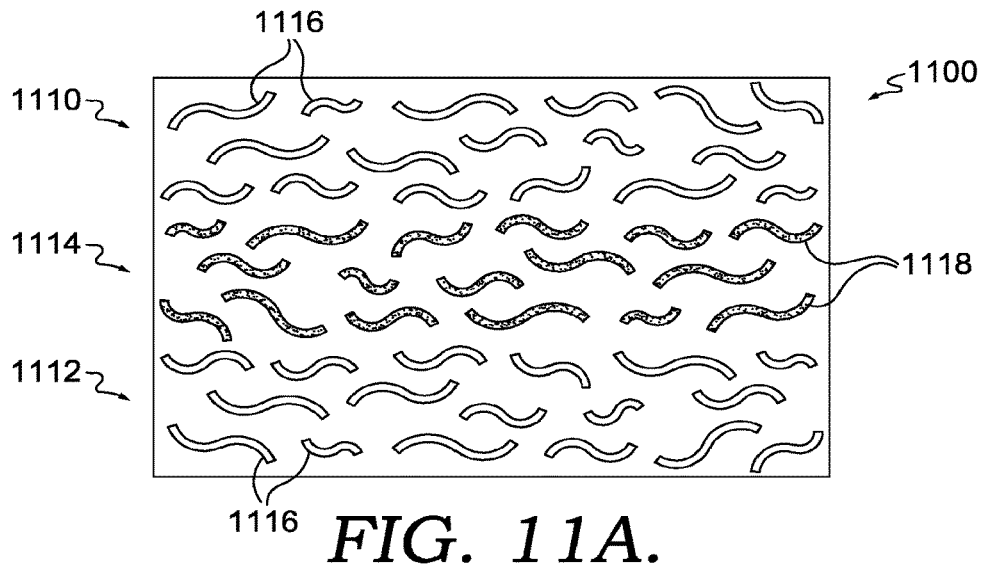
FIG. 11A is a schematic representation of a portion of one of the textile zones of the textile of FIG. 3, and showing areas of different types of fibers, in accordance with aspects of the present invention.
Figure 11B:
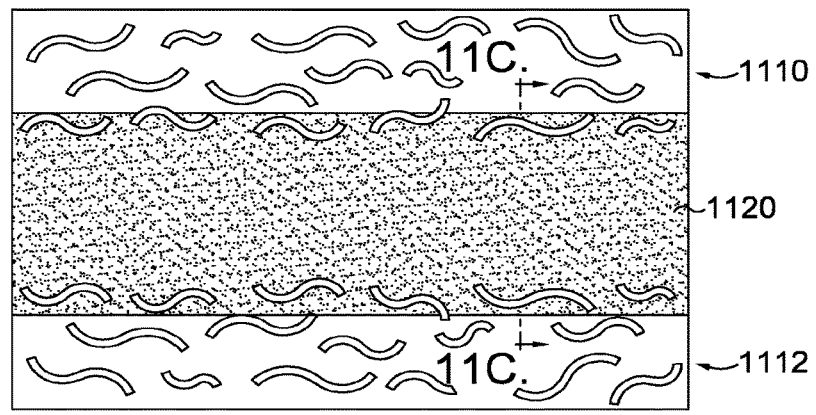
FIG. 11B is a schematic representation of the portion of FIG. 11A after being exposed to a thermoforming process, and showing how one of the types of fibers have been transformed into a non-fiber material with fibers of the other material embedded within the non-fiber material, in accordance with aspects of the present invention.
Figure 11C:
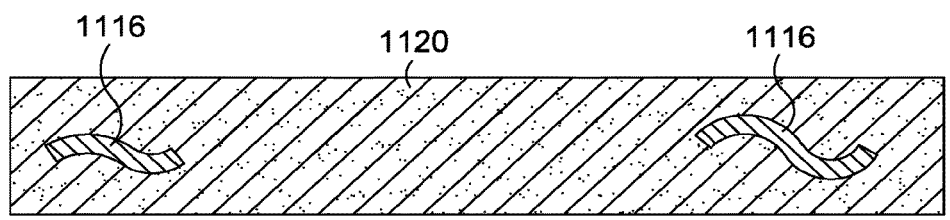
FIG. 11C is a cross-section of the non-fiber material of FIG. 11B showing the two other fibers encapsulated within the non-fiber material, in accordance with aspects of the present invention.

FIGS. 11A-11C depict an aspect where the textile 300 of FIG. 3 is a non-woven textile and undergoes the thermoforming process. FIG. 11A is a schematic depiction of a portion 1100 of the textile zone 304a of the textile 300 of FIG. 3. As can be seen in FIG. 11A, the portion includes a first grouping 1110 of first fibers 1116 that comprise the high processing temperature polymeric composition, a second grouping 1112 of the first fibers 1116, and a third grouping 1114 of second fibers 1118 that comprise the low processing temperature polymeric composition. It should be understood that the portion 1100 of the textile 300 is schematic and the placing and spacing of the first fibers 1116 and the second fibers 1118 may be different in a textile.

While not depicted in FIGS. 11A-11C, in aspects where the textile 300 is a non-woven textile, one or more interfaces between the different portions of different fibers may also include one or more staggered interfaces, e.g., the staggered interface 306. In such aspects, the staggered interface 306 can depict how the transition between zones or subzones having different concentrations of fibers comprising the low processing temperature polymeric composition and/or fibers comprising the high processing temperature polymeric composition does not occur in a linear manner along the width w of the textile 300 of FIG. 3.

Returning now to FIGS. 11A-11C, and FIG. 11C in particular, in aspects where the thermoforming process causing the melting and flowing of the low processing temperature polymeric composition in the second fibers 1118, the second fibers 1118 have been transformed into a non-fiber material 1120, while the first fibers 1116 have not been transformed and so remain in fiber form. In such aspects, the non-fiber material 1120 can join together the first grouping 1110 of the first fibers 1116 with the second grouping 1112 of the first fibers 1116. FIG. 11C shows a cross-section along the cutline 11C, which shows how in certain aspects, at least a portion of the first fibers 1116 can be encapsulated within the non-fiber material 1120. In aspects, it is contemplated that at least a portion of the first fibers 1116 can be can be at least partly embedded within the non-fiber material 1120 such that the first fibers 1116 are not fully encapsulated by the non-fiber material 1120.

Although not depicted in the figures, in certain aspects, upon being exposed to the thermoforming process, the second fibers 1118 may not melt and flow but instead may deform and alter shape. This deformation of fibers or yarns is depicted in FIGS. 9A and 9B. Like the deformation of fibers or yarns discussed above with respect to FIGS. 9A and 9B, in certain aspects, the second fibers may deform and mold on another first or second fiber (or the same fiber) and mechanically couple or physically bond to that fiber.

Pre-Thermoforming Processes and the Thermoforming Process

As discussed above, in certain aspects, the textiles described above, e.g., the textile 300 of FIG. 3, can form at least a portion of an article of wear, such as an article of footwear. In such aspects, the textile can form an upper for the article of footwear, where the upper includes a ground-facing outsole portion.

In certain aspects, the textile can be combined with additional materials in forming the upper for the article of footwear. For example, in one or more aspects, the textile can be combined or layered with one or more of an ankle collar lining, ankle collar foam, upper lining, or upper foam layer. In certain aspects, one or more of these additional materials may be secured to the textile, e.g., by knitting, stitching, or adhesion, prior to thermoforming the textile.

Figure 12:
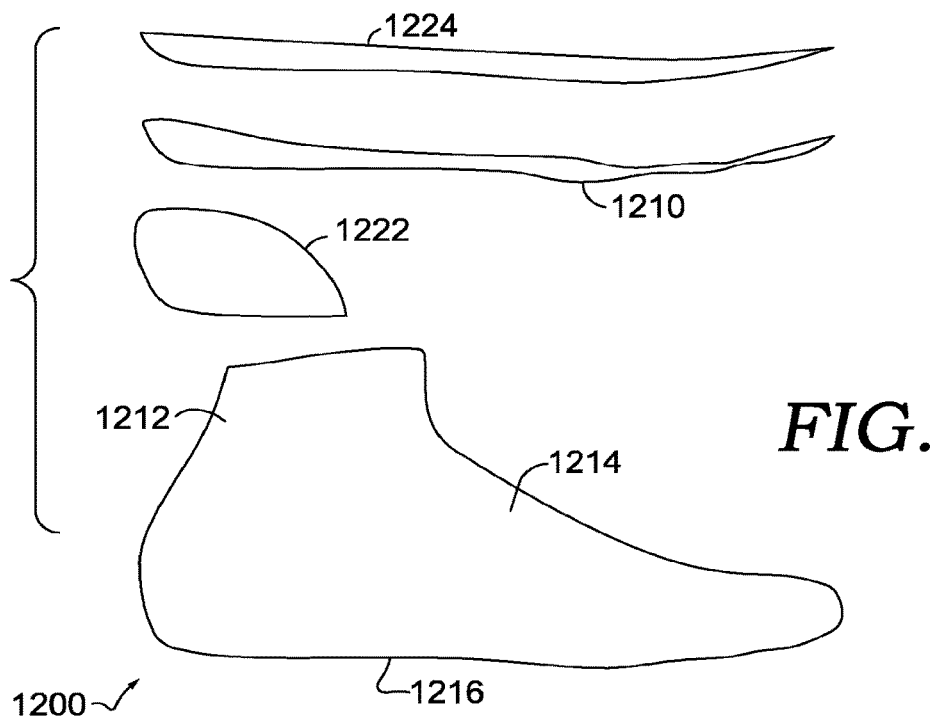
FIG. 12 is a side view of a schematic representation of an article of footwear that includes a textile material, and showing a chassis, a heel counter, and a sock liner for incorporation into the article of footwear, in accordance with aspects of the present invention.
Figure 13:
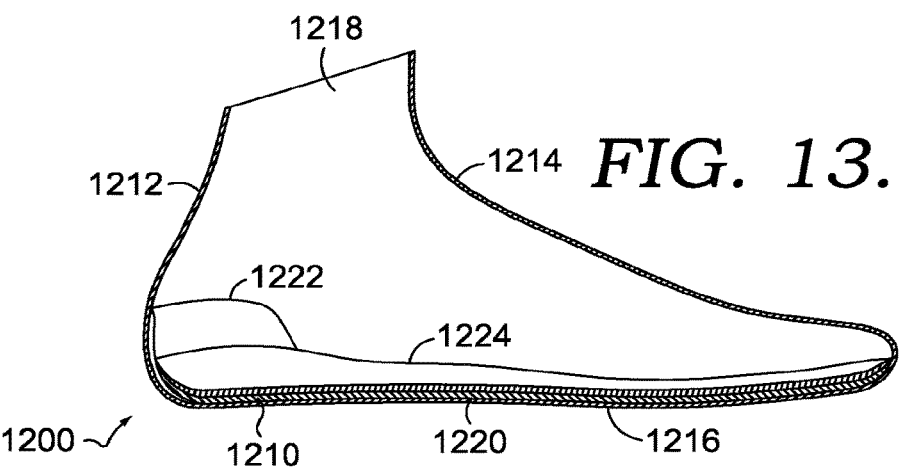
FIG. 13 is a cross-section of the article of footwear of FIG. 12 with the chassis, heel counter, and sock liner positioned in the interior of the article of footwear, in accordance with aspects of the present invention.

In certain aspects, to provide additional comfort and/or support to a wearer for an article of footwear formed at least partly by the textiles described herein, an internal support device or chassis may be provided. FIGS. 12 and 13 depict an article of footwear 1200 that includes a chassis 1210. The article of footwear 1200 includes a textile 1212 forming an upper 1214 having a ground-facing outsole portion 1216. In certain aspects, as can best be seen in FIG. 13, which depicts a cross-section of the article of footwear 1200, the chassis 1210 is positioned in the interior portion 1218 of the article of footwear 1200 and contacting an inner surface 1220 of the textile 1212. In certain aspects, the chassis 1210 can include a polymeric material such as a high processing temperature polymeric material, e.g., a polyether block amide, that is capable of not melting or deforming during the thermoforming process described herein.

In various aspects, for a wearer's heel support, a heel counter 1222 can be positioned on the interior portion 1218 of the article of footwear. In aspects, like the chassis, 1210, the heel counter 1222 can include a polymeric material such as a high processing temperature polymeric material, e.g., a polyether block amide, that is capable of not melting or deforming when exposed to the thermoforming process.

In certain aspects, a sockliner 1224 can be positioned on top of the chassis 1210 in the interior 1218 of the article of footwear 1200. In such aspects, the sockliner 1224 can include conventional sockliner materials, such as one or more layers of a foam or memory foam and a textile layer. It should be understood that while, a chassis 1210, heel counter 1222, and a sockliner 1224 are depicted as additional materials for forming the upper for the article of footwear, other materials could also be added, such as plates, toe caps, and/or structures along the sides.

In various aspects, the heel counter 1222 and the chassis 1210 can be positioned in the interior 1218 of the article of footwear 1200 prior to thermoforming. In certain aspects, the sockliner can be applied after the thermoforming process is completed.

Figure 14:
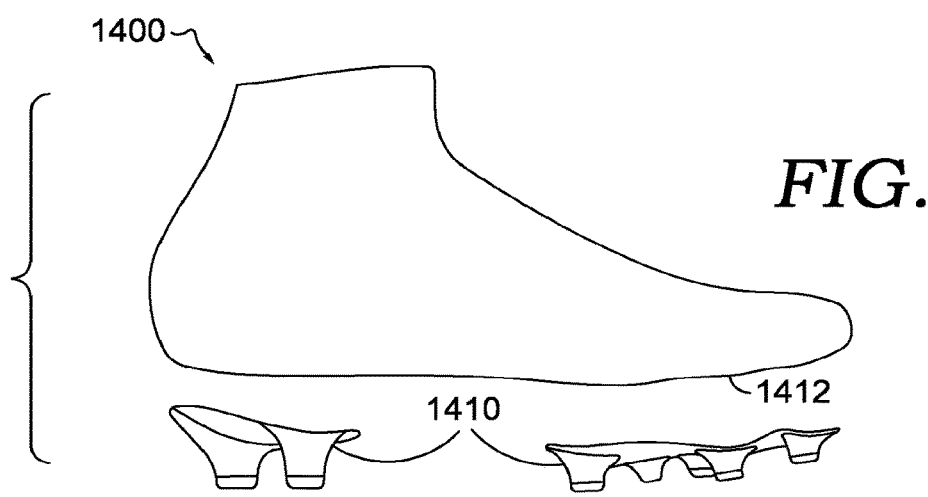
FIG. 14 is a side view of a schematic representation of an article of footwear that includes a textile material, showing the addition of ground-engaging cleats to the ground-facing outsole area of the article of footwear, in accordance with aspects of the present invention.

In certain aspects, such as that depicted in FIG. 14, ground-engaging cleats 1410 can be applied to an article of footwear 1400. In aspects, the article of footwear 1400 can include the same features as the article of footwear 1200 described above with reference to FIGS. 12 and 13. As can be seen in FIG. 14, the ground-engaging cleats 1410 can be applied to the ground-facing outsole area 1412 of the article of footwear 1400 to provide increase stability and traction. In aspects, the ground-engaging cleats 1410 can be applied to the ground-facing outsole area 1412 after the thermoforming process is completed. In other aspects, the ground-engaging cleats 1410 can be applied to the ground-facing outsole area 1412 as part of the thermoforming process.

Figure 15:
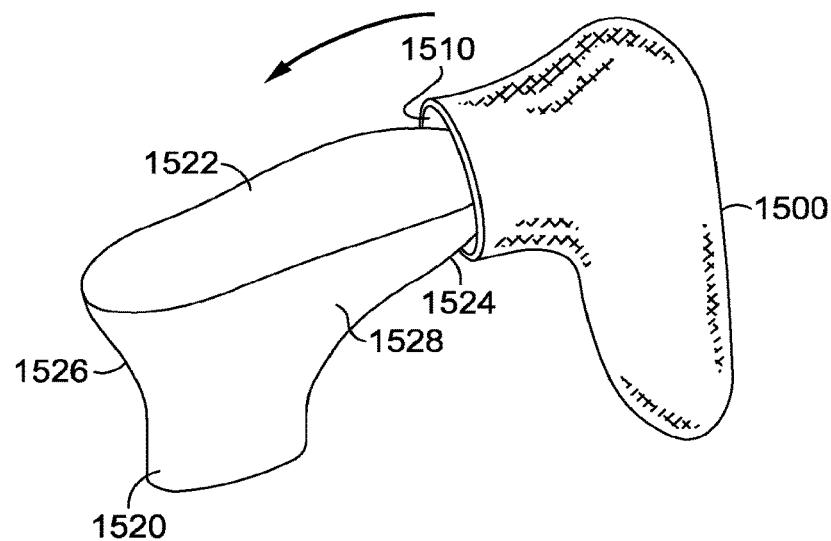
FIG. 15 is a top and side perspective view showing an upper for an article of footwear being placed on a last, in accordance with aspects of the present invention.

In various aspects, prior to thermoforming an article of footwear, the textile and any of the additional materials discussed above can be braided, woven, knitted or pre-formed into the general booty-type shape of an upper with a ground-facing outsole portion, such as that depicted in the upper 1500 of FIG. 15. In such aspects, the upper 1500 can also include a chassis or heel counter positioned on the inside 1510 of the upper 1500, such as the chassis 1210 and heel counter 1222 discussed above with respect to FIG. 12.

Figure 16:
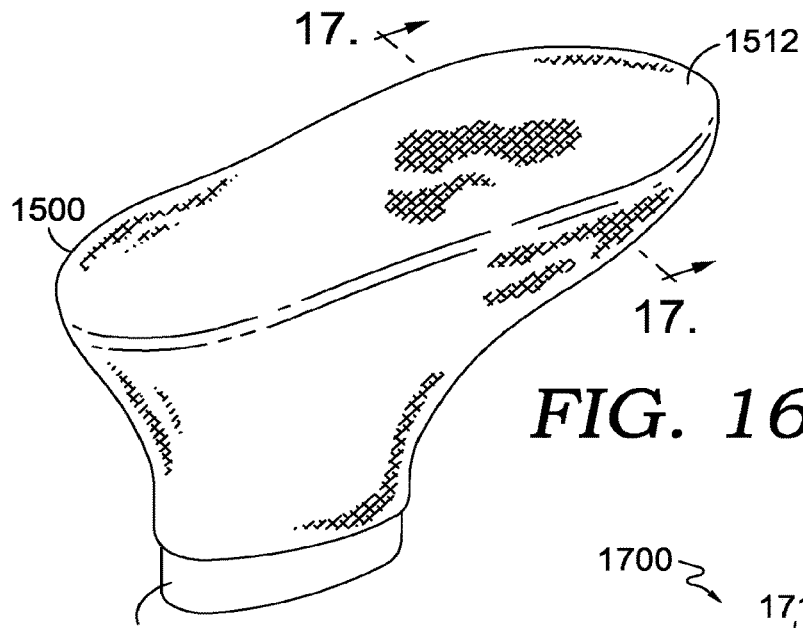
FIG. 16 is a top and side perspective view of the upper from FIG. 15 on the last showing the upper wrap around at least a bottom portion of the last, in accordance with aspects of the present invention.

In order to prepare the upper 1500 for the thermoforming process, the upper 1500 is placed on a last 1520 such that the last 1520 enters the inside 1510 of the upper 1500. In certain aspects, the last 1520 can be formed of a polymeric material such as a high processing temperature polymer composition. In a particular aspect, the last 1520 can be formed of a polymeric material having a melting temperature $T_m$ or a degradation temperature greater than 250° C. or greater than 300° C. such as, for example, a silicone polymer. The last 1520 can be made of other types of material as long as such a material would not be deformed or melt during the thermoforming process or otherwise adversely affect the thermoforming of the upper. FIG. 16 depicts the upper 1500 positioned on the last 1520. As can be seen in FIG. 16, the upper 1500 wraps around the last 1520 to cover a bottom portion 1522 of the last 1520, a forefoot portion 1524 of the last 1520, and a heel portion 1526 of the last 1520. In such aspects, the ground-facing outsole portion 1512 of the upper covers the bottom portion 1524 of the last 1520. Although the upper 1500 is illustrated in FIGS. 15 and 16 as having a sock-like structure which wraps around and covers the bottom portion 1522, the forefoot portion 1524, and the heel portion 1526 of the last 1520, in other aspects, the upper 1500 may only partially wrap around the last 1520. Similarly, in other aspects, the upper 1500 may cover only the bottom portion 1522 of the last 1520, only the forefoot portion 1524 of the last 1520, only the heel portion 1526 of the last 1520, or combinations thereof. In yet other aspects, the upper 1500 may cover only a portion of the bottom portion 1522 of the last 1520, a portion of the forefoot portion 1524 of the last 1520, a portion of the heel portion 1526 of the last 1520, or combinations thereof.

Figure 17:
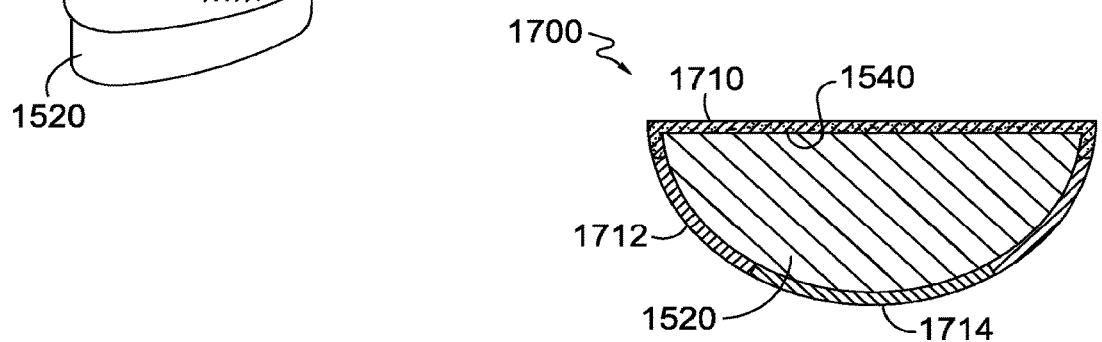
FIG. 17 is a cross-section of the upper on the last from FIG. 16, showing the last in contact with inner surface of the upper, in accordance with aspects of the present invention.

FIG. 17 shows a cross-section of the upper 1500 positioned on the last 1520 along the cutline 17. The cross-section 1700 reveals that the last 1500 contacts the inner surface 1540 of the upper 1500. The cross-section 1700 also reveals the two types of materials present in the upper 1500.

For example, the cross-section 1700 reveals the three types of textile zones of the textile forming the upper 1500. As can be seen in FIG. 17, the textile zone 1710, which is associated with the ground-facing outsole portion 1512 of the upper, covers the bottom portion 1524 of the last 1520. In such aspects, when the upper is a knitted textile forming a knitted upper, at least a portion of the yarn comprising the low processing temperature polymeric composition is covering at least a portion of the bottom portion 1524 of the last 1520.

Further, the textile zone 1714 covers the forefoot portion 1524 of the last 1520, while the textile zone 1712 covers the midfoot area 1528 of the last. In certain aspects, the textile zones 1710, 1712, and 1714 can have any or all of the properties discussed above with reference to the textile zones 302, 304*a*, 306*a* of FIG. 3, respectively.

Figure 18:
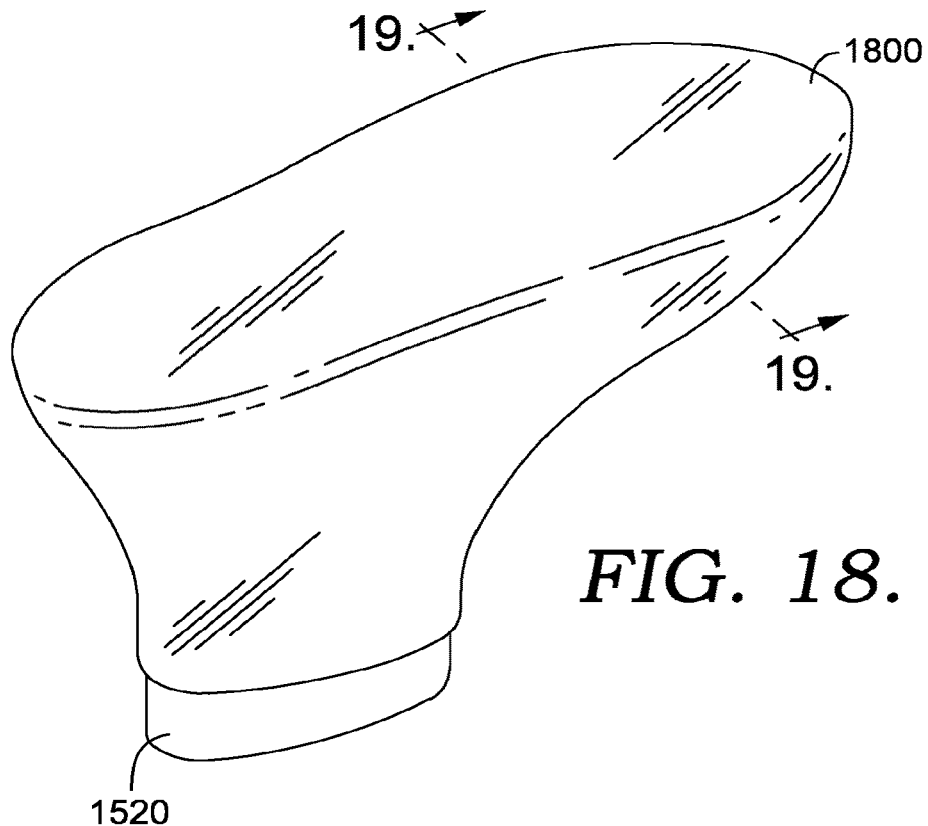
FIG. 18 is a top and side perspective view of the upper on the last from FIG. 16, showing a protective sheath wrapped around the upper, in accordance with aspects of the present invention.
Figure 19:
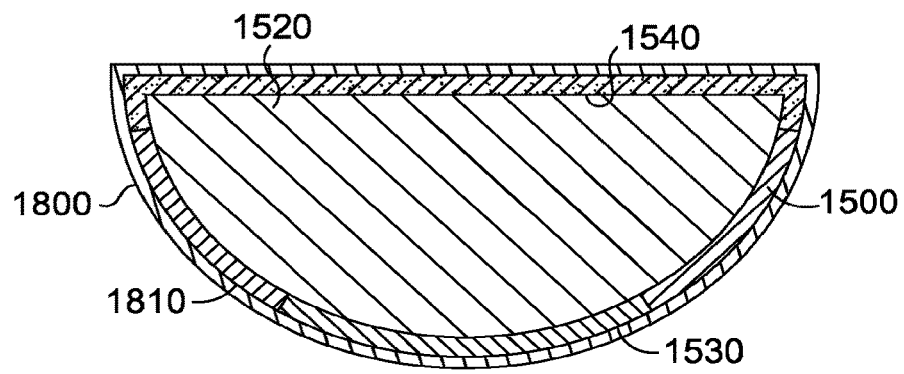
FIG. 19 is a cross-section of the protective sheath-covered upper from FIG. 18, showing the protective sheath contacting the outer surface of the upper, in accordance with aspects of the present invention.

In certain aspects, during the thermoforming process, the low processing temperature polymeric composition may melt and flow. In various aspects, it may be desirable to restrict the flow of the melted low processing temperature polymeric composition. In such aspects, a protective sheath may be applied over the upper positioned on a last. For example, as can be seen in FIGS. 18 and 19, a protective sheath 1800 is positioned over the upper 1500 positioned on the last 1520. In certain aspects, the protective sheath 1800 can be formed of a polymeric material such as a high processing temperature polymer composition. In a particular aspect, the protective sheath 1800 can be formed of an elastomeric polymeric material having a melting temperature $T_m$ or a degradation temperature greater than 250° C. or greater than 300° C. such as, for example, a silicone polymer. The protective sheath 1800 can be made of other types of material as long as such a material would not be deformed or melt during the thermoforming process or otherwise adversely affect the thermoforming of the upper. In aspects, the protective sheath 1800 may apply a compressive force to the outer surface 1530 of the upper 1500, which may aid in restricting the flow of the melted low processing temperature polymeric composition. Further, in such aspects, a vacuum can be drawn on the combination of the last 1520, the upper 1500 positioned on the last, and the protective sheath positioned on the upper 1500. For example, a bag under vacuum can be compressed on the outside of the protective sheath 1800 to apply a compressive force to the protective sheath 1800 to ensure the sheath 1800 is in flush contact with the outer surface 1530 of the upper 1500. The vacuum bag is discussed in more detail below.

In certain aspects, the protective sheath 1800 can be utilized to provide a pattern or marking on the outer surface of the upper 1500. For example, the inner surface 1810 of the protective sheath 1800 can include markings or patterns, which during the thermoforming process can be embossed or imprinted on the outer surface 1530 of the upper 1500, due to the melting and cooling of the low processing temperature polymeric composition in the upper 1500 combined with a compressive force applied by the protective sheath 1800 (and optionally a vacuum bag) onto the upper 1500. In such aspects, since the protective sheath 1800, can cover the entire upper 1500 it is possible for the protective sheath 1800 to emboss or imprint a pattern onto any portion of the outer surface 1530 of the upper 1500 that includes the low processing temperature polymeric composition.

In certain aspects, use of the protective sheath 1800 alone and when used under vacuum can be effective in reducing the number of air bubbles which become trapped in the low processing temperature polymer material during the thermoforming process, as compared to an identical upper thermoformed under similar conditions except without the use of the protective sheath 1800.

In the aspects depicted in FIGS. 15-19, the last 1520 is formed of a rigid material. Further, in these aspects, when the last 1520 is made of a rigid material, the compressive force applied via the protective sheath 1800 (and/or the vacuum bag) creates a force or pressure differential between the inner 1540 and outer 1530 surfaces of the upper 1500 (since the rigid last 1520 at least partly resists this compressive force which results in the upper 1500 experiencing the compressive force). In such aspects, this pressure differential can at least partly provide the environment necessary to restrict the flow of the melted low processing temperature polymeric composition and/or provide embossing or patterning to the outer surface 1530 of the upper 1500.

In certain aspects, the upper 1500 may be positioned on the last 1520 when formed of a rigid material and the outer surface 1530 of the upper 1500 (with or without the protective sheath 1800) can be exposed to a pressure above atmospheric pressure to create this pressure differential. In another aspect, the upper 1500 may be positioned on the last 1520 and a negative pressure may be applied between the inner surface 1540 of the upper 1500 and the last 1520 to compress the upper 1500 onto the rigid last 1520.

In aspects, the pressure differential across the inner 1540 and outer 1530 surfaces of the upper 1500 can also aid in forming the three-dimensional structure of the article of footwear during the thermoforming process. That is, in such aspects, as the low processing temperature polymeric composition is melting the melted material and the upper 1500 are forced up against the rigid last 1520, which when cooled, results in the upper 1500 taking on the shape of the last 1520.

In alternative aspects, this force or pressure differential between the inner 1540 and outer 1530 surfaces of the upper 1500 can be achieved in another manner. For example, in certain aspects, the last 1520 may be an expandable last 1520, which can apply an outward force to the inner surface 1540 of the upper 1500. In such aspects, to achieve the pressure differential, the outer surface 1530 of the upper 1500 can be contacting some type of material that will at least partly resist the outward force applied by the expanding of the last 1520.

Figure 20A:
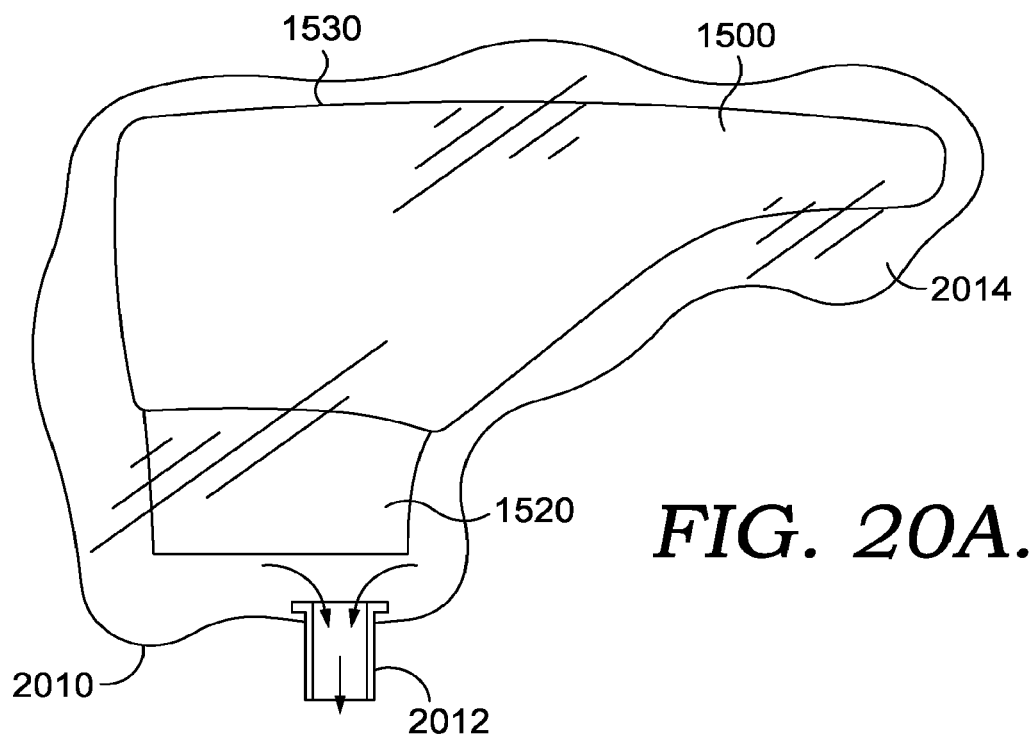
FIG. 20A is a side view of the upper on the last from FIG. 16 showing a vacuum bag with the upper placed inside, in accordance with aspects of the present invention.

As discussed above, a vacuum bag may be applied to the upper 1500 positioned on the last 1520, with or without the protective sheath 1800. FIG. 20A depicts the upper 1500 positioned on the last 1520 inside of a vacuum bag 2010. As used herein the term "vacuum bag" refers to any material that can compress onto the outer surface of an object.

Figure 20B:
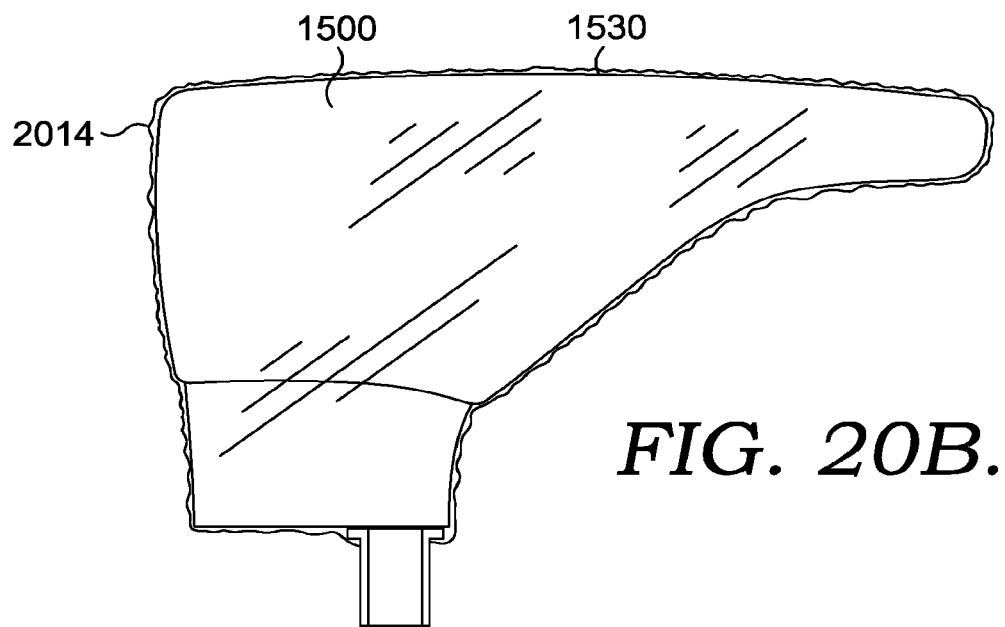
FIG. 20B is a side view of the upper inside the vacuum bag of FIG. 20A, showing the vacuum bag compressed against the outer surface of the upper, in accordance with aspects of the present invention.

In the aspect depicted in FIG. 20A, the vacuum bag 2010 can include a valve 2012 for reducing pressure inside the vacuum bag 2010. For example, the pressure can be reduced between the outer surface 1530 of the upper 1500 (or an outer surface of the protective sheath 1800 on the upper 1500) and the inside 2014 of the vacuum bag 2010, which will compress the vacuum bag onto the outer surface 1530 of the upper 1500 (or an outer surface of the protective sheath 1800 on the upper 1500). FIG. 20B depicts the vacuum bag 2010 compressed onto the outer surface 1530 of the upper 1500 (or an outer surface of the protective sheath 1800 on the upper 1500). As discussed above, the compression of the vacuum bag 2010 onto the upper 1500 can provide, at least partly, the pressure differential discussed above with reference to FIGS. 15-19.

FIG. 21 depicts a thermoforming system 2100. The thermoforming system 2100 of FIG. 21 can include the upper 1500 positioned on the last 1520 with a vacuum bag 2010 compressed onto the upper 1500, as discussed above with respect to FIGS. 20A and 20B.

As discussed above, the thermoforming process includes increasing the temperature of the textile material, e.g., the upper 1500, to a temperature that can cause at least a portion of the low processing temperature polymeric composition present in the upper 1500 to melt and flow, or to deform. Further, the thermoforming process includes the subsequent decreasing of the temperature of the upper 1500 to solidify the melted low processing temperature polymeric composition into the desired shape, such as an article of footwear.

The thermoforming system 2100 includes a heating zone 2110 that can be configured to heat the entire upper 1500. In aspects, the heating zone 2110 heats the entire upper 1500 to a temperature that is above the melting temperature $T_m$ of the low processing temperature polymeric composition present in the upper 1500.

In aspects, heating the entire upper 1500 can provide for a more efficient streamlined thermoforming process. For example, because fibers and/or yarns comprising the low processing temperature polymeric composition and the fibers and/or yarns comprising the high processing temperature polymeric composition are selected and targeted to specific areas of the upper, it may not be necessary to thermoform only a portion of the upper (such as, for example, by masking a portion of the upper or applying heat to only a portion of the upper), since the high processing temperature polymeric composition can be resistant to undergoing any deformation or melting under conditions that can thermoform the low processing temperature polymeric composition.

As discussed above, it is desirable that the thermoforming process does not deform or alter the fibers and/or yarn comprising the high processing temperature polymeric composition. In such aspects, the heating zone 2110 can heat the entire upper 1500 to a temperature that is below at least one of the creep relaxation temperature $T_{cr}$, the heat deflection temperature $T_{hd}$, or a Vicat softening temperature $T_{vs}$ of the high processing temperature polymeric composition or of the fibers and/or yarn comprising the high processing temperature polymeric composition.

In one or more aspects, the heating zone 2110 can increase the temperature of the entire upper 1500 to a temperature of from about 90° C. to about 240° C. In aspects, the heating zone 2110 can increase the temperature of the entire upper 1500 to a temperature of from about 90° C. to about 200° C. In one aspect, the heating zone 2110 can increase the temperature of the entire upper 1500 to a temperature of from about 110° C. to about 180° C.

In certain aspects, the temperature of the entire upper 1500 can be increased for about 10 seconds to about 5 minutes. In aspects, the temperature of the entire upper 1500 can be increased for about 30 seconds to about 5 minutes. In one aspect, the temperature of the entire upper 1500 can be increased for about 30 seconds to about 3 minutes.

In one or more aspects, the heating zone 2110 can expose the entire upper 1500 to a temperature of from about 90° C. to about 240° C. In aspects, the heating zone 2110 can expose the entire upper 1500 to a temperature of from about 90° C. to about 200° C. In one aspect, the heating zone 2110 can expose the entire upper 1500 to a temperature of from about 110° C. to about 180° C.

In certain aspects, the entire upper 1500 can be exposed to one or more of the heating zone 2110 temperatures or ranges discussed above for about 10 seconds to about 5 minutes. In aspects, the entire upper 1500 can be exposed to one or more of the heating zone 2110 temperatures or ranges discussed above from about 30 seconds to about 5 minutes. In one aspect, the entire upper 1500 can be exposed to one or more of the heating zone 2110 temperatures or ranges discussed above from about 30 seconds to about 3 minutes.

In certain aspects, the heating zone 2110 can expose the entire upper 1500 to a pressure of about 50 kPa to about 300 kPa. In aspects, the heating zone 2110 can expose the entire upper 1500 to a pressure of about 50 kPa to about 250 kPa. In one aspect, the heating zone 2110 can expose the entire upper 1500 to a pressure of about from about 100 kPa to about 300 kPa.

In certain aspects, the entire upper 1500 can be exposed the heating zone 2110 under the above conditions twice in a row prior to undergoing the cooling step.

In various aspects, subsequent to increasing the temperature of the entire upper 1500, the temperature of the entire upper 1500 is decreased to a temperature below the melting temperature $T_m$ of the low processing temperature polymeric composition for a duration of time sufficient for the low processing temperature polymeric composition to solidify. For example, the heating zone 2110 can provide heat using conventional heaters, such as convection heating and/or infrared heating. Further, in certain aspects, the entire upper 1500 can be exposed to the heating zone 2110 either by moving the entire upper 1500 into the heating zone 2110 or by the heating zone 2110 moving to where the upper 1500 is positioned and then moving away after the heating step. The movements of the upper 1500 and/or the heating zone 2110 can be automated or semi-automated using conventional conveyance systems.

In certain aspects, subsequent to heating the entire upper 1500, the entire upper 1500 is cooled to a temperature below the melting temperature $T_m$ of the low processing temperature polymeric composition. In such aspects, the entire upper 1500 can be exposed to reduced temperatures in the cooling zone 2112 either by moving to the cooling zone 2112 or by the cooling zone 2112 moving the upper 1500. The cooling zone 2112 can expose the entire upper 1500 to a pressure of about 0 kPa.

In one or more aspects, the entire upper 1500, when in the cooling zone 2112, can be exposed to a temperature of about −25° C. to about 25° C. In aspects, the entire upper 1500, when in the cooling zone 2112, can be exposed to a temperature of about −10° C. to about 25° C. In one aspect, the entire upper 1500, when in the cooling zone 2112, can be exposed to a temperature of about from about −10° C. to about 10° C.

In certain aspects, the entire upper 1500 can be exposed to one or more of the cooling zone 2112 temperatures or ranges discussed above for about 10 seconds to about 5 minutes. In aspects, the entire upper 1500 can be exposed to one or more of the cooling zone 2112 temperatures or ranges discussed above for about 10 seconds to about 3 minutes. In one aspect, the entire upper 1500 can be exposed to one or more of the cooling zone 2112 temperatures or ranges discussed above for about 10 seconds to about 2.5 minutes.

In certain aspects, once the upper 1500 has been cooled as described above the vacuum bag 2010 and protective sheath 1800 can be removed. In such aspects, any additional components can now be applied to the upper 1500, such as the ground-engaging cleats 1410 of FIG. 14.

Figure 22:
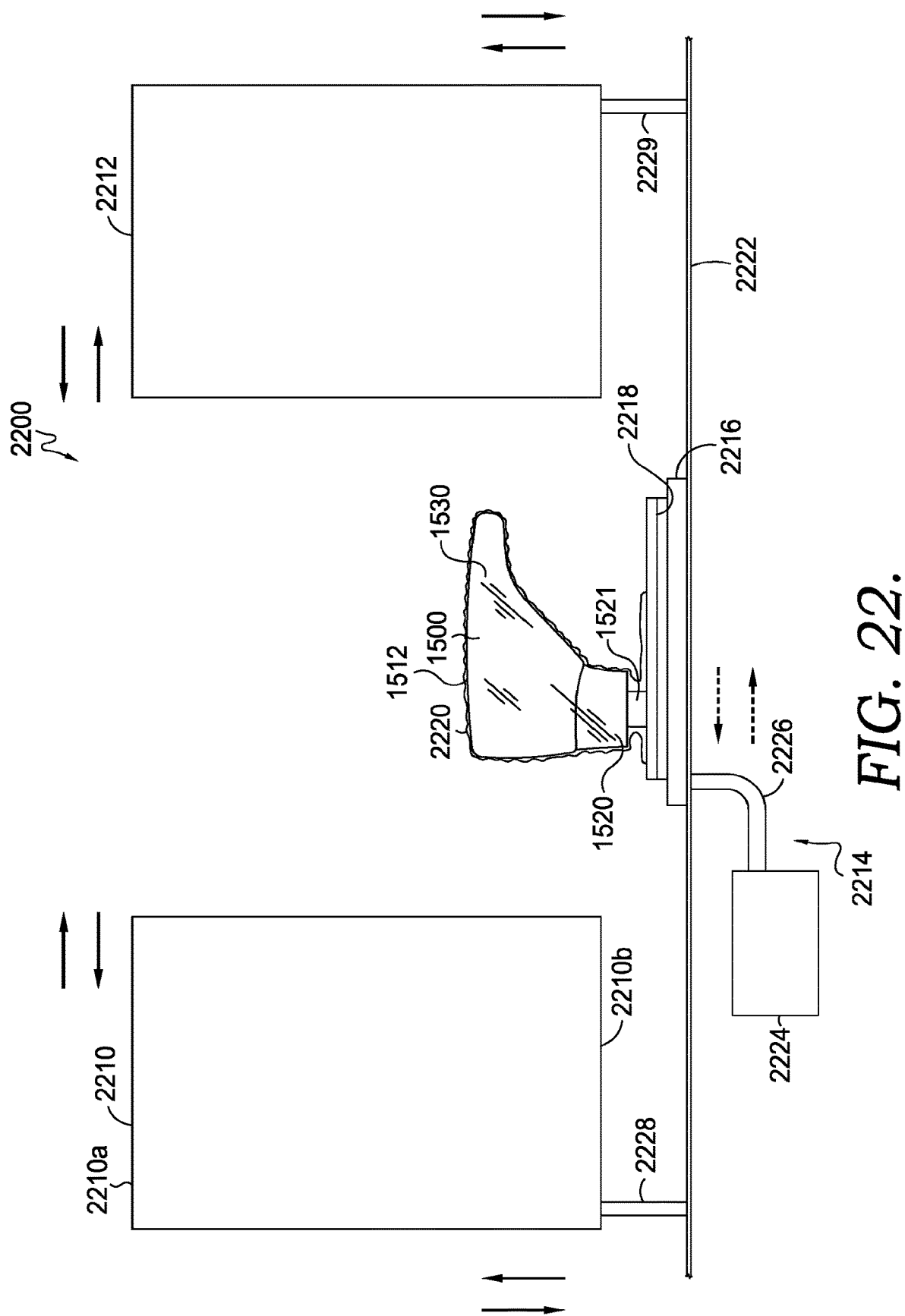
FIG. 22 is a schematic representation of a thermoforming system having a heating station, a cooling station, and a negative pressure generation system, in accordance with aspects of the present invention.

FIG. 22 depicts another aspect of a system 2200 for thermoforming an article. In aspects, the system 2210 can include a heating station 2210, a cooling station 2212, and a negative pressure generation system 2214. In certain aspects, the system 2200 can also include a carriage 2216.

In certain aspects, the thermoforming system 2200 is adapted to expose an article, such as the upper 1500 discussed above with reference to FIGS. 15-19, to a thermoforming process while the article is at least partly sealed inside a forming material or vacuum bag. As discussed herein, an article at least partly sealed inside a forming material or a vacuum bag refers to a forming material or a vacuum bag being compressed onto an outer surface of the article. Sealing an article inside a forming material or vacuum bag is discussed in detail above with reference to FIGS. 20A and 20B. It should be understood that compressing a forming material or vacuum bag onto an outer surface of the article also includes compressing a forming material or vacuum bag onto a protective sheath positioned on the outer surface of the article, such as that discussed above with reference to FIGS. 18-19.

In aspects, in order to seal the article, e.g., the upper 1500, inside the forming material 2220 or vacuum bag, the upper 1500 can be inserted into or at least partly covered with the forming material 2220 or vacuum bag, and the pressure between the outer surface 1530 of the upper 1500 and the forming material 2220 or vacuum bag can be reduced to a pressure below atmospheric pressure. In such aspects, this reduced pressure can compress the forming material 2220 or vacuum bag onto the outer surface of the article. In certain aspects, the forming material 2220 or vacuum bag can be compressed over the entire outer surface of the article, such as the upper 1500. In such aspects, this can provide a compressive force over an outsole portion of the upper 1500, in addition to the midfoot region and the collar region of the upper 1500. Further in such aspects, such a comprehensive compressive force over the entire upper 1500 can provide the forces necessary to shape or form the upper 1500 into a shoe as the upper 1500 undergoes a heating step, where a portion of the article (e.g., portions containing a yarn or fiber that comprises the low processing temperature polymeric composition) melts or deforms, and a cooling step where the melted or deformed portion of the article is cooled and solidified thereby forming the thermoformed article, such as a shoe. In certain aspects, this compressive force may be enhanced by utilizing a protective sheath covering the article, such as that described above with reference to FIGS. 18 and 19, prior to compressing the forming material 2220 or vacuum bag onto the upper 1500. A more detail discussion of the forces and pressure differential that can be utilized in thermoforming an article are discussed above with reference to FIGS. 15-19.

In certain aspects, the negative pressure generation system 2214 can be utilized to reduce the pressure between the outer surface 1530 of the upper 1500 and the forming material 2220 or vacuum bag to a pressure below atmospheric pressure. In certain aspects, the negative pressure generation system 2214 can reduce the pressure between the outer surface 1530 of the upper 1500 and the forming material 2220 or vacuum bag to a pressure of about 0.093 MPa (700 mm Hg) or less. In one or more aspects, the negative pressure generation system 2214 can reduce the pressure between the outer surface 1530 of the upper 1500 and the forming material 2220 or vacuum bag to a pressure of about 0.091 MPa (680 mm Hg) or less.

In various aspects, the negative pressure generation system 2214 can reduce the pressure between the outer surface 1530 of the upper 1500 and the forming material 2220 or vacuum bag to a pressure less than atmospheric pressure in about 10 seconds or less. In aspects, the negative pressure generation system 2214 can reduce the pressure between the outer surface 1530 of the upper 1500 and the forming material 2220 or vacuum bag to a pressure less than atmospheric pressure in about 5 seconds or less. In one aspect, the negative pressure generation system 2214 can reduce the pressure between the outer surface 1530 of the upper 1500 and the forming material 2220 or vacuum bag to a pressure less than atmospheric pressure in about 3 seconds.

In certain aspects, the negative pressure generation system 2214 can include a negative pressure generation device 2224, the forming material 2220 or a vacuum bag, and a sealing member 2218. In such aspects, generally, an article can be placed inside the forming material 2220 or vacuum bag and, which can be sealed, e.g., via the sealing member 2218, and the pressure between the outer surface of the article and the forming material 2220 can be reduced in order to compress the forming material 2220 onto the outer surface of the article. Further, in such aspects, the negative pressure generation device 2224 can be coupled to the sealing member 2218 or directly to the forming material 2220, e.g., via a tube 2226, to provide the reduced pressure. In certain aspects, the negative pressure generation device 2224 can include any commercially available vacuum pump or other commercially available device capable of reducing the pressure inside a material. The forming material 2220 and sealing member 2218 will be discussed in detail below with reference to FIG. 26. It should be understood that the negative pressure generation system 2214 is just one example of a system that can be utilized to compress a forming material, e.g., the forming material 2218, on the outer surface of an article, e.g., the upper 1500.

As discussed above, the thermoforming system 2200 includes a heating station 2210 and a cooling station 2212, which are adapted to expose the article, e.g., the upper 1500, to various temperatures during different steps of the thermoforming process. In such aspects, the thermoforming system 2200 can move the article, e.g., the upper 1500, between the heating station 2210 and the cooling station 2212, or the heating station 2210 and the cooling station 2212 can be moved to the upper 1500, or both. Further, as discussed above, the upper 1500 is exposed to the various thermoforming process steps, e.g., heating and cooling, while being at least partly sealed inside the forming material 2220 or vacuum bag. While the thermoforming process may be described with reference to moving the article, e.g., the upper 1500, between a heating station 2210 and a cooling station 2212, one skilled in the art would understand that the relevant portions of the process and system described herein may be applied so that the heating station 2210 and the cooling station 2212 are moved to receive a stationary article, e.g., the upper 1500.

As discussed above, the thermoforming system 2200, can allow for the article, e.g., the upper 1500, to be exposed to a heating step and a separate cooling step while at least partly sealed inside the forming material 2220, which provides a continuous compressive force on the outer surface of the upper 1500. In such aspects, the negative pressure generation system 2214 can be coupled to one or more other portions of the thermoforming system 2200 so that the upper 1500 can remain sealed inside the forming material 2220 while being received at the heating station 2210 and/or the cooling station 2212.

In certain aspects, at least a portion of the negative pressure generation system 2214 can be coupled to the carriage 2216, which can be configured to move the sealed upper 1500 between the heating station 2210 and the cooling station 2212. For example, the sealing member 2218 of the negative pressure generation system 2214 can be coupled to the carriage 2216. In such aspects, the sealing member 2218 and the carriage 2216 can be coupled to one another in any manner known to one skilled in the art.

In various aspects, the sealing member 2218 and the carriage 2216 can cooperatively move the upper 1500, while sealed in the forming material 2220 or vacuum bag, between the heating station 2210 and the cooling station 2212. For example, in certain aspects, the carriage can be coupled to the upper 1500 via a last 1520 which has been inserted into the article, as described above with reference to FIGS. 15-17. In such aspects, a last support 1521 may extend outward from the last 1520 and be inserted into a portion of the carriage 2216 for securing the lasted upper 1500 to the carriage 2216.

Figure 26:
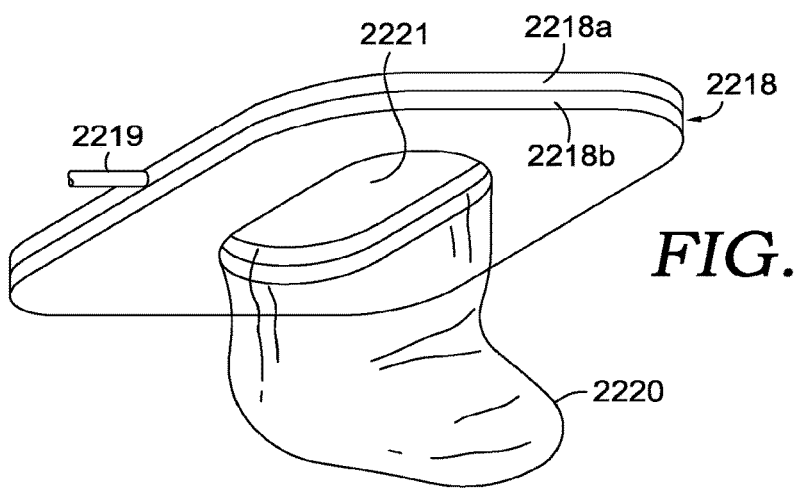
FIG. 26 is a perspective view of a sealing member and forming material of the negative pressure generation system associated with the thermoforming system of FIG. 22, in accordance with aspects of the present invention.

In various aspects, once the lasted article, e.g., the upper 1500 positioned on the last 1520, is coupled to the carriage 2216, the sealing member 2218 can be coupled to the carriage 2216 prior to sealing the forming material 2220 onto the article. FIG. 26 depicts one exemplary aspect of the sealing member 2218. In such aspects, the sealing member 2218 can include a through-opening 2221 for allowing the sealing member 2218 to receive the upper 1500 and be coupled to the carriage 2216. For example, in such aspects, the sealing member 2218 can be placed on top of the carriage 2216 such that the upper 1500 extends through the through-opening 2221.

In certain aspects, the sealing member 2218 can be coupled to the forming material 2220 or vacuum bag. In certain aspects, as can be seen in FIG. 26, a portion of the forming material 2220 can be positioned between a top portion 2218a and a bottom portion 2218b of the sealing member 2218 and extend into the through-opening 2221 and outward away from the sealing member 2218 so as to form a bag shape. In such aspects, the sealing member 2218 can also include a valve 2219 or other connection member for connecting to the negative pressure generation device 2224, e.g., via a tube 2226. In such aspects, this configuration of the forming material 2220 and the sealing member 2218 can allow for sealing the upper 1500 in the forming material 2220 when the sealing member 2218 is placed over the upper 1500 and coupled to the carriage 2216. For example, as can be seen in FIG. 22, the forming material 2220 can be compressed over the entire upper 1500 and a portion of the last 1520, as well as a portion of the sealing member 2218.

The forming material 2220 can be made from any type of material that is capable of compressing onto the outer surface 1530 of the upper 1500 and that will not melt or deform during heating and/or cooling steps described herein. In aspects, the forming material 2220 may not substantially alter the compressive force applied to the outer surface 1530 of upper 1500 under the heating and cooling conditions described herein. In aspects, the forming material 2220 can exhibit at least one of a melting temperature $T_m$, a creep relaxation temperature $T_{cr}$, a heat deflection temperature $T_{hd}$, or a Vicat softening temperature $T_{vs}$ that is greater than about 135° C. In the same or alternative aspects, the forming material 2220 may have reduced, little, or no permeability to air, so as to allow the forming material to compress onto the outer surface 1530 of the upper 1500 when exposed to a pressure less than atmospheric pressure.

It should be understood that the particular configuration of the negative pressure generation system 2214 and carriage 2216 is only exemplary and other configurations or components can be utilized to achieve the movement of an article, e.g., the upper 1500, while at least partly sealed in a forming material, between a heating station 2210 and a cooling station 2212.

As discussed above, in certain aspects, the thermoforming system 2200 can shift the position of the sealed upper 1500 between a heating station 2210 and a cooling station 2212. For example, as depicted in FIG. 22, in certain aspects, the carriage 2216 may be coupled to a track 2222, along which the carriage 2216 can move. In such aspects, the carriage 2216 and the track 2222 can be shiftably coupled to one another in any manner known to one skilled in the art. It should be understood that the carriage 2216 and the track 2222 are only one exemplary aspect of how the article, e.g., the upper 1500, can be moved to and from the heating station 2210 and the cooling station 2212.

In certain aspects, once the article, e.g., the upper 1500, is sealed inside the forming material 2220 and coupled to the carriage 2218, as discussed above, the carriage 2216 can transfer the upper 1500 to the heating station 2210. In such aspects, the heating station 2210 can move to receive the upper 1500 in an interior portion of the heating station 2210. For example, as depicted in FIG. 22, the heating station 2210 can move up and down along a track 2228. In certain aspects, once the upper 1500 is received inside an interior portion of the heating station 2210, an end 2210b of the heating station 2210 can cooperatively interact with the sealing member 2218 and/or the carriage 2216 in order to provide a sealed interior environment within at least a portion of the interior of the heating station 2210, which may allow for a more efficient heating process.

In certain aspects, in the interior portion of the heating station 2210, the article, e.g., the upper 1500, can be exposed to a temperature (and/or be brought to a temperature) sufficient to cause at least a portion of the article to melt and flow, or deform. In such aspects, such a portion of the upper 1500 can include a yarn or fiber the comprises the low processing temperature polymeric composition. In aspects, the heating parameters, such a temperature ranges and times, discussed above with respect to the heating zone 2110 of the system 2100 of FIG. 21 can apply to the heating station 2210 of the thermoforming system 2200.

In one or more aspects, the heating parameters may be at least partly restricted based on the type of materials used in forming the article. For example, in certain aspects, a yarn or fiber formed from a high processing temperature polymeric composition may include a dye, so that when such a yarn or fiber is exposed to an increased temperature, e.g., a temperature approaching that which the yarn or fiber was packaged dyed, the dye may begin to leach out into other surrounding yarn or fibers, which may not be dyed. In such aspects, it may be desirable to expose the article to an increased temperature where such dye leaching will not occur. In such an aspect, the article, e.g., the upper 1500, may be exposed to an increased temperature within the heating station 2210 that is about 135° C. or less.

In certain aspects, when the article is an upper for a shoe, such as the upper 1500, the outsole portion of the upper 1500 can be prominently positioned within an interior portion of the heating station 2210. For example, as can be seen in FIG. 22, the upper 1500 is positioned on the carriage 2216 such that the ground-facing outsole portion 1512 is opposite the carriage 2216, allowing the ground-facing outsole portion 1512 (which may include more yarns or fibers for melting in the thermoforming process compared to other portions of the upper) to be closer than the other portions of the upper 1500 to one or more thermal elements positioned on the end 2210a of the heating station 2210. In aspects, this positioning of the upper 1500 within the heating station 2210 can also allow for the entire upper 1500 to be free of obstruction or contact to other portions of the system 2200, such as the carriage 2216 or the sealing member 2218, when positioned within the heating station 2210. The heating station 2210 and associated thermal elements are discussed in more detail below.

In various aspects, as the article undergoes heating, and a portion of the article melts or deforms, bubbles may develop during this process, which may be reduce structural integrity and/or reduce the aesthetic qualities of the thermoformed article. In certain aspects, the reduced pressure generated by the negative pressure generation system 2214 may not be sufficient to facilitate the removal of bubbles from the article as it undergoes the heating step. In such aspects, the interior portion of the heating station 2210 may be pressurized, which can facilitate or aid in the removal of such bubbles from the outer surface of the article as it undergoes the heating step. In certain aspects, pressurizing the interior portion of the heating station 2210 may also provide additional compressive force on the outer surface of the article.

In certain aspects, at least a portion of the interior of the heating station 2210 can be pressurized using any conventional systems, such as by forcing air, e.g., heated air, into the sealed interior environment. In one or more aspects, the interior environment or interior portion of the heating station 2210 can be pressurized to a pressure of about 0.6 MPa (about 6 kg/cm$^2$). In certain aspects, the interior environment or interior portion of the heating station 2210 can be pressurized to a pressure of about 0.4 MPa (about 4 kg/cm$^2$). In one aspect, the interior environment or interior portion of the heating station 2210 can be pressurized to a pressure of from about 0.1 MPa (about 1 kg/cm$^2$) to about 0.6 MPa (about 6 kg/cm$^2$).

In certain aspects, after the upper 1500 is received in the interior portion of the heating station 2210 and exposed to an increased temperature as discussed above, the upper 1500 may be transferred to the cooling station 2212, via the carriage 2216. In such aspects, the cooling station 2212 may move up and/or down along a track 2229 in order to receive the upper 1500 and provide a sealed interior portion for the upper 1500 to be exposed to a decreased temperature. The cooling parameters, such as temperature and time, discussed above with respect to the cooling zone 2112 of the system 2100 of FIG. 21 can apply to the cooling station 2212. In certain aspects, the cooling zone 2112 can utilize any conventional cooling system or processes, such as air knife forced air cooling to provide directed air over the article providing for the transfer of thermal energy away from the article. In the same or alternative aspects, the system can utilize a chilled chamber, e.g., utilizing a refrigerant to cool an interior portion of the cooling station 2212 where the article can be received.

In certain aspects, the cooling zone 2212 can pressurize an interior portion of the cooling station 2212 in order to maintain additional compressive force upon the outer surface 1530 of the upper 1500, or to facilitate the removal of bubbles form the upper 1500. In such aspects, the parameters discussed above with reference to pressurizing the interior portion of the heating station 2210 can apply to pressurizing an interior portion of the cooling station 2212.

It should be understood that additional heating and cooling stations can be provided in the thermoforming system 2200, e.g., to allow for higher throughput. For example, in one aspect, the time needed to cool the article may be longer than the time needed to heat another article, so to increase throughput, an article can be exposed to a first cooling station for a first block of time and then transported to another cooling station for a second block of time, while another article that just left the heating station can be received in the first cooling station.

In certain aspects, once the article has completed the cooling step(s), the forming material 2220 may be removed from the article, once the compressive force on the outer surface of the article is no longer desired. In such aspects, to relieve the compression of the forming material 2220 on the article, the pressure between the outer surface of the article and the forming material can be increased back to atmospheric pressure (e.g., the vacuum pressure may be removed). In the same or alternative aspects, the pressure between the surface of the article and the forming material can be increased to a pressure above atmospheric pressure so as to facilitate the removal of the forming material 2220 from the outer surface of the article. In certain aspects, this increase in pressure between the surface of the article and the forming material can be provided by the negative pressure generation device 2224.

Figure 23:
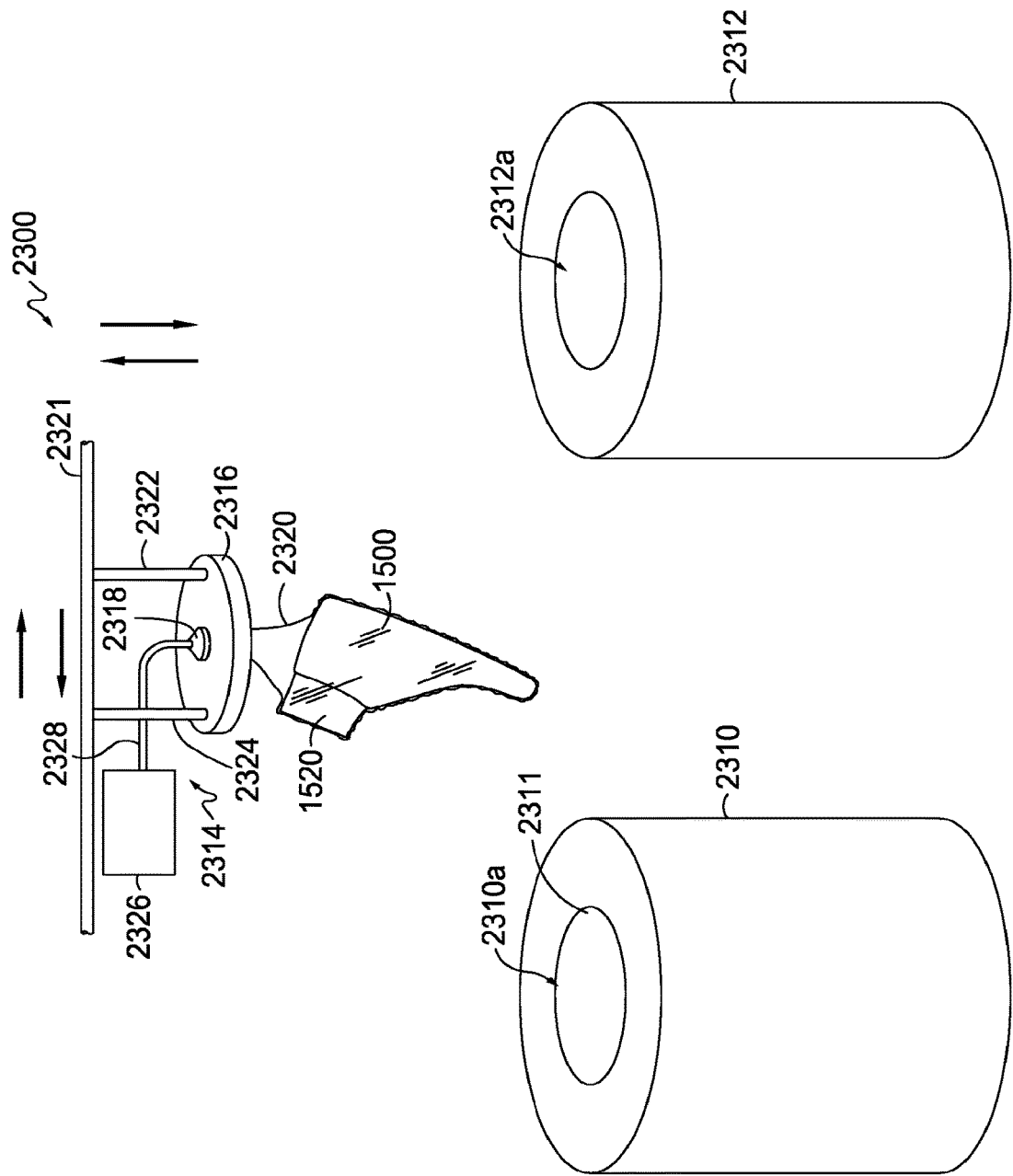
FIG. 23 is a schematic representation of another thermoforming system having a heating station, a cooling station, and a negative pressure generation system, in accordance with aspects of the present invention.

FIG. 23 depicts another exemplary aspect of a thermoforming system 2300. As can be seen in the aspect depicted in FIG. 23, the thermoforming system 2300 can include a heating station 2310, a cooling station 2312, a negative pressure generation system 2314, and a carriage 2316.

In certain aspects, generally, the thermoforming system 2300 functions similar to the thermoforming system 2200 of FIG. 22. For example, in aspects, an article, e.g., an upper 1500 that can be positioned on a last 1520, is at least partly sealed within a forming material 2320 prior to being received in the heating station 2310 and the cooling station 2312 in such a manner so that the article can undergo the heating and cooling steps of the thermoforming process while sealed within the forming material 2320, which can provide a compressive force on the outer surface of the article.

In such aspects, the negative pressure generation system 2314 can function similarly to that described above with reference to the negative pressure generation system 2214 of FIG. 22, and can include similar functioning components. For example, the negative pressure generation system 2314 can include a negative pressure generation device 2326 that is coupled to a sealing member 2318, via a tube 2328 or conduit. In aspects, the sealing member 2318 is coupled to the forming material 2320 in such a manner so as to provide a sealed environment to reduce the pressure between the outer surface of the article, e.g., the outer surface 1530 of the upper 1500, and the forming material 2320 so that the forming material provides a compressive force on the outer surface of the article.

In certain aspects, the sealing member 2318 can be coupled to a carriage 2316 for moving the sealed article between the heating station 2310 and the cooling station 2312. In the aspect depicted in FIG. 23, the carriage 2316 can include carriage coupling members 2324 and 2322 for coupling the carriage 2316 to a track 2321, which the carriage 2316, via the carriage coupling members 2324 and 2322, can traverse along. In certain aspects, the carriage coupling members 2324 and 2322 can extend the article into an interior portion 2310a of the heating station 2310 and into an interior portion 2312a of the cooling station 2312. In the same or alternative aspects, the track 2321 can move downward to transport the article to the heating station 2310 and to the cooling station 2312. It should be understood that the carriage 2316, carriage coupling member 2322 and 2324, and the track 2321 are only one exemplary aspect that may be utilized for transporting the sealed article to the heating station 2310 and the cooling station 2312 and that other transport systems are within the scope of the present disclosure.

In certain aspects, similar to the system 2200 of FIG. 22, the carriage 2318 and the heating station 2310 can be adapted to provide an enclosed environment for the article, when positioned in the interior portion 2310a of the heating station 2310 or the interior portion 2312a of the cooling station 2312. For example, in certain aspects, the shape and size of the carriage 2316 is adapted to seal off an opening 2311 of the heating station 2310, through which the article enters.

In certain aspects, the heating station 2310 and the cooling station 2312 can expose the article to the same temperature and time parameters as that discussed above for the respective heating station 2210 and cooling station 2212 of FIG. 22. In the same or alternative aspects, the heating station 2310 and the cooling station 2312 can provide an increased pressure environment while heating or cooling the article, as discussed above with respect to the thermoforming system 2200 of FIG. 22.

Further, in certain aspects, once the heating and cooling steps of the thermoforming process are completed, when utilizing the thermoforming system 2300, increased pressure may be provided between the outer surface of the article and the forming material 2320 so as to facilitate the release of the forming material 2320 off the outer surface of the article.

Figure 24:
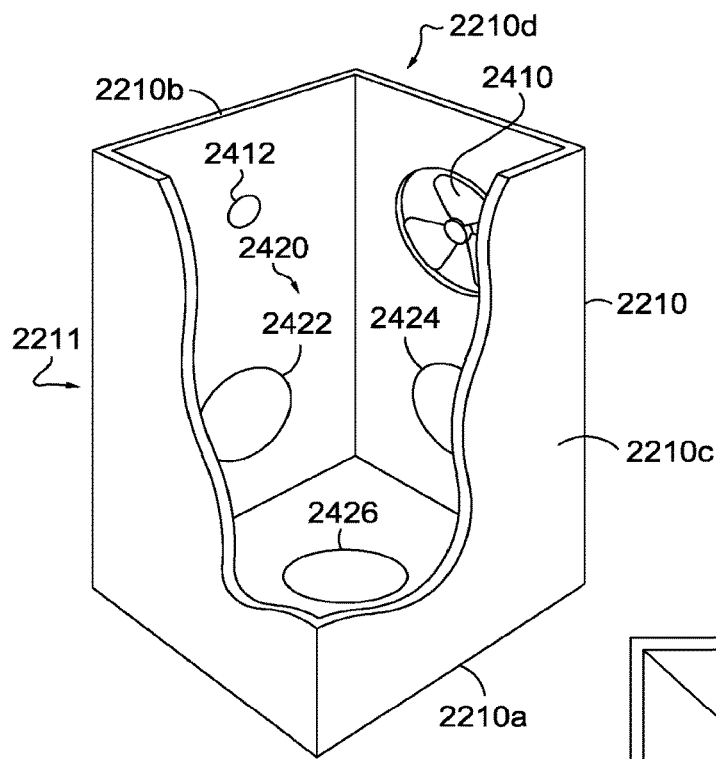
FIG. 24 is a perspective view of a heating station of the thermoforming system of FIG. 22, showing a plurality of thermal elements, a positive pressure source, and a fan, in accordance with aspects of the present invention.
Figure 25:
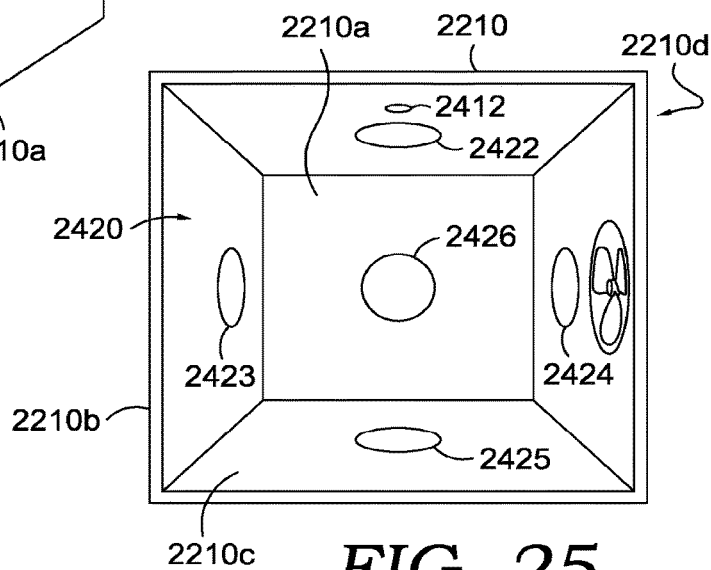
FIG. 25 is a top view of the heating station of FIG. 24, in accordance with aspects of the present invention.

Turning now to FIGS. 24 and 25, the heating station 2210 of the thermoforming system 2200 of FIG. 22 is depicted in more detail. It should be understood that while FIGS. 24 and 25 may depict various features of the heating station 2210 of the thermoforming system 2200 of FIG. 22, any or all of these features may be present in the heating station 2310 of the thermoforming system 2300 of FIG. 23.

In certain aspects, the heating station 2210 can include one or more sidewalls 2210c positioned between opposing ends 2210a and 2210b forming a partially enclosed structure 2211. In certain aspects, the heating station 2210 is sized to receive an article, such as an upper 1500 for shoe. In certain aspects, as discussed above, the end 2210b can be adapted to receive the article, e.g., the upper 1500, into an interior portion 2210d and couple the heating station 2210 to at least a portion of the carriage 2216 or the sealing member 2218. It should be understood that these general properties of the heating station 2210 also apply to the cooling station 2212.

As discussed above, the heating station 2210 can include one or more thermal elements adapted to provide an increased temperature to an interior portion of the heating station 2210. For example, the heating station 2210 depicted in FIGS. 24 and 25 can include a plurality thermal elements 2420 positioned within an interior portion 2210d of the heating station 2210. In certain aspects, the thermal elements 2420 can include any type of commercially available thermal elements, as long as such thermal elements are capable of increasing the temperature in an interior portion 2210d of the heating station 2212 in the manner described herein. In certain aspects, the thermal elements 2420 are adapted to heating the interior portion 2210d of the heating station 2212 to at least 200° C., or at least 250° C. within about 40-60 seconds. In certain aspects, the plurality of thermal elements 2420 can include one or more infrared radiation sources. In one or more aspects, the plurality of thermal elements 2420 can include about 10, about 14, or about 19 individual infrared radiation sources or other thermal elements. In one aspect, one or more infrared radiation sources can include one or more infrared lamps.

In certain aspects, the plurality of thermal elements 2420 can be independently be controlled or can be defined in zones to allow for zonal control. In such aspects, this can allow for an even temperature distribution and/or can provide a multitude of combinations for ramping up the temperature, individually, zonally, or collectively within the interior portion 2210d of the heating station 2210. In aspects, controlling the thermal elements can include turning them on and/or off, once or more than once, and/or can include controlling the amount of thermal energy created while the thermal element is on.

In certain aspects, the plurality of thermal elements 2420, e.g., one or more infrared radiation sources, are sized to cover an entire maximum dimension (e.g., length) of the article, e.g., the upper 1500. In such aspects, one or each of the plurality of thermal elements 2420, e.g., one or more infrared radiation sources, can extend along a distance of about 300 mm to about 400 mm. It should be understood that the plurality of thermal elements 2420 depicted in FIGS. 24 and 25 are only schematic and may or may not represent an actual style or shape of one or more of the thermal elements 2420.

In one or more aspects, the plurality of thermal elements 2420, e.g., one or more infrared radiation sources, can be positioned on one or more of the ends 2210a and 2210b, the one or more sidewalls 2210c, or a combination thereof. For example, as can be seen in the aspect depicted in FIGS. 24 and 25, individual thermal elements 2422, 2423, 2424, 2425, and 2426 are placed on separate walls or ends within the heating station 2210. In such aspects, having individual thermal elements (or zones of thermal elements) positioned on various walls or ends within the heating station 2210 can allow for even distribution of heat applied to the article, e.g., the upper 1500. For example, in such aspects, having thermal elements positioned on the one or more sidewalls 2210c and one or more ends 2210a, 2210b can provide for 360-degree heating of the entire article. In aspects, all outer surfaces or sides of the article can be directly facing one or more thermal elements (e.g., when thermal elements are positioned on each sidewall and one or more ends of the heating station 2210) to allow for even distribution of the thermal energy to the article. In one aspect not depicted in the figures, each the plurality of thermal elements 2420 may be positioned on the end 2210a of the heating station 2210.

In certain aspects, the specific positioning of the plurality of thermal elements 2420, e.g., on one or more side walls 2210c, or one or more ends 2210a and 2210b of the heating station 2210, alone or in combination with the ability to control (e.g., turn on or off) the plurality of thermal elements 2420 individually, collectively, or zonally, may allow for even distribution of thermal energy or targeted distribution of thermal energy to various portions of an article. For example, in certain aspects, an article, e.g., the upper 1500, may include different concentrations of, and/or different types of materials (e.g., yarns or fibers comprising the low processing temperature polymeric composition and yarns or fibers comprising the high processing temperature polymeric composition) in various positions of the upper, which when exposed to thermal energy may result in these different materials (and/or different concentrations of the materials) conducting the thermal energy at different rates. In such an aspect, continually exposing the article to constant thermal energy may result in overheating certain regions with one type or concentration of a material while heating another region of the article with another type or concentration of a material to a desired temperature. In aspects, turning the thermal elements on and/or off (once or more than once)

individually, zonally, or collectively, may reduce the likelihood of overheating an article or portion of an article.

In certain aspects, the temperature of the surface of the article being exposed to thermal energy in the heating station 2210 can be determined at one or more regions of the article, in addition to determining the temperature of the interior portion or opposing surface of the article. In such aspects, these temperatures can be utilized to develop a heating profile for a particular article, so that while the article is positioned within the heating station 2210 during a heating step certain (or all) thermal elements can be turned on and/or off (once or more than once), such as for a zone of thermal elements positioned on the end 2210a so as to provide a desired amount of thermal energy to all or a portion of the article that is most closely positioned to the thermal elements on the end 2210a.

In an exemplary aspect, an article, such as the upper 1500, can include a ground-facing outsole portion that has a greater concentration of yarns or fibers that comprise the low processing temperature polymeric composition than other portions of the upper 1500, such as the ankle collar region. In such an aspect, the ground-facing outsole portion of the upper 1500 that includes an increased concentration of yarns or fibers that comprise the low processing temperature polymeric composition may require additional or less thermal energy than another portion of the upper 1500 having a reduced concentration of yarns or fibers that comprise the low processing temperature polymeric composition. In this aspect, the thermal elements can be turned on and/or off, once or repeatedly, and individually or zonally in order to compensate for the differing thermal conduction properties of the different materials at different portions of the upper 1500 so as to not allow a portion of the upper 1500 to overheat and/or to allow different portions of the upper to be heated to a desired temperature.

In certain aspects, as discussed above, it may be desirable to provide moving air within the interior portion 2210d of the heating station 2210 to evenly distribute the thermal energy or heat therein. In one such aspect, an air circulation device 2410, e.g., a convection fan or other air circulation system, may be positioned on at least one of the one or more sidewalls 2210c or end 2210a or 2210b, to provide for the circulation of air within the interior portion 2210d of the heating station 2210. It should be understood that while a convection fan is schematically depicted as one exemplary air circulation device 2410 in FIGS. 24 and 25, other air circulation systems can be utilized.

As discussed above, in certain aspects, the heating station 2210 can provide increased pressure within the interior portion 2210d, e.g., to facilitate the removal of bubbles from the heated article. For example, in such aspects, a port 2142 may be positioned on at least one of the one or more sidewalls 2210c, or one or more of the ends 2210a or 2210b, to provide a conduit to provide air, e.g., heated air into the interior portion 2210d to increase the pressure therein. In one aspect, the air utilized to increase the pressure in the heating station can exhibit a temperature of about 100° C. In certain aspects not depicted in the figures, the air circulation device 2410 may be utilized to provide such air to increase the pressure therein. In such an aspect, the air circulation device 2410 may not simultaneously provide convection air circulation and air for pressurization of the interior portion 2210d.

In certain aspects, the use of the plurality of thermal elements 2420, e.g., one or more infrared radiation sources, the air circulation device 2410, and the increased pressure within the interior portion 2210d of the heating station 2210, and the compressive force of the forming material 2220 can provide even distribution of heat over the entire article, e.g. the entire upper 1500, while also applying an evenly distributed compressive force over the entire article, e.g. the entire upper 1500.

In certain aspects, the heating station 2210 may first utilize the thermal elements alone or in combination with convection to distribute the thermal energy, and after a duration of time, the heating station 2210 may then become pressurized to facilitate the removal of bubbles from the heated article. In such aspects, when the heating station 2210 is pressurized the convection, or air circulation, may not be utilized.

Figure 27:
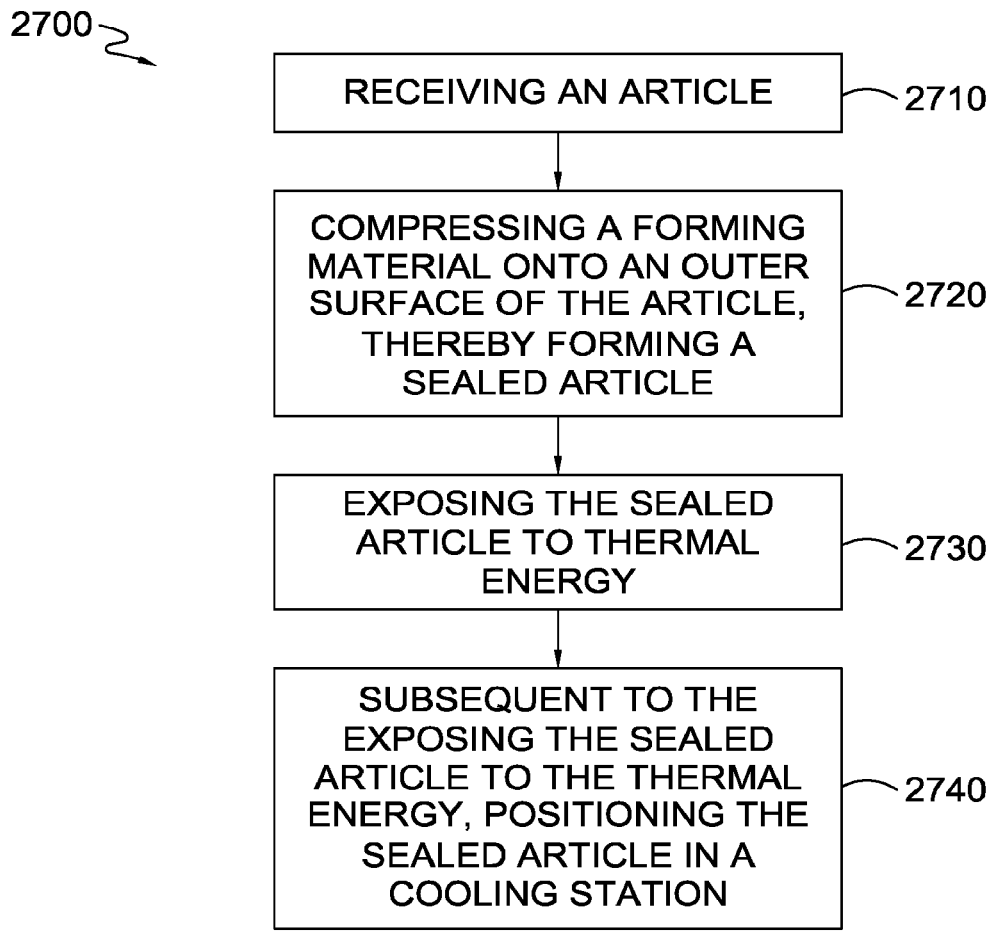
FIG. 27 is a flow diagram of an exemplary process for thermoforming an article, in accordance with aspects of the present invention.

FIG. 27 depicts one aspect of a method 2700 for thermoforming an article. The method 2700 can include a step 2710 of receiving an article. In certain aspects, the article can include an upper 1500 discussed above with reference to FIGS. 15-19. In one or more aspects, the upper can include the targeted incorporation of: 1) a yarn or fiber comprising the low processing temperature polymeric composition described above; and/or 2) a yarn or fiber comprising the high processing temperature polymeric composition described above.

Further, as discussed above, the upper 1500 can be positioned on a last, e.g., the last 1520, and may also include a protective sheath, e.g., the protective sheath 1800, positioned over the upper 1500.

Step 2720 includes compressing a forming material, e.g., the forming material 2220 onto an outer surface of the article, e.g., the outer surface 1530 of the upper 1500, forming a sealed article, as discussed above with reference to the thermoforming system 2200 of FIG. 22. In such aspects, as discussed above, the compressive force of the forming material 2220 on the outer surface of the article can aid in forming the article as it undergoes the heating and cooling steps of the thermoforming process.

In one or more aspects, the step 2730 can include exposing the sealed article to thermal energy. In such aspects, the sealed article can be exposed to thermal energy under any of the parameters discussed above with respect to the thermoforming system 2200 of FIG. 22 or the thermoforming system 2300 of FIG. 23. In aspects, the sealed article can be exposed to thermal energy while maintaining the pressure between the outer surface of the article and the forming material to the pressure below atmospheric pressure, and while pressurizing at least a portion of the heating station containing the sealed article to a pressure above atmospheric pressure. In such aspects, by maintaining the pressure between the outer surface of the article and the forming material to the pressure below atmospheric pressure during the heating of step 2730, the compressive force on the outer surface of the article is maintained as a portion of the article, e.g., a yarn of fiber comprising the low processing temperature polymeric composition is melted or deformed, thereby restricting the flow of the melted material and/or facilitating the molding or forming of the article. In certain aspects, the sealed article can be exposed to thermal energy using heating station 2210, as well as other components of the thermoforming system 2200 of FIG. 22, such as the carriage 2216 and the negative pressure generations system 2214 (or the heating station 2310 and other components of the thermoforming system 2300 of FIG. 23).

As discussed above, in certain aspects, the air within an interior portion of a heating station utilized to expose the sealed article to thermal energy can be circulated, to provide even heat distribution to the article.

In various aspects, the step 2740 can include, subsequent to exposing the sealed article to thermal energy, positioning the sealed article in a cooling station. In such aspects, the cooling station 2212 of FIG. 22 can be utilized (or the cooling station 2312 of FIG. 23), including the respective cooling parameters. In certain aspects, as discussed above, the sealed article can be positioned in the cooling station while maintaining the pressure between the outer surface of the article and the forming material to the pressure below atmospheric pressure. In such aspects, by maintaining the pressure between the outer surface of the article and the forming material to the pressure below atmospheric pressure during the cooling of step 2740, the compressive force on the outer surface of the article is maintained, which allows any portions of the article (such as portions of the upper 1500) that were melted or deformed during a prior heating step to cool and solidify to the desired shape, e.g., the shape at least partly provided by a last 1520. In certain aspects, the sealed article can be positioned in the cooling station 2212, with the aid of other components of the thermoforming system 2200 of FIG. 22, such as the carriage 2216 and the negative pressure generation system 2214 (or the cooling station 2312 and other components of the thermoforming system 2300 of FIG. 23).

In certain aspects, as discussed above with reference to the cooling station 2212 of FIG. 22, the pressure within an interior portion of the heating station, such as the heating station 2212, can be increased, e.g., to facilitate the removal of bubbles in the article.

Definitions

Unless otherwise specified, the following terms as used herein have the meanings provided below:

The term "textile" refers to woven, non-woven, or knit collection of materials, and include pre- and post-thermoformed textiles.

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

Reference to "a chemical compound" refers to one or more molecules of the chemical compound, rather than being limited to a single molecule of the chemical compound. Furthermore, the one or more molecules may or may not be identical, so long as they fall under the category of the chemical compound. Thus, for example, "a polyamide" is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

Unless otherwise specified, temperatures referred to herein are based on atmospheric pressure (i.e. one atmosphere).

Property Analysis and Characterization Procedures

Various properties and characteristics of the part and support materials described herein are evaluated by various testing procedures as described below:

Method to Determine the Creep Relation Temperature $T_{cr}$

The creep relation temperature $T_{cr}$ is be determined according to the exemplary techniques described in U.S. Pat. No. 5,866,058. The creep relaxation temperature $T_{cr}$ is calculated to be the temperature at which the stress relaxation modulus of the tested material is 10% relative to the stress relaxation modulus of the tested material at the solidification temperature of the material, where the stress relaxation modulus is measured according to ASTM E328-02. The solidification temperature is defined as the temperature at which there is little to no change in the stress relaxation modulus or little to no creep about 300 seconds after a stress is applied to a test material, which can be observed by plotting the stress relaxation modulus (in Pa) as a function of temperature (in ° C.).

Method to Determine the Vicat Softening Temperature $T_{vs}$

The Vicat softening temperature $T_{vs}$ is be determined according to the test method detailed in ASTM D1525-09 Standard Test Method for Vicat Softening Temperature of Plastics, preferably using Load A and Rate A.

Method to Determine the Heat Deflection Temperature $T_{hd}$

The heat deflection temperature $T_{hd}$ is be determined according to the test method detailed in ASTM D648-16 Standard Test Method for Deflection Temperature of Plastics Under Flexural Load in the Edgewise Position, using a 0.455 MPa applied stress.

Methods to Determine the Melting Temperature $T_m$ and Glass Transition Temperature $T_g$ The melting temperature $T_m$ and glass transition temperature $T_g$ are determined using a commercially available Differential Scanning calorimeter ("DSC") such as a TA Instruments DSC Q2000.

In this method, a 10-15 gram sample is placed into an aluminum DSC pan and then the lead was sealed with the crimper press. The DSC is configured to scan from −100° C. to 225° C. with a 20° C./minute heating rate, hold at 225° C. for 2 minutes, and then cool down to 25° C. at a rate of −10° C./minute. The DSC curve created from this scan is then analyzed using standard techniques to determine the glass transition temperature $T_g$ and the melting temperature $T_m$.

Method to Determine the Melt Flow Index

The melt flow index is determined according to the test method detailed in ASTM D1238-13 Standard Test Method for Melt Flow Rates of Thermoplastics by Extrusion Plastometer, using Procedure A described therein.

Method to Determine the Cold Ross Flex

The cold ross flex test is determined according the following test method. The purpose of this test is to evaluate the resistance to cracking of a sample under repeated flexing to 60 degrees in a cold environment. A thermoformed plaque of the material for testing is sized to fit inside the flex tester machine. Each material is tested as five separate samples.

The flex tester machine is capable of flexing samples to 60 degrees at a rate of 100+/−5 cycles per minute. The mandrel diameter of the machine is 10 millimeters. Suitable machines for this test are the Emerson AR-6, the Satra STM 141F, the Gotech GT-7006, and the Shin II Scientific SI-LTCO (DaeSung Scientific).

The sample(s) are inserted into the machine according to the specific parameters of the flex machine used. The machine is placed in a freezer set to −6° C. for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

Method to Determine the Modulus

The modulus for a thermoformed plaque of material is determined according to the test method detailed in ASTM D412-98 Standard Test Methods for Vulcanized Rubber and Thermoplastic Rubbers and Thermoplastic Elastomers-Tension, with the following modifications. The sample dimension is the ASTMD412-98 Die C, and the sample thickness used is 2.0 millimeters+/−0.5 millimeters. The grip type used is a pneumatic grip with a metal serrated grip face. The grip distance used is 75 millimeters. The loading rate used is 500 millimeters/minute. The modulus (initial) is calculated by taking the slope of the stress (MPa) versus the strain in the initial linear region.

The modulus for a yarn is determined according to the test method detailed in EN ISO 2062 (Textiles-Yarns from Packages)—Determination of Single-End Breaking Force and Elongation at Break Using Constant Rate of Extension (CRE) Tester, with the following modifications. The sample length used is 600 millimeters. The equipment used is an Instron and Gotech Fixture. The grip distance used is 250 millimeters. The pre-loading is set to 5 grams and the loading rate used is 250 millimeters/minute. The first meter of yarn is thrown away to avoid using damaged yarn. The modulus (initial) is calculated by taking the slope of the stress (MPa) versus the strain in the initial linear region.

Method to Determine Tenacity and Elongation

The tenacity and elongation of yarn can be determined according to the test method detailed in EN ISO 2062 Determination of single end breaking force and elongation at break using constant rate of extension tester with the pre-load set to 5 grams.

Method to Determine Shrinkage

The free-standing shrinkage of fibers and/or yarns can be determined by the following method. A sample fiber or yarn is cut to a length of approximately 30 millimeters with minimal tension at approximately room temperature (e.g., 20° C.). The cut sample is placed in a 50° C. or 70° C. oven for 90 seconds. The sample is removed from the oven and measured. The percentage of shrink is calculated using the pre- and post-oven measurements of the sample, by dividing the post-oven measurement by the pre-oven measurement, and multiplying by 100.

Method to Determine Enthalpy of Melting

The enthalpy of melting is determined by the following method. A 5-10 mg sample of fibers or yarn is weighed to determine the sample mass, is placed into an aluminum DSC pan, and then the lid of the DSC pan is sealed using a crimper press. The DSC is configured to scan from −100° C. to 225° C. with a 20° C./minute heating rate, hold at 225° C. for 2 minutes, and then cool down to room temperature (e.g., 25° C.) at a rate of −10° C./minute. The enthalpy of melting is calculated by integrating the area of the melting endotherm peak and normalizing by the sample mass.

EXAMPLES

The present disclosure is more particularly described in the following examples that are intended as illustrations only, since numerous modifications and variations within the scope of the present disclosure will be apparent to those skilled in the art.

Example 1: Evaluation of Commercially Available Polymeric Materials for Use as Components of the Low Processing Temperature Polymeric Composition In this example, twenty-five commercially available polymers were evaluated for their suitability as components of the low processing temperature polymeric composition. Samples of the polymers were evaluated in yarn and/or resin form to determine their melting temperature $T_m$, how many cycles they could withstand under the cold ross flex (CRF) test, their shrinkage in yarn form, and their physical appearance after thermoforming. The results are provided in Table 1 below.

Table 1

Evaluation of Commercially Available Polymeric Materials

| Material Name | Manufacturer | Polymer | Form Tested | Comment |
|---|---|---|---|---|
| K85 | EMS | CoPA | Yarn | Good $T_m$, Poor CRF |
| K110 | EMS | CoPA | Yarn | Good $T_m$, Poor CRF |
| K140 | EMS | CoPA | Yarn | Good $T_m$, Poor CRF |
| K140/K110 (30:70) | EMS | CoPA | Resin | Good $T_m$, Poor CRF |
| K140/K110 (50:50) | EMS | CoPA | Resin | Good $T_m$, Poor CRF |
| K140/K110 (70:30) | EMS | CoPA | Resin | Good $T_m$, Poor CRF |
| K178 | EMS | CoPA | Yarn | Good $T_m$, Poor CRF |
| PA12 (Sample 2) | EMS | PA12 | Resin | Poor $T_m$, Good CRF |
| HTg PA (Sample 1) | EMS | PA | Resin | Good $T_m$, Poor CRF |
| HTg PA (Sample 2) | EMS | PA | Resin | Good $T_m$, Poor CRF |
| K140/PA6 bicofiber Nonwoven pressed | EMS | CoPA/PA6 | Resin | Good $T_m$, Poor CRF |
| G125 | Hyosung | PA6 | Yarn | Good $T_m$, Poor CRF |
| 5220 | Schaetti | CoPA | Resin | Good $T_m$, Poor CRF |
| 5250 | Schaetti | CoPA | Resin | Good $T_m$, Poor CRF |
| 5290 | Schaetti | CoPA | Resin | Good $T_m$, Poor CRF |

Table 1-continued

Evaluation of Commercially Available Polymeric Materials

| Material Name | Manufacturer | Polymer | Form Tested | Comment |
|---|---|---|---|---|
| 5424 | Schaetti | CoPA | Resin | Good $T_m$, Poor CRF |
| Flor-M | Unitika | PA | Yarn | Good $T_m$, Poor CRF |
| Platamid H 2694/ Pebax 4023 SA | Arkema | PA | Resin | Good $T_m$, Good CRF, Good Shrinkage Level |
| Pearlbond DIPP 119 | Lubrizol | TPU | Resin | Good $T_m$, Poor CRF |
| Estane 58213 | Lubrizol | TPU | Resin | Good $T_m$, Poor Shrinkage Level |
| PM110646 Tack Yarn | Techmer | LLDPE | Yarn | Good $T_m$, Poor color (not transparent) |
| Irogran CA116 | Huntsman | TPU | Resin | Good $T_m$, Poor color (yellow tint) |
| Irogran CA117 | Huntsman | TPU | Resin | Good $T_m$, Poor color (yellow tint) |
| Irogran CA9068 | Huntsman | TPU | Resin | Good $T_m$, Poor color (yellow tint) |
| Irogran PS456 | Huntsman | TPU | Resin | Good $T_m$, Poor color (yellow tint) |

CoPA = co-polyamide;
PA = polyamide;
PA12 = Nylon 12;
PA6 = Nylon 6;
TPU = thermoplastic polyurethane, LLDPE = linear low-test density polyethylene, $T_m$ = melting temperature, CRF = Cold Ross Flex While most of these commercially available materials had a melting temperature Tm within the desired range of less than about 125° C., the vast majority of the materials did not have the ideal balance of properties making them suitable for use in articles of footwear and apparel. For example, many of the materials had a yellow tint or were not transparent then thermoformed. Some of the materials, when extruded to form yarns, produced yarns with unacceptably high levels of shrinkage. Also, many of the materials became somewhat brittle under cold conditions and so were unable to withstand over 150,000 cycles of testing using the cold Ross flex test method, making the materials undesirable for some footwear applications.

For applications where it is unacceptable for the materials to become brittle under cold conditions, the Platamid H 2694/Pebax 4023 SA from Arkema was found to be the one polymer tested that passed the Cold Ross Flex (CRF) test at the desired level. This material exhibited all the other favorable polymeric properties desired for use in the low processing temperature polymeric composition described herein, such as a favorable melting temperature $T_m$, and remaining clear when thermoformed.

Although the present disclosure has been described with reference to preferred aspects, workers skilled in the art will recognize that changes may be made in form and detail without departing from the spirit and scope of the disclosure.

What is claimed is:

1. A method for thermoforming an article, the method comprising:
   receiving an article;
   compressing a forming material onto an outer surface of the article by reducing the pressure between the outer surface of the article and the forming material to a pressure below atmospheric pressure, thereby forming a sealed article;
   exposing the sealed article to thermal energy in a heating station while maintaining the pressure between the outer surface of the article and the forming material to the pressure below atmospheric pressure;
   transferring the sealed article from the heating station to a cooling station with a carriage, wherein the carriage is coupled to at least a portion of a negative pressure generation system when moving the sealed article; and
   subsequent to the exposing the sealed article to thermal energy, positioning the sealed article in a cooling station while maintaining the pressure between the outer surface of the article and the forming material to the pressure below atmospheric pressure.

2. The method according to claim 1, wherein the forming material exhibits a melting temperature Tm that is greater than about 135° C.

3. The method according to claim 1, wherein at least a portion of the article is covered in a protective sheath.

4. The method according to claim 1, wherein the article comprises an upper for a shoe, the upper comprising an outsole portion, and wherein the method further comprises placing the upper on a last so that an outsole portion covers a bottom portion of the last.

5. The method according to claim 1, wherein the heating station comprises an enclosed structure having an interior portion that is defined by first and second opposing ends, and at least one sidewall, and wherein the first end is adapted for receiving at least a portion of the sealed article.

6. The method according to claim 5, wherein the article comprises an upper for a shoe, the upper comprising an outsole portion, and wherein the method further comprises positioning the upper in the interior portion of the heating station such that the outsole portion is prominent to the one or more thermal elements.

7. The method according to claim 1, subsequent to positioning the sealed article in the cooling station, increasing the pressure between the outer surface of the article and the forming material to a pressure above atmospheric pressure so that the forming material is no longer compressed onto the outer surface of the article by the forming material.

8. The method according to claim 1, further comprising using a carriage to transfer the sealed article from the heating station to the cooling station while maintaining the pressure between the outer surface of the article and the forming material at the pressure below atmospheric pressure.

9. The method according to claim 8, wherein the carriage is coupled to a negative pressure generation system, and wherein the carriage, the negative pressure generation system, and the heating station are cooperatively adapted to expose the sealed article to a temperature of about 135° C. or less in an interior portion of the heating station while maintaining the pressure between the outer surface of the article and the forming material to the pressure below atmospheric pressure.

10. The method according to claim 9, wherein the carriage, the negative pressure generation system, and the cooling station are cooperatively adapted to simultaneously expose: the sealed article to a temperature of about 25° C. or less in an interior portion of the cooling station while maintaining the pressure between the outer surface of the article and the forming material to the pressure below atmospheric pressure.

11. The method according to claim 1, wherein the carriage is coupled with the portion of the negative pressure generation system between the heating station and the cooling station and when the sealed article is positioned at the heating station and at the cooling station.

* * * * *

UNITED STATES PATENT AND TRADEMARK OFFICE
CERTIFICATE OF CORRECTION

PATENT NO. : 12,115,747 B2
APPLICATION NO. : 17/838613
DATED : October 15, 2024
INVENTOR(S) : Giovanni Adami et al.

Page 1 of 1

It is certified that error appears in the above-identified patent and that said Letters Patent is hereby corrected as shown below:

On the Title Page

IN INVENTORS
Under Column no. 1, Line no. 10, "Frederico Zecchetto,", should read -- Federico Zecchetto, --

In the Specification

Under Column no. 15, Line no. 22, "and HMI adducts", should read -- and IPDI adducts --

Under Column no. 22, Line nos. 63-66, " 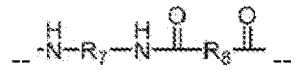 ", should read
-- 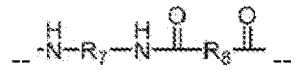 --

Under Column no. 62, Line no. 46, "Scanning calorimeter ("DSC")", should read -- Scanning Calorimeter ("DSC") --

Signed and Sealed this
Twenty-ninth Day of April, 2025

Coke Morgan Stewart
*Acting Director of the United States Patent and Trademark Office*